US012528676B2

(12) United States Patent
Pech et al.

(10) Patent No.: US 12,528,676 B2
(45) **Date of Patent: *Jan. 20, 2026**

(54) LIFT CRANE WITH IMPROVED MOVABLE COUNTERWEIGHT

(71) Applicant: Manitowoc Crane Companies, LLC, Manitowoc, WI (US)

(72) Inventors: David J. Pech, Manitowoc, WI (US); Joseph R. Rucinski, Manitowoc, WI (US); Joel D. Zick, Manitowoc, WI (US); Bronson E. Foust, Manitowoc, WI (US); Charles E. Wernecke, Manitowoc, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,279

(22) Filed: Dec. 15, 2021

(65) Prior Publication Data

US 2022/0106170 A1 Apr. 7, 2022

Related U.S. Application Data

(63) Continuation of application No. 16/845,837, filed on Apr. 10, 2020, now Pat. No. 11,208,303, which is a (Continued)

(51) Int. Cl.
*B66C 23/76* (2006.01)

(52) U.S. Cl.
CPC ...... *B66C 23/76* (2013.01); *B66C 2700/0371* (2013.01)

(58) Field of Classification Search
CPC ......... B66C 23/74; B66C 23/76; B66C 23/82; E02F 9/18
See application file for complete search history.

(56) References Cited

U.S. PATENT DOCUMENTS

| | | | |
|---|---|---|---|
| 496,428 | A | 5/1893 | Morgan |
| 524,619 | A | 8/1894 | Sturm |

(Continued)

FOREIGN PATENT DOCUMENTS

| | | | |
|---|---|---|---|
| AT | 201812 | | 6/2001 |
| CN | 86202467 | U | 10/1987 |

(Continued)

OTHER PUBLICATIONS

Office Action received for Chinese Patent Application No. 201610562415.7, mailed on Apr. 4, 2022, 28 pages (17 pages of English Translation and 11 pages of Original Document).

(Continued)

*Primary Examiner* — Anna M Momper
*Assistant Examiner* — Nathaniel L Adams
(74) *Attorney, Agent, or Firm* — Cook Alex Ltd.

(57) ABSTRACT

A lift crane includes a carbody and movable ground engaging members mounted on the carbody. A rotating bed is rotatably connected to the carbody and includes a counterweight support frame including a rack coupled directly to a lower surface of the rotating bed. A boom is pivotally mounted to the rotating bed. A counterweight unit includes a trolley, the counterweight unit being in a movable relationship with respect to the rotating bed. A counterweight unit movement device is configured to move the counterweight unit toward and away from the boom. Other embodiments include a counterweight support beam movably connected to the rotating bed, the counterweight support beam including another rack coupled to a lower surface of the counterweight support beam. A counterweight support beam movement device is connected between the counterweight support beam and the counterweight support frame.

20 Claims, 53 Drawing Sheets

Related U.S. Application Data continuation of application No. 16/235,029, filed on Dec. 28, 2018, now Pat. No. 10,647,555, which is a continuation of application No. 14/606,891, filed on Jan. 27, 2015, now Pat. No. 10,179,722.

(60) Provisional application No. 61/931,948, filed on Jan. 27, 2014.

(56) References Cited

U.S. PATENT DOCUMENTS

| | | | |
|---|---|---|---|
| 733,128 | A | 7/1903 | Bennett et al. |
| 752,248 | A | 2/1904 | Nickerson |
| 970,773 | A | 9/1910 | Wylie |
| 1,139,915 | A | 5/1915 | Smulders |
| 1,497,686 | A | 6/1924 | Johnson |
| 1,756,106 | A | 4/1930 | Swenson |
| 1,877,373 | A | 9/1932 | Cohen-Venezian |
| 2,015,604 | A | 9/1935 | Molinelli |
| 2,082,889 | A | 6/1937 | Hight |
| 2,130,487 | A | 9/1938 | Foley |
| 2,368,268 | A | 1/1945 | Spiegel |
| 2,526,613 | A | 10/1950 | Tanguy |
| 3,202,299 | A | 8/1965 | Decuir |
| 3,209,920 | A | 10/1965 | De Cuir |
| 3,378,148 | A | 4/1968 | Stanley |
| 3,435,961 | A | 4/1969 | Hamson |
| 3,501,021 | A | 3/1970 | Schreier et al. |
| 3,547,278 | A | 12/1970 | Tayler et al. |
| 3,572,517 | A | 3/1971 | Liebherr et al. |
| 3,713,544 | A | 1/1973 | Wallace et al. |
| 3,836,010 | A | 9/1974 | Lampson |
| 3,842,984 | A | 10/1974 | Brown et al. |
| 3,874,515 | A | 4/1975 | Leigh |
| 3,912,088 | A | 10/1975 | Bronfman |
| 3,921,815 | A | 11/1975 | Brown et al. |
| 3,924,753 | A | 12/1975 | Lamer et al. |
| 3,930,583 | A | 1/1976 | Jouffray |
| 3,945,518 | A | 3/1976 | Inoue |
| 3,955,684 | A | 5/1976 | Novotny |
| 3,955,844 | A | 5/1976 | De et al. |
| 4,017,109 | A | 4/1977 | Belinsky |
| 4,067,446 | A | 1/1978 | Ray |
| 4,081,081 | A | 3/1978 | Morrow et al. |
| 4,168,781 | A | 9/1979 | Bryan, Jr. |
| 4,172,529 | A | 10/1979 | Bryan, Jr. |
| 4,181,231 | A | 1/1980 | Morrissey et al. |
| 4,186,585 | A | 2/1980 | Calmes et al. |
| 4,196,816 | A | 4/1980 | Dvorsky |
| 4,204,603 | A | 5/1980 | Ducreuzet |
| 4,258,852 | A | 3/1981 | Juergens |
| 4,279,348 | A | 7/1981 | Harper et al. |
| 4,280,627 | A | 7/1981 | Becker |
| 4,349,115 | A | 9/1982 | Lampson |
| 4,353,585 | A | 10/1982 | Carver |
| 4,358,021 | A | 11/1982 | Helm et al. |
| 4,381,060 | A | 4/1983 | Morrow et al. |
| 4,394,911 | A | 7/1983 | Wittman et al. |
| 4,446,976 | A | 5/1984 | Imerman et al. |
| 4,449,635 | A | 5/1984 | Helm et al. |
| 4,508,232 | A | 4/1985 | Lampson |
| 4,537,317 | A | 8/1985 | Jensen |
| 4,540,097 | A | 9/1985 | Wadsworth et al. |
| 4,557,390 | A | 12/1985 | Mick |
| 4,579,234 | A | 4/1986 | Delago et al. |
| 4,614,275 | A | 9/1986 | Zenno |
| 4,711,358 | A | 12/1987 | Konishi |
| 4,729,486 | A | 3/1988 | Petzold et al. |
| 4,867,321 | A | 9/1989 | Montgon |
| 4,901,982 | A | 2/1990 | Havard et al. |
| 4,907,768 | A | 3/1990 | Masseron et al. |
| 4,953,722 | A | 9/1990 | Becker et al. |
| 4,995,518 | A | 2/1991 | McGhie |
| 5,005,714 | A | 4/1991 | Kroell et al. |
| 5,035,337 | A | 7/1991 | Juergens |
| 5,156,215 | A | 10/1992 | Jensen |
| 5,176,267 | A | 1/1993 | Pech |
| 5,199,583 | A | 4/1993 | Weider et al. |
| 5,203,837 | A | 4/1993 | Madic et al. |
| 5,222,613 | A | 6/1993 | McGhie |
| 5,332,110 | A | 7/1994 | Forsyth |
| 5,522,515 | A | 6/1996 | Pech et al. |
| 5,586,667 | A | 12/1996 | Landry |
| 5,598,935 | A | 2/1997 | Harrison et al. |
| 5,833,268 | A | 11/1998 | Aldrovandi |
| 5,836,205 | A | 11/1998 | Meyer |
| 5,854,988 | A | 12/1998 | Davidson et al. |
| 5,941,401 | A | 8/1999 | Petzold et al. |
| 6,039,194 | A | 3/2000 | Beeche et al. |
| 6,065,620 | A | 5/2000 | McGhie |
| 6,089,388 | A | 7/2000 | Willim |
| 6,098,823 | A | 8/2000 | Yahiaoui |
| 6,109,463 | A | 8/2000 | Cullity |
| 6,131,751 | A | 10/2000 | Pech et al. |
| 6,283,315 | B1 | 9/2001 | Willim et al. |
| 6,341,665 | B1 | 1/2002 | Zhou et al. |
| 6,360,905 | B1 | 3/2002 | Frommelt et al. |
| 6,474,485 | B1 | 11/2002 | Yokoyama |
| 6,474,487 | B1 | 11/2002 | Kretschmer |
| 6,481,202 | B1 | 11/2002 | Zuehlke et al. |
| 6,508,372 | B1 | 1/2003 | Lamphen et al. |
| 6,516,961 | B1 | 2/2003 | Knecht et al. |
| 6,568,547 | B1 | 5/2003 | Kretschmer et al. |
| 6,588,521 | B1 | 7/2003 | Porubcansky et al. |
| 6,631,814 | B2 | 10/2003 | Willim |
| 6,814,164 | B2 | 11/2004 | Mills et al. |
| 6,934,616 | B2 | 8/2005 | Colburn et al. |
| 7,165,691 | B2 | 1/2007 | Kimura |
| 7,213,716 | B2 | 5/2007 | Willim et al. |
| 7,252,203 | B2 | 8/2007 | Frankenberger et al. |
| 7,441,670 | B2 | 10/2008 | Willim |
| 7,546,928 | B2 | 6/2009 | Pech et al. |
| 7,967,158 | B2 | 6/2011 | Pech et al. |
| 8,033,572 | B2 | 10/2011 | Arzberger et al. |
| 8,162,160 | B2 | 4/2012 | Zollondz et al. |
| 8,528,755 | B2 | 9/2013 | Kurotsu |
| 8,870,001 | B2 | 10/2014 | Sun et al. |
| 8,960,461 | B2 | 2/2015 | Kakeya et al. |
| 9,102,507 | B2 | 8/2015 | Willim |
| 9,278,834 | B2 | 3/2016 | Pech et al. |
| 9,279,834 | B2 | 3/2016 | Eriksson et al. |
| 10,179,722 | B2 | 1/2019 | Pech et al. |
| 10,336,589 | B2 | 7/2019 | Pech et al. |
| 10,647,555 | B2 * | 5/2020 | Pech ...................... B66C 23/76 |
| 11,208,303 | B2 * | 12/2021 | Pech ...................... B66C 23/76 |
| 2002/0070186 | A1 | 6/2002 | Frommelt et al. |
| 2003/0146181 | A1 | 8/2003 | Taylor et al. |
| 2005/0061761 | A1 | 3/2005 | Willim et al. |
| 2005/0098520 | A1 | 5/2005 | Frankenberger et al. |
| 2005/0194339 | A1 | 9/2005 | Willim |
| 2006/0043042 | A1 | 3/2006 | Kimura |
| 2006/0283826 | A1 | 12/2006 | Yeral |
| 2008/0099421 | A1 | 5/2008 | Pech et al. |
| 2008/0116161 | A1 | 5/2008 | Kurotsu et al. |
| 2008/0203045 | A1 | 8/2008 | Pech et al. |
| 2008/0264887 | A1 | 10/2008 | Porubcansky |
| 2009/0272708 | A1 | 11/2009 | Zollondz et al. |
| 2010/0072156 | A1 | 3/2010 | Mentink et al. |
| 2010/0213152 | A1 | 8/2010 | Martin et al. |
| 2010/0276385 | A1 | 11/2010 | Pech et al. |
| 2011/0031202 | A1 | 2/2011 | Pech et al. |
| 2011/0192815 | A1 | 8/2011 | Kurotsu |
| 2013/0020273 | A1 | 1/2013 | Chen et al. |
| 2013/0161278 | A1 | 6/2013 | Sun et al. |
| 2015/0210514 | A1 | 7/2015 | Albinger et al. |
| 2015/0210515 | A1 | 7/2015 | Pech et al. |
| 2017/0022034 | A1 | 1/2017 | Iwazawa |
| 2017/0022035 | A1 | 1/2017 | Iwazawa |

FOREIGN PATENT DOCUMENTS

| | | | |
|---|---|---|---|
| CN | 2059156 | U | 7/1990 |
| CN | 1044267 | A | 8/1990 |
| CN | 2250345 | Y | 3/1997 |

(56) References Cited

FOREIGN PATENT DOCUMENTS

| | | | |
|---|---|---|---|
| CN | 2355001 | Y | 12/1999 |
| CN | 1287964 | A | 3/2001 |
| CN | 1341524 | A | 3/2002 |
| CN | 2642757 | Y | 9/2004 |
| CN | 1562724 | A | 1/2005 |
| CN | 1740080 | A | 3/2006 |
| CN | 1765729 | A | 5/2006 |
| CN | 201031107 | Y | 3/2008 |
| CN | 101254888 | A | 9/2008 |
| CN | 101311102 | A | 11/2008 |
| CN | 101430386 | A | 5/2009 |
| CN | 101445209 | A | 6/2009 |
| CN | 201284198 | Y | 8/2009 |
| CN | 201325832 | Y | 10/2009 |
| CN | 102020210 | A | 4/2011 |
| CN | 102167262 | A | 8/2011 |
| CN | 102285600 | A | 12/2011 |
| CN | 202415028 | U | 9/2012 |
| CN | 202529752 | U | 11/2012 |
| CN | 202594641 | U | 12/2012 |
| CN | 103213909 | A | 7/2013 |
| DE | 1007039 | B | 4/1957 |
| DE | 1246969 | B | 8/1967 |
| DE | 1264010 | B | 3/1968 |
| DE | 1281128 | B | 10/1968 |
| DE | 0073132 | A | 5/1970 |
| DE | 1781119 | A1 | 10/1970 |
| DE | 3438937 | A1 | 4/1986 |
| DE | 0073132 | | 10/1986 |
| DE | 0268458 | | 5/1989 |
| DE | 0268458 | A1 | 5/1989 |
| DE | 3838975 | A1 | 5/1990 |
| DE | 9404670 | U1 | 2/1995 |
| DE | 19642066 | A1 | 4/1998 |
| DE | 29723587 | U1 | 11/1998 |
| DE | 19803780 | A1 | 7/1999 |
| DE | 19857779 | A1 | 6/2000 |
| DE | 19908485 | A1 | 8/2000 |
| DE | 19929549 | A1 | 1/2001 |
| DE | 19931301 | A1 | 1/2001 |
| DE | 19931303 | A1 | 2/2001 |
| DE | 20314503 | U1 | 1/2005 |
| DE | 29924989 | U1 | 10/2007 |
| EP | 0048076 | A1 | 3/1982 |
| EP | 0110786 | A1 | 6/1984 |
| EP | 0132572 | A1 | 2/1985 |
| EP | 0354167 | A1 | 2/1990 |
| EP | 0368463 | A1 | 5/1990 |
| EP | 0379448 | A1 | 7/1990 |
| EP | 0856486 | A2 | 8/1998 |
| EP | 0945393 | A2 | 9/1999 |
| EP | 1135322 | A1 | 9/2001 |
| EP | 1205422 | A1 | 5/2002 |
| EP | 1619159 | A2 | 1/2006 |
| EP | 1916220 | A1 | 4/2008 |
| EP | 1934129 | A1 | 6/2008 |
| EP | 1990306 | A2 | 11/2008 |
| EP | 2281771 | A1 | 2/2011 |
| EP | 2354077 | A1 | 8/2011 |
| EP | 2497740 | A1 | 9/2012 |
| EP | 3208226 | A1 | 8/2017 |
| FR | 1408409 | A | 8/1965 |
| FR | 1469592 | A | 2/1967 |
| FR | 1548415 | A | 12/1968 |
| FR | 2172931 | A1 | 10/1973 |
| FR | 2497903 | A1 | 7/1982 |
| FR | 2536733 | A1 | 6/1984 |
| GB | 0113730 | A | 3/1918 |
| GB | 0136752 | A | 12/1919 |
| GB | 0190594 | A | 12/1922 |
| GB | 0604852 | A | 7/1948 |
| GB | 1020635 | A | 2/1966 |
| GB | 1179513 | A | 1/1970 |
| GB | 1207492 | A | 10/1970 |
| GB | 1218826 | A | 1/1971 |
| GB | 1291541 | A | 10/1972 |
| GB | 1311767 | A | 3/1973 |
| GB | 1458170 | A | 12/1976 |
| GB | 2029795 | A | 3/1980 |
| GB | 2050295 | A | 1/1981 |
| GB | 2096097 | A | 10/1982 |
| GB | 2130682 | A | 6/1984 |
| GB | 2151580 | A | 7/1985 |
| GB | 2159122 | A | 11/1985 |
| GB | 2353514 | A | 2/2001 |
| GB | 2353515 | A | 2/2001 |
| GB | 2371284 | A | 7/2002 |
| GB | 2422139 | A | 7/2006 |
| JP | 55-145993 | A | 11/1980 |
| JP | 56-145094 | A | 11/1981 |
| JP | 57-096190 | A | 6/1982 |
| JP | 59-043796 | A | 3/1984 |
| JP | 62-041192 | A | 2/1987 |
| JP | 62-203891 | A | 9/1987 |
| JP | 63-026690 | U | 2/1988 |
| JP | 63-032893 | U | 3/1988 |
| JP | 02-070696 | A | 3/1990 |
| JP | 02-182696 | A | 7/1990 |
| JP | 03-158392 | A | 7/1991 |
| JP | 05-201694 | A | 8/1993 |
| JP | 08-188383 | A | 7/1996 |
| JP | 08-301579 | A | 11/1996 |
| JP | 09-328293 | A | 12/1997 |
| JP | 10-087278 | A | 4/1998 |
| JP | 11-029291 | A | 2/1999 |
| JP | 11-049484 | A | 2/1999 |
| JP | 11-157780 | A | 6/1999 |
| JP | 2000-198674 | A | 7/2000 |
| JP | 2002-020081 | A | 1/2002 |
| JP | 2002-531357 | A | 9/2002 |
| JP | 2003-184086 | A | 7/2003 |
| JP | 2005-138962 | A | 6/2005 |
| JP | 2008-116161 | A | 5/2008 |
| JP | 2008-127150 | A | 6/2008 |
| JP | 2008-143626 | A | 6/2008 |
| JP | 2009-007164 | A | 1/2009 |
| JP | 2011-037634 | A | 2/2011 |
| RU | 2075430 | C1 | 3/1997 |
| RU | 2268234 | C1 | 1/2006 |
| SU | 0088589 | A1 | 11/1950 |
| SU | 0551238 | A1 | 3/1977 |
| SU | 0652096 | A1 | 3/1979 |
| SU | 1087455 | A1 | 4/1984 |
| SU | 1346567 | A1 | 10/1987 |
| SU | 1463705 | A2 | 3/1989 |
| SU | 1477663 | A1 | 5/1989 |
| SU | 1521703 | A1 | 11/1989 |
| WO | 94/29211 | A1 | 12/1994 |
| WO | 00/34173 | A1 | 6/2000 |
| WO | 03/40016 | A1 | 5/2003 |
| WO | 2005/026036 | A1 | 3/2005 |
| WO | 2007/056970 | A1 | 5/2007 |

OTHER PUBLICATIONS

Office Action received for Japanese Patent Application No. 2021032421, mailed on Mar. 8, 2022, 9 pages (4 pages of English Translation and 6 pages of Original Document).

Office Action received for Japanese Patent Application No. 2021067639, mailed on Mar. 1, 2022, 11 pages (5 pages of English Translation and 6 pages of Original Document).

Liebherr, LR1600/2 Technical Data, 7 paqes (undated).

Liebherr, RL44 Litronic Pipelavers, brochure, 8 pages (undated).

American A 100-HC General Specifications, 20 pages (undated, but prior to Aug. 6, 2009).

Brochure "MR Range: Potain", Manitowoc Crane Group, 4 pages (Mar. 2004) with accompanying photographs (6 pages).

Brochure "Multi Tasker 100/250/810/1000/1200/1600, Railway Crane," Kirow, a member of Kranunion, 16 pages (undated but prior to Aug. 6, 2009).

Chinese Decision of Rejection dated Nov. 2, 2018 in Chinese Patent Application No. 2016105622412.3.

(56) References Cited

OTHER PUBLICATIONS

Chinese Decision of Rejection in CN Pat. App. No. 201610562412.3 dated Nov. 2, 2018. English translation included.
Chinese Office Action dated Aug. 9, 2017 for Chinese Application No. 201610562415.7.
Chinese Office Action dated Jul. 3, 2018 for corresponding Serial No. 201610562415.7.
Chinese Office Action dated Jul. 4, 2017 for Chinese Application No. 201610562412.3.
Chinese Office Action dated Jun. 14, 2018 in corresponding Chinese Application No. 201610557694.8.
Chinese Office Action dated Mar. 15, 2018 for Chinese Application No. 201580016861.1.
Chinese Office Action dated May 3, 2018 for Chinese Application No. 201610562412.3.
Chinese Office Action dated Oct. 16, 2017 for Chinese Application No. 201580016861.1.
Communication about intention to grant a European patent received for EP Application No. 07254071.9, mailed on Feb. 19, 2016, 6 pages.
Communication about intention to grant a European patent received for EP Application No. 08251277.3, mailed on May 17, 2013, 6 pages.
Communication about intention to grant a European patent received for EP Application No. 10172110.8, mailed on Aug. 2, 2016, 6 pages.
Communication about intention to grant a European patent received for EP Application No. 10172110.8, mailed on Dec. 7, 2016, 6 pages.
Communication about intention to grant a European patent received for EP Application No. 13153480.2, mailed on Sep. 30, 2016, 7 pages.
Communication about intention to grant a European patent received for EP Application No. 13153486.9, mailed on Mar. 20, 2014, 6 pages.
Communication about intention to grant a European patent received for EP Application No. 13155808.2, mailed on Jun. 24, 2020, 6 pages.
Communication about intention to grant a European patent received for EP Application No. 14183968.8, mailed on Dec. 17, 2015, 6 pages.
Communication about intention to grant a European patent received for EP Application No. 15739771.2, mailed on Apr. 15, 2021, 6 pages.
Communication about intention to grant a European patent received for EP Application No. 15739792.8, mailed on Feb. 14, 2019, 6 pages.
Communication about intention to grant a European patent received for EP Application No. 17166174.7, mailed on Jan. 23, 2018, 6 pages.
Communication about intention to grant a European patent received for EP Application No. 17166174.7, mailed on Jun. 7, 2018, 6 pages.
Communication for EP Application No. 10172110.8, dated Apr. 29, 2015 (4 pages).
Communication under Rule 71(3) EPC received for European Application No. 16173277.1, mailed on Oct. 19, 2017, 6 pages.
Apr. 25, 2018 Office Action in corresponding Chinese Patent Application No. 201610562412.3.
Aug. 1, 2017 Office Action in corresponding Chinese Patent Application No. 201610562415.7.
Drawing Sheet dated Feb. 17, 1998 from Mannesmann Demag Fahrzeugkrane (E9bs).
Drawing Sheet dated Jun. 22, 2009 from Terex Demag GmbH (E9c).
Jan. 28, 2019 Office Action in corresponding Chinese Patent Application No. 201610562415.7.
Japanese Office Action dated May 26, 2020 for Japanese Application No. 2018-042562.
Jun. 10, 2019 Office Action in corresponding Chinese Patent Application No. 201610562415.7.
Jun. 14, 2018, 2018 Office Action in corresponding Chinese Patent Application No. 2016105576948.
Jun. 24, 2018 Office Action in corresponding Chinese Patent Application No. 201610562415.7.
Notice of Opposition dated Feb. 1, 2018 in EP 10172110.8.
Reply to Opposition dated Jun. 28, 2018 for EP 10172110.8.
Summons to Attend Oral Proceedings dated Sep. 27, 2018 in EP 10172110.8.
Third Party Submission dated Mar. 14, 2019 in EP 10172110.8.
Crane Operation Manual, edited by Chen Ganze, Shanghai Scientific & Technological Literature Publishing House, p. 78, published on Apr. 30, 1997.
Data Sheet "Potain MR 605 B H32", Manitowoc Crane Group, 8 pages (2011 ).
Decision November of 4, Refusal 2015 (2 from pages), related JP Application No. 2010-175871, dated Nov. 4, 2015 (2 pages).
Decision of Reexamination and English Translation for Chinese Application No. 201010511568.1, dated Dec. 11, 2015, overturning final rejection (39 pages).
Decision to grant a European patent received for EP Application No. 07254071.9, mailed on Jun. 30, 2016, 2 pages.
Decision to grant a European patent received for EP Application No. 08251277.3, mailed on Oct. 10, 2013, 2 pages.
Decision to grant a European patent received for EP Application No. 10172110.8, mailed on Apr. 6, 2017, 2 pages.
Manitowc, Model 18000 Brochure, pp. 1-8, 47-51 showing MAX-ER®, (undated, but 18000 MAX-ER has been on sale since before Aug. 6, 2009).
Manitowoc M-50W brochure, 6 pages (1989).
Manitowoc, M-250 Max-Spander TM Attachment, Installation and Removal Guide folio, 16 pages (Jun. 3, 1994). I.
Manitowoc, M-250 X-Spander /Max-Spander attachment, Operating Controls and Operation folio, 4 pages (Aug. 2, 1994).
N1-Chapter in "Special Purpose Vehicle" (2000), pp. 32-36.
Non-Final Office Action dated Aug. 3, 2017, in Application No. Chinese Application No. 201610557694.8.
Non-Final Office Action dated Jul. 4, 2017, in Japanese Application No. 2016-042643, 0.
Notice of Reexamination for Chinese Application No. 201010624732.X, dated Mar. 30, 2016 (22 pages).
Notice of Reexamination for Chinese Application No. 201210253579.3, dated Mar. 30, 2016 (22 pages).
Notification of Reason for Rejection for JP Application No. 2008-077842, dated Nov. 24, 2011 (3 pages).
Notification of Reason for Rejection for JP Application No. 2010-175871, dated Jul. 1, 2014 (5 pages).
Notification of Reasons for Rejection, and English language translation thereof, in Japanese Application No. 2010-175871, dated Jul. 7, 2015, 16 pages.
Office Action dated Aug. 18, 2020 from Japanese Patent Office for Japanese Patent Application No. 2019-142243.
Office Action dated Feb. 25, 2020 from Chinese Patent Office for Chinese Patent Application No. 201910487034.0.
Office Action dated Nov. 2, 2012, in Chinese Application No. 2010624732.X.
Office Action dated Oct. 19, 2020 from Chinese Patent Office for Chinese Patent Application No. 201910487034.0.
Office Action for RU Application No. 2007-139810, dated Apr. 12, 2012 (13 pages).
Office Action received for EP Application No. 07254071.9, mailed on Feb. 10, 2011, 7 pages.
Office Action received for EP Application No. 08251277.3, mailed on Feb. 17, 2011, 5 pages.
Office Action received for EP Application No. 10172110.8, mailed on Jun. 12, 2013, 4 pages.
Office Action received for EP Application No. 10172110.8, mailed on Nov. 17, 2015, 3 pages.
Office Action received for EP Application No. 13153415.8, mailed on Sep. 22, 2017, 6 pages.
Office Action received for EP Application No. 15739771.2, mailed on Sep. 28, 2020, 10 pages.

(56) References Cited

OTHER PUBLICATIONS

Office Action received for EP Application No. 18179050.2, mailed on Apr. 20, 2021, 4 pages.
Office Action received for EP Application No. 18179050.2, mailed on Oct. 20, 2021, 6 pages.
Partial European Search Report for EP Application No. 14183968.8, dated Dec. 16, 2014 (7 pages).
Peng Wensheng, Mechanical Design and Mechanical Principle for Entrance Exams Postgraduate Schools, vol. 2, Huazhong University of Science and Technology Press, May 31, 2005, pp. 83.
Product Guide "MR Range: Potain", Manitowoc Crane Group, 4 pages (2007).
Search Report from related Chinese Application No. 201210253579.3, dated Nov. 24, 2014 (2 pages).
Second Office Action for Chinese Application No. 201010511568.1, dated May 14, 2012 (14 pages).
Second Office Action from related Chinese Application No. 201210253579.3, dated Dec. 2, 2014 (10 pages).
Sections of brochure entitled "Demag CC 8800, 1250!," Demag Mobile Cranes Gmbh & Co.KG, 9 pages (cover page, pp. 6, 7, 10, 11, 13, 62 and 63, back page), undated, but prior to Oct. 27, 2006.
Sections of brochure entitled "LR 11200 Crawler Crane—Technical Data," Liebherr, 4 pages (cover paqe, pp. 14, 16a and 16b), undated, but prior to Oct. 27, 2006.
Sections of brochure entitled "Model 21000 Product Guide," Manitowoc, 4 pages, undated, but prior to Oct. 27, 2006.
Terex American HC 125 brochure, 2 pages (2001 ).
Terex American HC 210 brochure, 2002, 2 Pages.
Terex Demag CC8800-1 Crawler Crane Superlift Configurations, Aug. 6, 2009, pp. 7-9.
Terex.RTM., Demag CC8800-1 Crawler Crane, "Superlifl Configurations," 1 page (undated, but prior to Aug. 6, 2009).
Decision to grant a European patent received for EP Application No. 13153480.2, mailed on Feb. 16, 2017, 2 pages.
Decision to grant a European patent received for EP Application No. 13153486.9, mailed on Aug. 14, 2014, 2 pages.
Decision to grant a European patent received for EP Application No. 13155808.2, mailed on Nov. 12, 2020, 2 pages.
Decision to grant a European patent received for EP Application No. 14183968.8, mailed on May 12, 2016, 2 pages.
Decision to grant a European patent received for EP Application No. 15739792.8, mailed on Jun. 21, 2019, 2 pages.
Decision to grant a European patent received for EP Application No. 17166174.7, mailed on Jul. 5, 2018, 2 pages.
Decision to grant a European patent received for European Application No. 16173277.1, mailed on May 11, 2018, 2 pages.
Document entitled "X-Spander Attachment," 1 page (undated, but prior to Aug. 6, 2009).
English language translation of Decision on Rejection, in Chinese Application No. 201010624732.X, dated Jul. 29, 2015, 15 pages.
English translation of Decision of Invalidation (No. 22307), Case No. 4W102283, for Chinese Patent No. 200810092407.6, dated Mar. 14, 2014 (43 pages).
English translation of Decision on Rejection dated Aug. 13, 2015 for Chinese Patent Application No. 201210253579.3.
English translation of Examination Decision on the Request for Invalidation, Case No. 4W102286, for Chinese Patent No. 200710192985.2, dated Mar. 14, 2014 (53 paaes).
EP13153480.2, European Search Report, dated Mar. 22, 2013, 7 Pages.
European Search Report and Search Opinion received for EP Application No. 07254071.9, mailed on Feb. 22, 2008, 14 pages.
European Search Report and Search Opinion received for EP Application No. 08251277.3, mailed on Nov. 5, 2008, 13 pages.
European Search Report and Search Opinion received for EP Application No. 13153415.8, mailed on Mar. 22, 2013, 9 pages.
European Search Report and Search Opinion received for EP Application No. 13153486.9, mailed on Mar. 22, 2013, 5 pages.
European Search Report and Search Opinion received for EP Application No. 13155808.2, mailed on Mar. 22, 2013, 6 pages.
European Search Report and Search Opinion received for EP Application No. 14183968.8, mailed on Feb. 13, 2015, 10 pages.
European Search Report and Search Opinion received for EP Application No. 15739771.2, mailed on Sep. 12, 2017, 10 pages.
European Search Report and Search Opinion received for EP Application No. 15739792.8, mailed on Sep. 12, 2017, 8 pages.
European Search Report and Search Opinion Received for EP Application No. 16173277.1, mailed on Nov. 22, 2016, 6 pages.
European Search Report and Search Opinion received for EP Application No. 17166174.7, mailed on Jul. 25, 2017, 5 pages.
European Search Report and Search Opinion received for EP Application No. 18179050.2, mailed on Sep. 10, 2018, 6 pages.
European Search Report dated Nov. 25, 2010 in European Application No. 10172110.8.
European Search Report for EP Application No. 10172110.8, dated Nov. 25, 2010 (6 pages).
Examination Report for related European Application No. 13153480.2, dated Jan. 12, 2016 (7 pages).
Examination Report for related European Application No. 13155808.2, dated Jan. 13, 2016 (7 pages).
First Office Action for Chinese Application No. 201010624732.X, dated Nov. 2, 2012 (13 pages).
First Office Action for Chinese Application No. 201210253579.3, dated Feb. 12, 2014 (16 pages).
Fourth Office Action from related Chinese Application No. 201010624732.X, dated Nov. 3, 2014 (16 pages).
Grove, T80/T86J Telescopic Boom Work Platforms, 2000, 4 Pages.
International Preliminary Report on Patentability received for PCT Patent Application No. PCT/US15/13039, mailed on Aug. 11, 2016, 10 pages.
International Preliminary Report on Patentability received for PCT Patent Application No. PCT/US15/13098, mailed on Aug. 11, 2016, 17 pages.
International Search Report and Written Opinion received for PCT Patent Application No. PCT/US15/13039, mailed on May 7, 2015, 11 pages.
International Search Report and Written Opinion received for PCT Patent Application No. PCT/US15/13098, mailed on May 7, 2015, 19 pages.
Japanese Office Action dated Aug. 4, 2017 for Japanese Application No. 2016-042643.
Japanese Office Action dated Dec. 25, 2018 for corresponding Serial No. 2016-548645.
Japanese Office Action dated May 21, 2019 for corresponding Serial No. 2018-042562.
Japanese Patent Office Notice of Allowance dated Mar. 16, 2021 for Japanese Patent Application No. 2019-142243.
Journal Article: Mingqin, Z., Xiaoli, S., Zhenbo, 0., Chuanzeng, S. & Mlngxiao, D. (2003). "Achievement of the Balance Weight Self Adaptation Adjustments of Cranes Through the Application of a Connecting Rod Mechanism," Machine Design and Research, 19 (4) 379-426.
JP2010175871, English language translation of Decision on Rejection Received, dated Jul. 30, 2013, 5 Pages.
Liebherr, LR1600/2 Dimensions, 3 pages (undated, but prior to Aug. 6, 2009).
Liftcrane Capacities and Liftcrane Jib Capacities for M-250 with Max-Spander and with X-Spander (English and metric charts), dated Jan. 21, 1994 and Mar. 23, 1994, 78 pages.
Liftcrane Capacities and Liftcrane Jib Capacities for M-250 with X-Spander, dated Jan. 21, 1994 and Mar. 23, 1994, 82 pages.
M-250 Max-Spander Attachment installation and Removal Guide, Manitowoc Engineering Co, vol. 3, Mar. 6, 1994, pp. 1-16 (XP055155658).
Manitowc, Model 16000 Brochure, pp. 1-7, 36-42 showing MAX-ER®, (no date, but 16000 MAX-ER has been on sale since before Aug. 6, 2009).

* cited by examiner

LIFT CRANE WITH IMPROVED MOVABLE COUNTERWEIGHT

REFERENCE TO EARLIER FILED APPLICATIONS

The present application is a continuation of U.S. patent application Ser. No. 16/845,837 filed Apr. 10, 2020 and titled Lift Crane With Improved Movable Counterweight that issued as U.S. Pat. No. 11,208,303 on Dec. 28, 2021, which in turn is a continuation of U.S. patent application Ser. No. 16/235,029 filed Dec. 28, 2018 and titled Lift Crane With Improved Movable Counterweight that issued as U.S. Pat. No. 10,647,555 on May 12, 2020, which in turn is a continuation of U.S. patent application Ser. No. 14/606,891 filed Jan. 27, 2015 and titled Lift Crane With Improved Movable Counterweight that issued as U.S. Pat. No. 10,179,722 on Jan. 15, 2019, which in turn claims priority to and the benefit of U.S. Provisional Patent Application Ser. No. 61/931,948 filed Jan. 27, 2014 and titled Lift Crane With Improved Movable Counterweight, the disclosures of which are incorporated in their entirety by this reference.

BACKGROUND

The present application relates to lift cranes, and particularly to mobile lift cranes having a counterweight that can be moved to different positions in an effort to balance the combined boom and load moment on the crane.

Lift cranes typically include counterweights to help balance the crane when the crane lowers its boom and/or lifts a load. Sometimes the counterweight on the rear of the crane is so large that the carbody is also equipped with counterweight to prevent backward tipping when no load is being lifted. Further, an extra counterweight attachment, such as a counterweight trailer, is sometimes added to the crane to further enhance the lift capacities of the mobile lift crane. Since the load is often moved in and out with respect to the center of rotation of the crane, and thus generates different moments throughout a crane pick, move and set operation, it is advantageous if the counterweight, including any extra counterweight attachments, can also be moved forward and backward with respect to the center of rotation of the crane. In this way a smaller amount of counterweight can be utilized than would be necessary if the counterweight had to be kept at a fixed distance.

A typical example of the forgoing is a Terex Demag CC8800 crane with a Superlift attachment. This crane includes 100 metric tonne of carbody counterweight, 280 metric tonne of upperworks counterweight, and 640 metric tonne on an extra counterweight attachment, for a total of 1020 metric tonne of counterweight. The extra counterweight can be moved in and out by a telescoping member. While all of this counterweight makes it possible to lift heavy loads, the counterweight has to be transported whenever the crane is dismantled for moving to a new job site. With U.S. highway constraints, it takes 15 trucks to transport 300 metric tonne of counterweight.

Since the crane needs to be mobile, any extra counterweight attachments also need to be mobile. However, when there is no load on the hook, it is customary to support these extra counterweights on the ground apart from the main crane; otherwise the extra counterweight would generate such a moment that the crane would tip backward. Thus, if the crane needs to move without a load on the hook, the extra counterweight attachment also has to be able to travel over the ground. This means that the ground has to be prepared and cleared, and often timbers put in place, for swing or travel of the extra counterweight unit. Thus, there is a benefit to a crane design that has movable counterweight that does not need to be supported by the ground except through the crawlers on the crane.

U.S. Pat. No. 7,546,928 discloses several embodiments of mobile lift cranes with a variable position counterweight that have high capacities with lower amounts of counterweight, and the movable counterweight does not need to be supported by the ground. While these embodiments are great improvements in the high-capacity crane design, there are cranes with lower capacities for which it would also be desirable to increase the capacity of the crane without increasing the total counterweight of the crane, especially if the counterweight did not need to be supported by the ground during crane operation. Further, the cranes in the '928 patent include a fixed position lattice mast structure from which the counterweight is suspended by a tension member. Sometimes it is beneficial if the mobile lift crane does not have a fixed mast structure, since the lattice mast structure requires additional components to be delivered to a job site, and a high fixed mast is sometimes an obstacle requiring clearance when the crane is repositioned. Thus, there is a need for further improvements in counterweight systems for mobile lift cranes.

BRIEF SUMMARY

A mobile lift crane and method of operation has been invented for smaller capacity cranes that use a reduced amount of total counterweight compared to other cranes of the same capacity, but wherein the crane is still mobile and can lift loads comparable to a crane using significantly more total counterweight. In a first aspect, the invention is a lift crane comprising: a carbody; movable ground engaging members mounted on the carbody allowing the crane to move over the ground; a rotating bed rotatably connected to the carbody about an axis of rotation, the rotating bed comprising a counterweight support frame; a boom pivotally mounted about a fixed boom hinge point on the front portion of the rotating bed and including a load hoist line for handling a load; a boom hoist system connected to the rotating bed and the boom that allows the angle of the boom relative to the plane of rotation of the rotating bed to be changed; a counterweight unit supported on the counterweight support frame in a movable relationship with respect to the counterweight support frame; and a counterweight unit movement device connected between the rotating bed and the counterweight unit so as to be able to move the counterweight unit toward and away from the boom; wherein the crane is configured such that during crane operation, when the counterweight unit is moved to compensate for changes in the combined boom and load moment, the moment generated by the counterweight unit acts on the rotating bed predominantly through the counterweight support frame.

In a second aspect, the invention is a lift crane comprising: a carbody; ground engaging members elevating the carbody off the ground; a rotating bed rotatably connected to the carbody about an axis of rotation, the rotating bed having a rear-most fixed portion; a boom pivotally mounted on the front portion of the rotating bed and including a load hoist line for handling a load; a mast connected to the rotating bed, and adjustable-length boom hoist rigging connected between the mast and the boom that allows the angle of the boom relative to the plane of rotation of the rotating bed to be changed; a counterweight support beam moveably connected to the rotating bed; a counterweight support beam movement device connected between the counterweight support beam and the rotating bed such that the counterweight support beam can be moved with respect to the length of the rotating bed away from the rotational connection of the rotating bed and the carbody, and extend rearwardly of the rear-most fixed portion of the rotating bed; a tension member connected between the mast and the counterweight support beam; a counterweight unit supported on the counterweight support beam in a movable relationship with respect to the counterweight support beam; and a counterweight unit movement device connected between the counterweight support beam and the counterweight unit so as to be able to move the counterweight unit toward and away from the boom; wherein the counterweight unit may be moved to and held at a position in front of the top of the mast and moved to and held at a position rearward of the top of the mast.

A third aspect of the invention is a mobile lift crane comprising, when set up, a carbody having movable ground engaging members; a rotating bed rotatably connected to the carbody such that the rotating bed can swing about an axis of rotation with respect to the ground engaging members; and a boom pivotally mounted on a front portion of the rotating bed, with a hoist line extending there from; wherein the crane is configured to be set up with two different counterweight set-up configuration options: i) a first counterweight set-up configuration option wherein a first counterweight movement system can move a first counterweight unit between a first position and a second position, wherein the first position is a position in which the first counterweight unit is as near as possible to the axis of rotation for the first counterweight set-up configuration option, constituting a first distance from the axis of rotation, and where the second position is a position in which the first counterweight unit is as far as possible from the axis of rotation for the first counterweight set-up configuration option, constituting a second distance from the axis of rotation; and ii) a second counterweight set-up configuration option wherein a second counterweight movement system can move a second counterweight unit between a third position and a fourth position, where the third position is a position in which the second counterweight unit is as near as possible to the axis of rotation for the second counterweight set-up configuration option, constituting a third distance from the axis of rotation, and where the fourth position is a position in which the second counterweight unit is as far as possible from the axis of rotation in the second counterweight set-up configuration option, constituting a fourth distance from the axis of rotation; and further wherein the fourth distance is greater than the second distance, and wherein the difference between the third and fourth distances is greater than the difference between the first and second distances.

A fourth aspect of the invention is a lift crane comprising: a carbody; ground engaging members elevating the carbody off the ground; a rotating bed rotatably connected to the carbody; a counterweight support beam telescopically connected to the rotating bed such that the rear portion of the counterweight support beam can be extended away from the rotational connection of the rotating bed and the carbody; a boom pivotally mounted on the front portion of the rotating bed and including a load hoist line for handling a load; a mast connected to the rotating bed, and adjustable-length boom hoist rigging connected between the mast and the boom that allows the angle of the boom relative to the plane of rotation of the rotating bed to be changed; a tension member connected between the mast and the counterweight support beam; a counterweight unit supported on the counterweight support beam in a movable relationship with respect to the counterweight support beam; and a counterweight movement system capable of moving the counterweight unit toward the boom to a position in front of the top of the mast and away from the boom to a position rearward of the top of the mast, the counterweight movement system causing the counterweight unit to move with respect to the rear of the counterweight support beam and the rear of the counterweight support beam to move with respect to the rotating bed.

In a fifth aspect, the invention is a lift crane comprising: a carbody having movable ground engaging members mounted on the carbody allowing the crane to move over the ground; a rotating bed rotatably connected about an axis of rotation to the carbody such that the rotating bed can swing with respect to the movable ground engaging members; a boom pivotally mounted on the front portion of the rotating bed and including a load hoist line for handling a load; a mast pivotally mounted on the rotating bed at a first end; a boom hoist system comprising pendants connected between the mast and the boom, the boom and mast being connected together with a fixed length of rigging between the boom and the mast, and a boom hoist system mounted between the mast and the rotating bed, the boom hoist system allowing the angle of the boom relative to the plane of rotation of the rotating bed to be changed; a movable counterweight unit supported on the rotating bed; and a counterweight movement system connected between the rotating bed and the counterweight unit so as to be able to move the counterweight unit toward and away from the boom.

In a sixth aspect, the invention is mobile lift crane comprising: a carbody having movable ground engaging members; a rotating bed rotatably connected about an axis of rotation to the carbody such that the rotating bed can swing with respect to the movable ground engaging members; a boom pivotally mounted on a front portion of the rotating bed; an upperworks counterweight unit that rotates with the rotating bed and is never supported by the ground during crane pick, move and set operations other than indirectly by the movable ground engaging members on the carbody, wherein the ratio of i) the weight of the upperworks counterweight unit to ii) the total weight of the crane equipped with a basic boom length is greater than 52%.

In another embodiment, a lift crane includes a rotating bed having a front portion and a rear-most fixed portion. Movable ground engaging members mounted on a carbody of the crane and allow the crane to move over the ground. The rotating bed is rotatably connected to the carbody about an axis of rotation that provides a plane of rotation perpendicular to the axis. The rotating bed includes a counterweight support frame with a rack coupled directly to a lower surface of the rotating bed, the rack having teeth formed therein. A boom is pivotally mounted about a fixed boom hinge point on the front portion of the rotating bed and includes a load hoist line for handling a load. A boom hoist system is connected to the rotating bed and the boom and allows the angle of the boom relative to the plane of rotation of the rotating bed to be changed. The lift crane also includes a counterweight unit with a trolley. The counterweight unit is supported on the counterweight support frame in a movable relationship with respect to the counterweight support frame. A counterweight unit movement device is connected between the counterweight support frame and the counterweight unit so as to be able to move the counterweight unit toward and away from the boom. The counterweight unit movement device includes at least one motor driving a gear connected to the trolley. The gear engages the teeth on the rack to move the trolley with respect to the counterweight support frame as the motor turns the gear.

In yet another embodiment, a lift crane comprises a rotating bed having a front portion and a rear-most fixed portion. Movable ground engaging members mount on a carbody and allow the crane to move over the ground. The rotating bed is rotatably connected to the carbody about an axis of rotation that provides a plane of rotation perpendicular to the axis. The rotating bed includes a counterweight support frame with a rack coupled directly to a lower surface of the rotating bed, the rack having teeth formed therein. A boom is pivotally mounted about a fixed boom hinge point on the front portion of the rotating bed and includes a load hoist line for handling a load. A boom hoist system is connected to the rotating bed and the boom and allows the angle of the boom relative to the plane of rotation of the rotating bed to be changed. The lift crane also includes a counterweight unit with a trolley. The counterweight unit is in a movable relationship with respect to the rotating bed. A counterweight unit movement device is configured to move the counterweight unit toward and away from the boom. The counterweight unit movement device includes at least one motor driving a gear connected to the trolley to move the trolley with respect to the rotating body as the motor turns the gear.

In yet another embodiment, a lift crane comprises a rotating bed having a front portion and a rear-most fixed portion. Movable ground engaging members mount on a carbody and allow the crane to move over the ground. The rotating bed is rotatably connected to the carbody about an axis of rotation that provides a plane of rotation perpendicular to the axis. The rotating bed includes a counterweight support frame with a rack coupled directly to a lower surface of the rotating bed, the rack having teeth formed therein. A boom is pivotally mounted about a fixed boom hinge point on the front portion of the rotating bed and includes a load hoist line for handling a load. A boom hoist system is connected to the rotating bed and the boom and allows the angle of the boom relative to the plane of rotation of the rotating bed to be changed. The lift crane also includes a counterweight unit with a trolley. The counterweight unit is supported on the counterweight support frame in a movable relationship with respect to the rotating bed. A counterweight unit movement device configured to move the counterweight unit toward and away from the boom. The counterweight unit movement device includes at least one motor driving a gear connected to the trolley. The gear engages the teeth on the rack to move the trolley with respect to the rotating bed as the motor turns the gear. Optionally, the embodiments include a counterweight support beam movably connected to the rotating bed. The counterweight support beam includes another rack coupled to a lower surface of the counterweight support beam. A counterweight support beam movement device is connected between the counterweight support beam and the counterweight support frame such that the counterweight support beam can be moved forward towards the front portion of the rotating bed and rearward beyond the rearmost portion of the rotating bed. The counterweight support beam movement device includes at least a motor driving a gear that engages the teeth on the rack of the counterweight support frame. In various embodiments, the gear of the counterweight unit movement device engages the rack on the counterweight support frame when the counterweight unit is positioned forward of the rear-most fixed portion of the rotating bed.

In yet another embodiment, a lift crane comprises a rotating bed having a front portion and a rear-most fixed portion. Movable ground engaging members mount on a carbody and allow the crane to move over the ground. The rotating bed is rotatably connected to the carbody about an axis of rotation that provides a plane of rotation perpendicular to the axis. The rotating bed includes a counterweight support frame with a rack coupled directly to a lower surface of the rotating bed, the rack having teeth formed therein. A boom is pivotally mounted about a fixed boom hinge point on the front portion of the rotating bed and includes a load hoist line for handling a load. A boom hoist system is connected to the rotating bed and the boom and allows the angle of the boom relative to the plane of rotation of the rotating bed to be changed. A counterweight support beam is movably connected to the rotating bed and includes another rack coupled to a lower surface of the counterweight support beam. A counterweight support beam movement device is connected between the counterweight support beam and the counterweight support frame such that the counterweight support beam can be moved forward towards the front portion of the rotating bed and rearward beyond the rearmost portion of the rotating bed. A counterweight unit that includes a trolley, the counterweight unit being supported on the counterweight support frame in a movable relationship with respect to the rotating bed. A counterweight unit movement device is configured to move the counterweight unit toward and away from the boom. The counterweight unit movement device includes at least one motor driving a gear connected to the trolley. The gear engages at least the teeth on the another rack of the counterweight support beam to move the trolley with respect to the rotating bed as the motor turns the gear when the counterweight unit is positioned rearward of the rear-most fixed portion of the rotating bed.

In another aspect, the invention is a method of operating a mobile lift crane, the lift crane comprising a carbody having movable ground engaging members; a rotating bed rotatably connected to the carbody such that the rotating bed can swing with respect to the movable ground engaging members; a boom pivotally mounted on a front portion of the rotating bed, with a hoist line extending there from; a movable counterweight support beam; and a movable counterweight unit supported on the movable counterweight support beam, the method comprising: performing a pick, move and set operation with a load wherein the movable counterweight unit is moved toward and away from the front portion of the rotating bed during the pick, move and set operation to help counterbalance the combined boom and load moment, and wherein the counterweight unit stays on the counterweight support beam during the pick, move and set operation, and the counterweight support beam and counterweight unit both move to counterbalance the crane as the combined boom and load moment changes.

In yet another aspect, the invention is a method of increasing the capacity of a crane comprising the steps of: a) providing a lift crane having a first capacity comprising a carbody having movable ground engaging members mounted on the carbody allowing the crane to move over the ground; a rotating bed rotatably connected about an axis of rotation to the carbody such that the rotating bed can swing with respect to the movable ground engaging members; a boom pivotally mounted on the front portion of the rotating bed and including a load hoist line for handling a load; and a movable counterweight unit supported on the rotating bed, the counterweight unit including multiple counterweights stacked on top of each other, the counterweight unit being movable from a first position to a second position further from the boom than the first position; b) removing at least some of the counterweights from the crane; c) adding a counterweight support beam to the crane, attached to the rotating bed; and d) returning at least some of the counterweights removed in step b) back to the crane to provide a crane having a second capacity greater than the first capacity, with the returned counterweights being supported on the counterweight support beam in a manner that allows the retuned counterweights to be able to move to a third position further from the boom than the second position.

With the lift crane of the present invention, a counterweight can be positioned far forward such that it produces very little backward moment on the crane when no load is on the hook. As a result, the carbody need not have extra counterweight attached to it. This large counterweight can be positioned far backward so that it can counterbalance a heavy load. On the other hand, with one embodiment of the invention the load can be lifted without the need for a lattice mast from which the counterweight is suspended. Rather, in some embodiments the rotating bed is equipped with counterweight support frame on which the counterweight unit can move backwards. Interestingly, in some embodiments, the basic model crane can also be equipped with a lattice mast and a movable counterweight support beam to further increase the capacity of the crane. As with the large capacity crane of U.S. Pat. No. 7,546,928 of U.S., another advantage of the preferred embodiment of the invention is that the counterweight need not be set on the ground when the crane sets its load. There is no extra counterweight unit requiring a trailer, and the limitations of having to prepare the ground for such a trailer.

These and other advantages of the invention, as well as the invention itself, will be more easily understood in view of the attached drawings.

DETAILED DESCRIPTION

Relevant background and contextual information is first provided, and then the present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Several terms used in the specification and claims have a meaning defined as follows.

Figure 24:
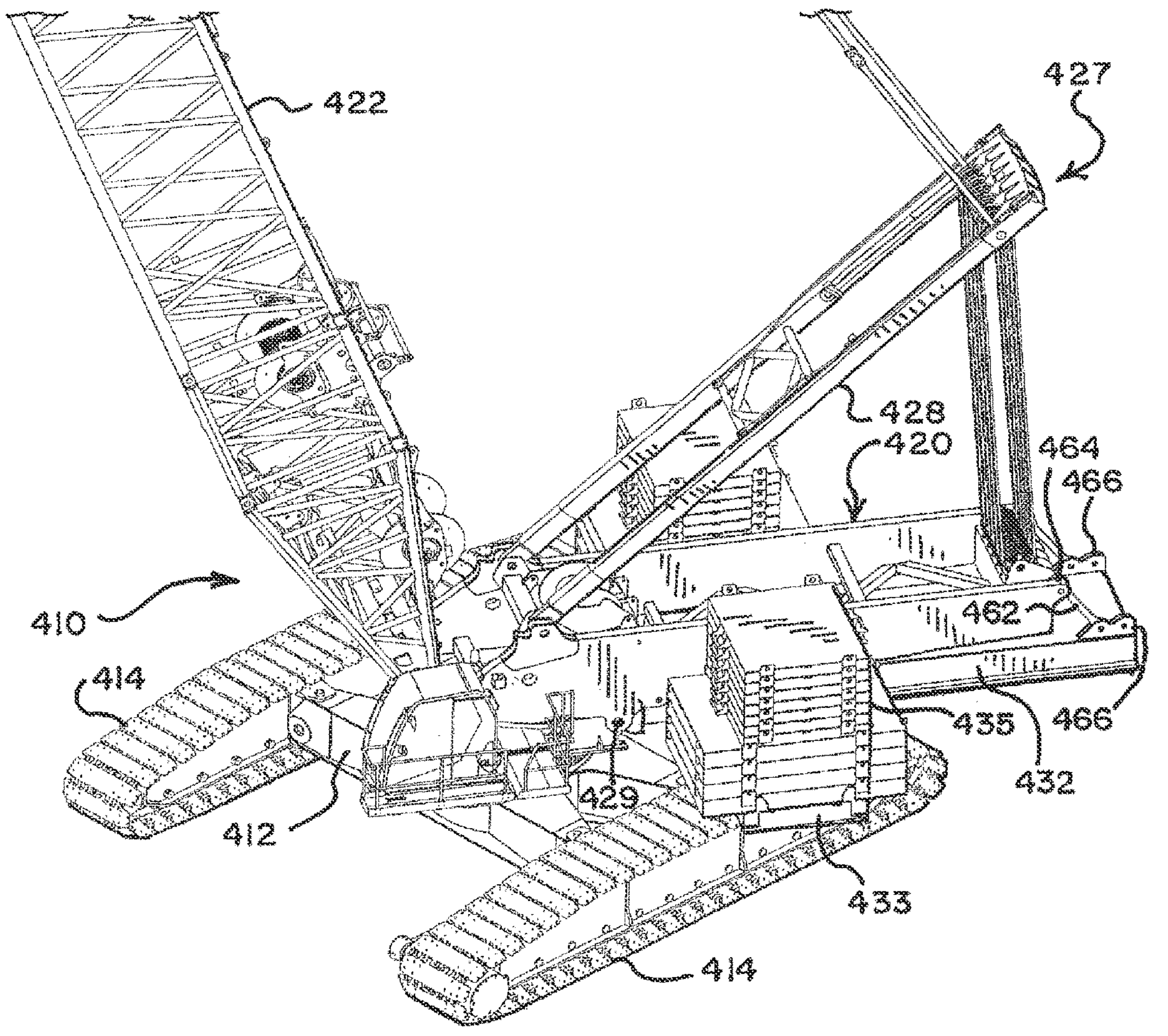
FIG. 24 is a perspective view of a sixth embodiment of a mobile lift crane, using the main crane components of the crane of FIG. 23 but without the fixed mast, shown with the counterweight in a forward position.
Figure 25:
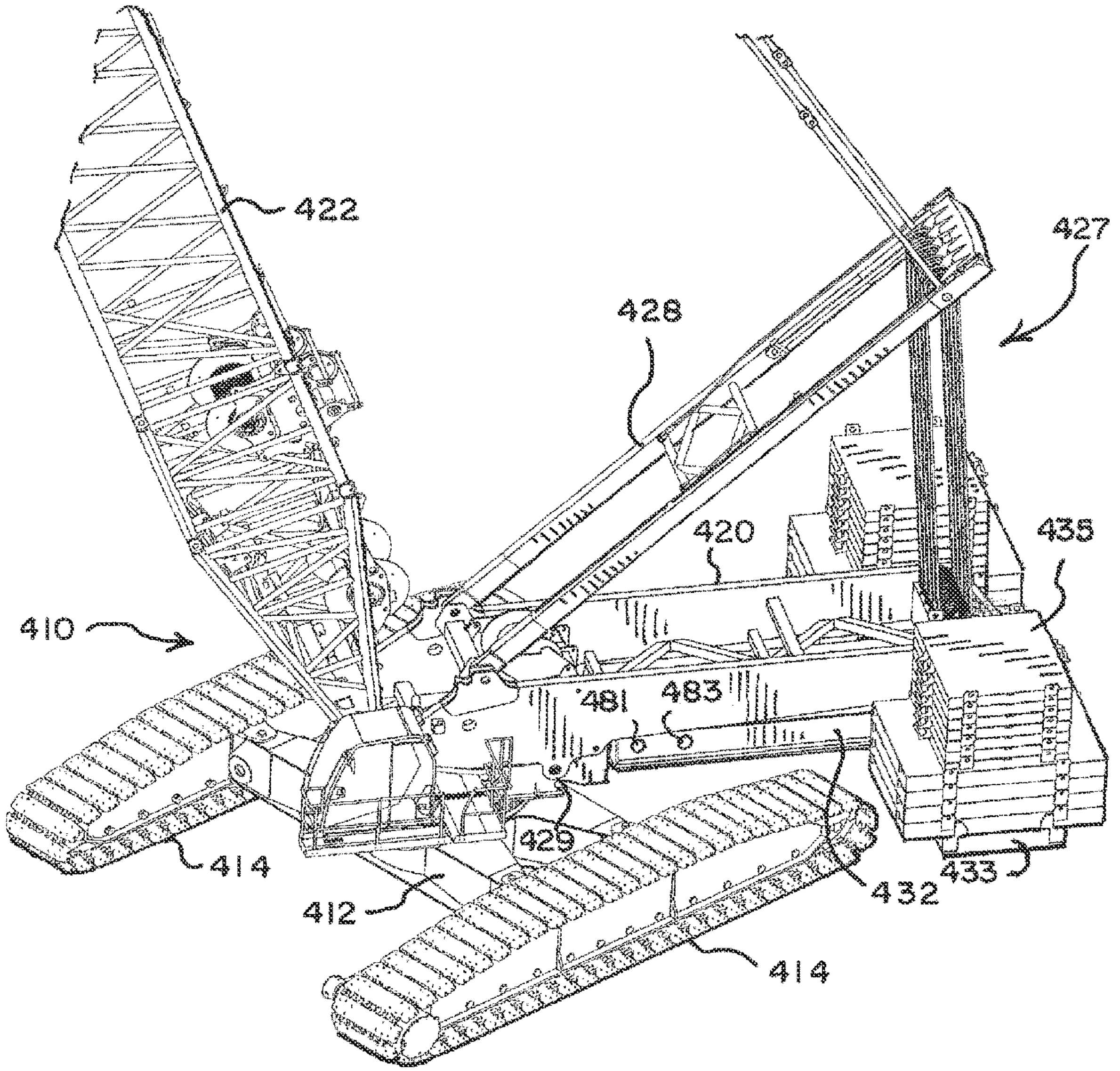
FIG. 25 is a perspective view of the mobile lift crane of FIG. 24 with the counterweight in a rearward position.
Figure 26:
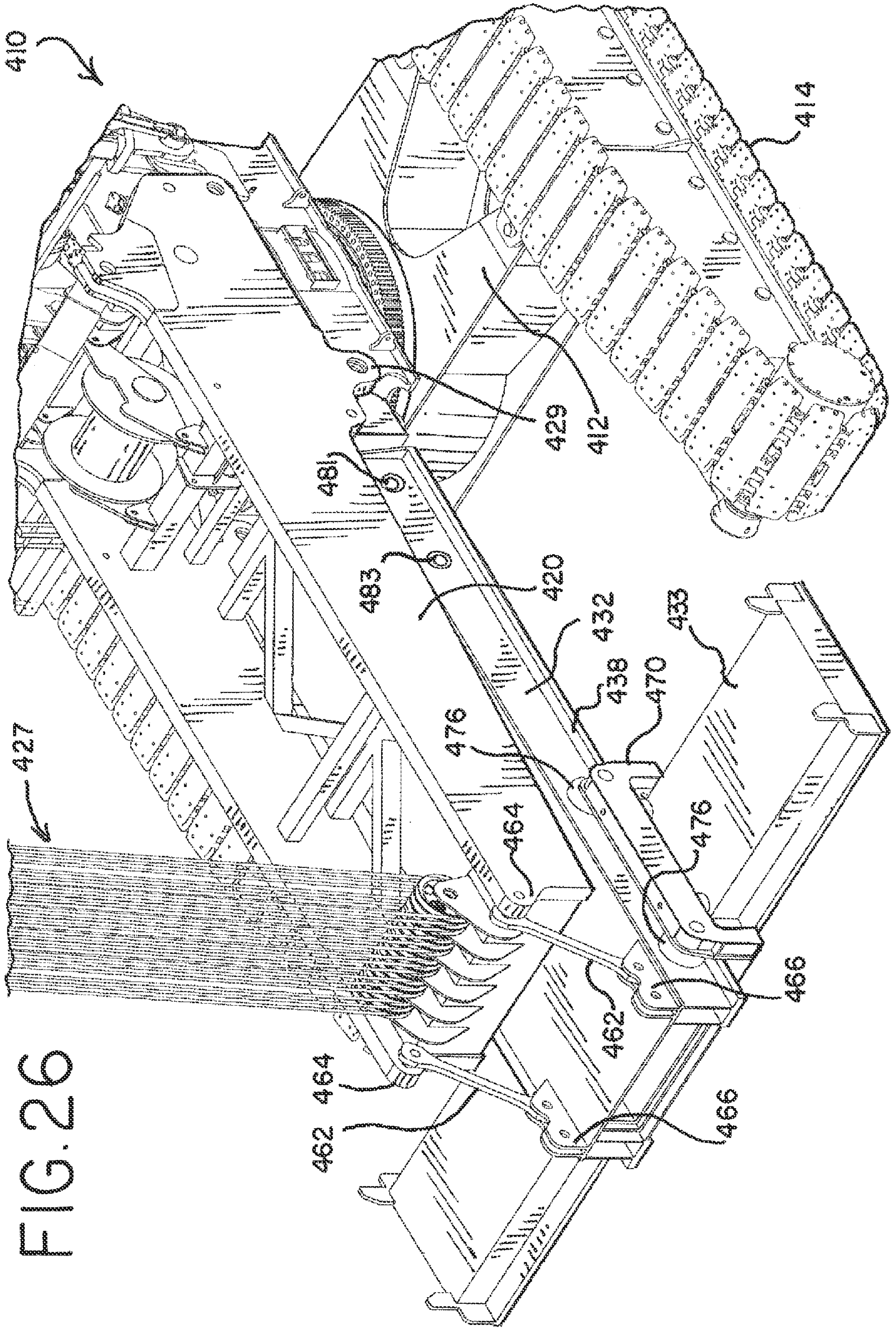
FIG. 26 is a partial rear perspective view of the crane of FIG. 24 with the stacks of individual counterweights removed for sake of clarity, but with the counterweight tray in a rearward position.
Figure 27:
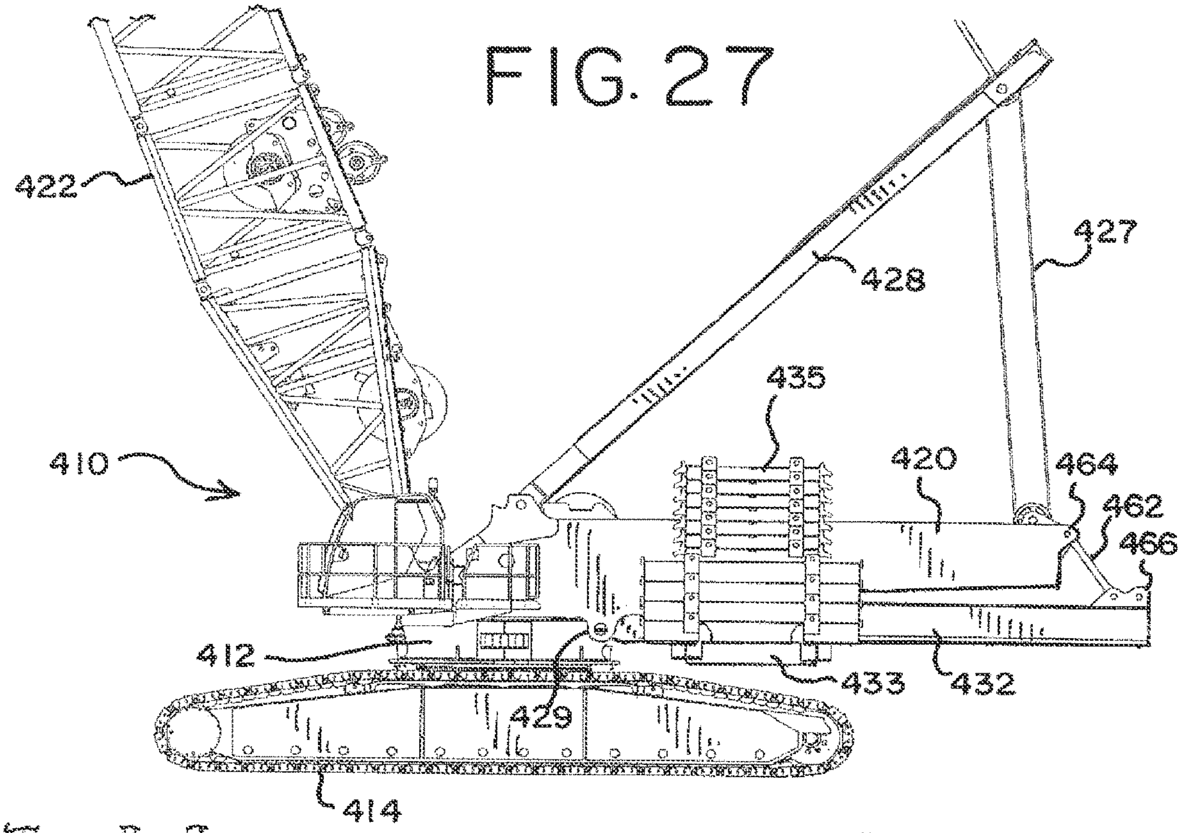
FIG. 27 is a side elevation view of the crane of FIG. 24 with the counterweight in a forward position.
Figure 28:
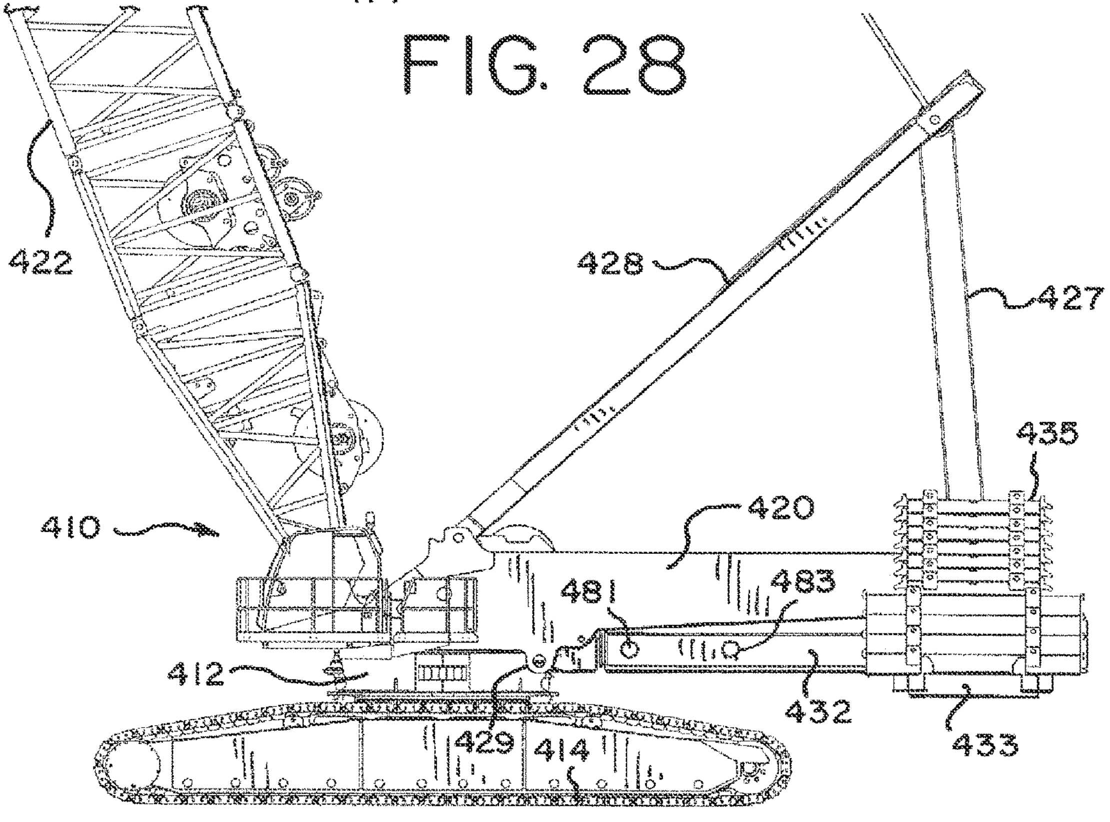
FIG. 28 is a side elevation view of the crane of FIG. 24 with the counterweight in a rearward position.
Figure 29:
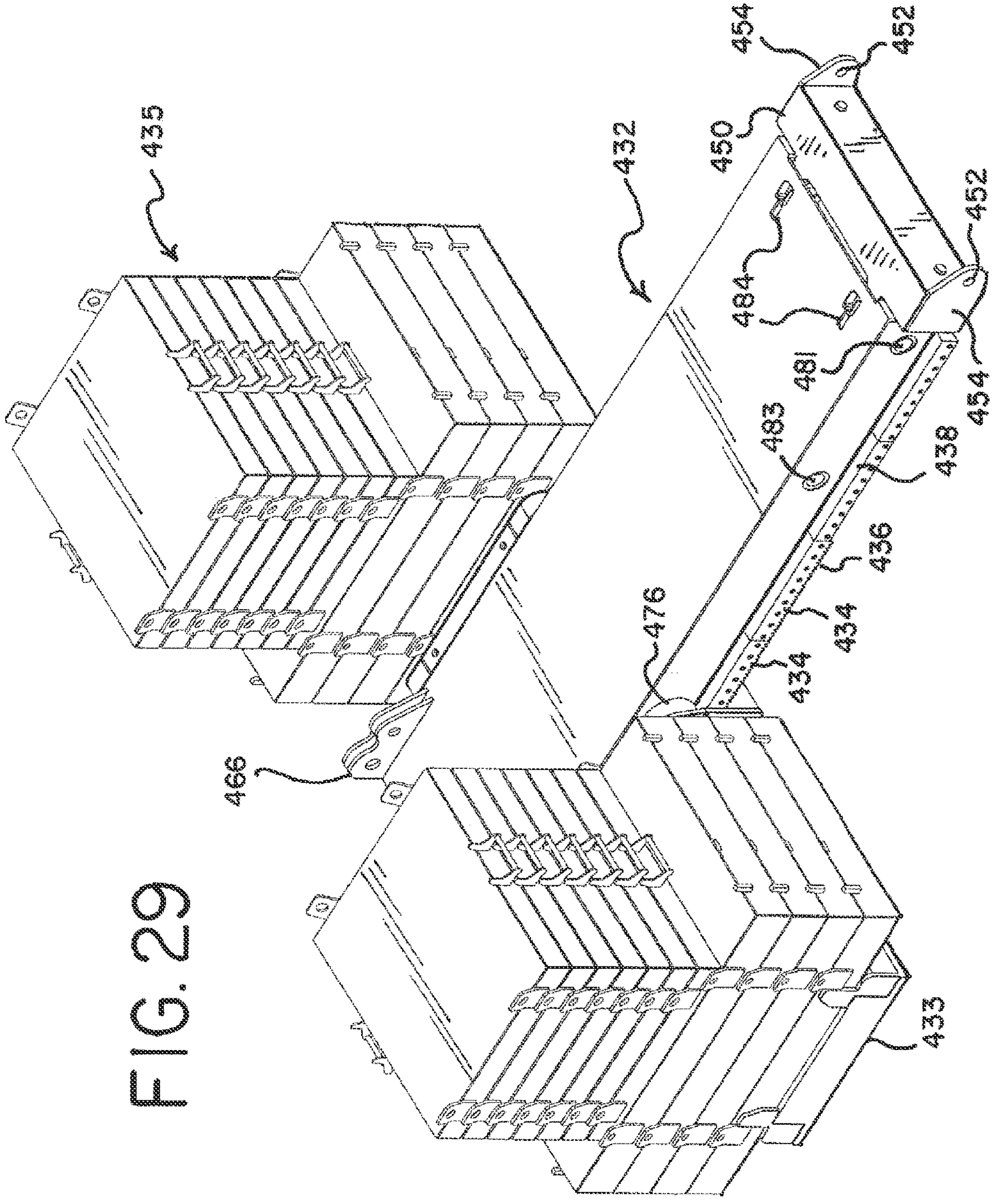
FIG. 29 is an enlarged perspective view of the counterweight support frame and stacks of counterweight of the crane of FIG. 24 disconnected from the crane.
Figure 30:
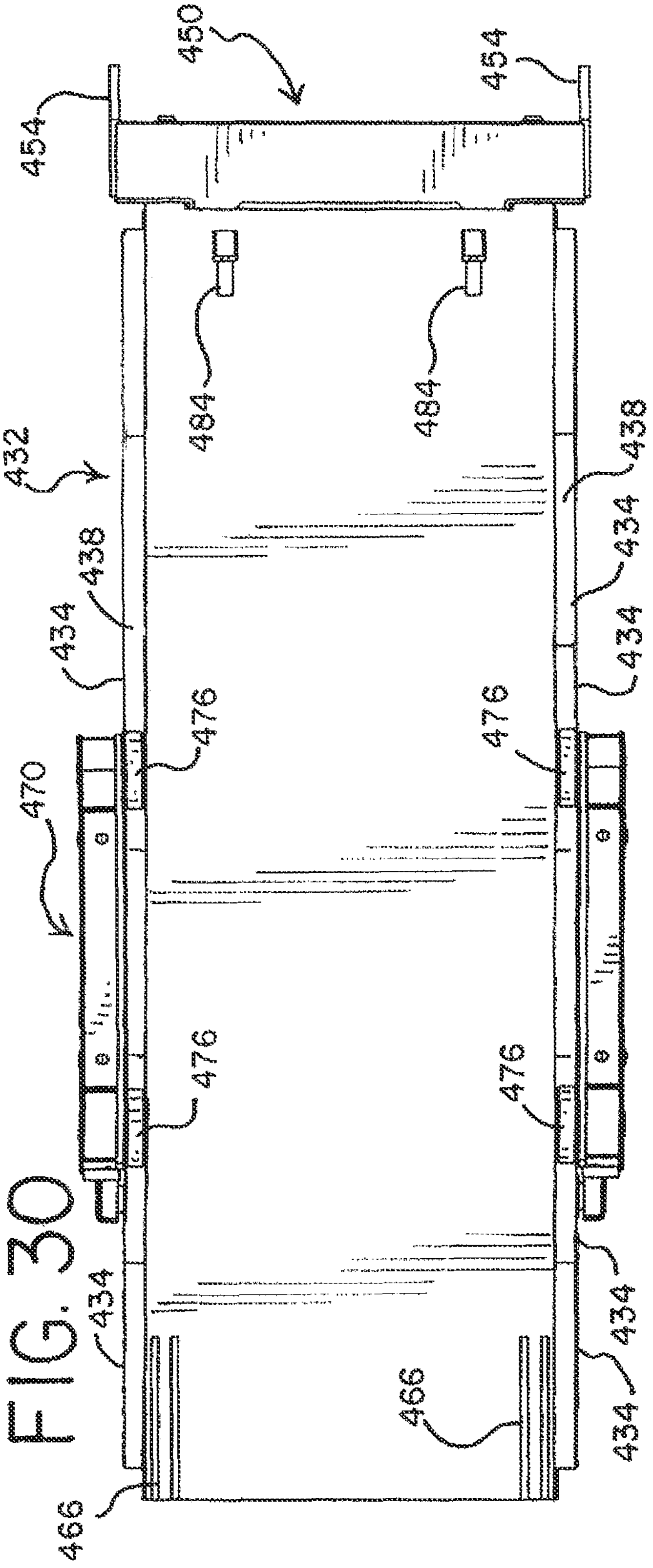
FIG. 30 is a top plan view of the counterweight support frame of FIG. 29 and the counterweight unit movement device associated therewith.
Figure 31:
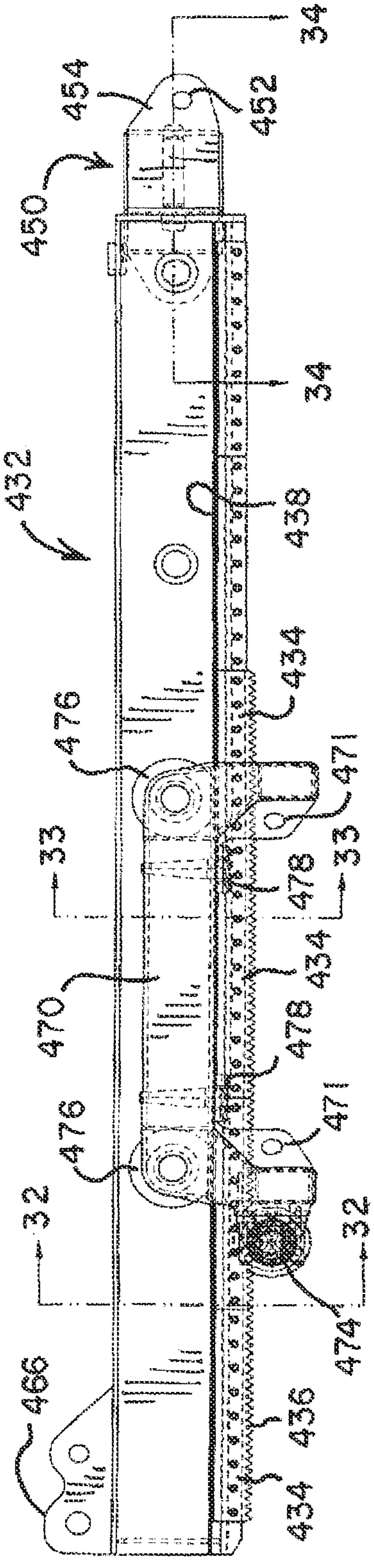
FIG. 31 is a side elevation view of the counterweight support frame of FIG. 30.
Figure 34:
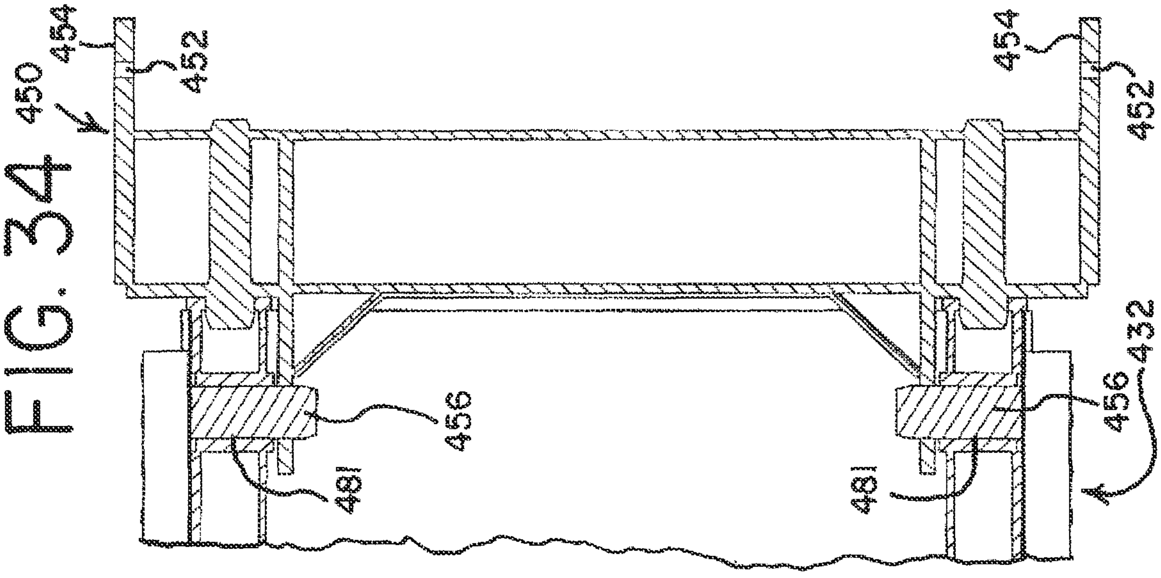
FIG. 34 is a cross-sectional view taken along line 34-34 of FIG. 31.

The term "rotating bed" refers to the upperworks of the crane (the part that rotates with respect to the carbody), but does not include the boom or any lattice mast structure. The rotating bed may be made up of multiple parts. For example, for purposes of the present invention, the adapter plate disclosed in U.S. Pat. No. 5,176,267 would be considered to be part of the rotating bed of the crane on which it is used. Also, if a crane is taken apart for transportation between job sites, the rotating bed, as that term is used herein, may be transported in more than one piece. Further, when a component, such as a counterweight support frame shown in FIG. 24, is attached to the remainder of the rotating bed in a manner that it stays fixed to the remainder of the rotating bed until completely removed, it can be considered to be part of the rotating bed.

The term "mast" refers to a structure that is attached to the rotating bed and is part of the boom hoist system. The mast is used to create an elevated point above the other parts of the rotating bed through which a line of action is established so that the boom hoist system is not trying to pull the boom up along a line nearly through the boom hinge pin during a set-up operation. In this regard, a gantry or some other elevated structure on the rotating bed can serve as a mast. The mast may be a fixed mast, a derrick mast or a live mast, depending on the embodiment of the invention. A live mast is one that has fixed length pendants between the mast and the boom during normal crane pick, move and set operations, and the angle of the boom is changed by changing the angle of the live mast. A fixed mast is designed to stay at a fixed angle with respect to the rotating bed during normal crane pick, move and set operations. (However, a small degree of movement may occur in a fixed mast if the balance of the counterweight moment and the combined boom and load moment change so that the mast is pulled backward by the counterweight. In that case mast stops are used to hold the mast up, but those mast stops may allow for a small degree of movement.) Of course, a mast which is fixed during normal crane operations may be pivotal during crane set-up operations. A derrick mast is one that has adjustable length boom hoist rigging between the mast and the boom, thus allowing the angle of the boom with respect to the plane of rotation of the rotating bed to be changed, but also is connected to the rotating bed in a pivotal fashion, and is connected to the rear of the rotating bed with an adjustable-length connection. A derrick mast may be used as a fixed mast by keeping the angle of the derrick mast with respect to the rotating bed constant during a pick, move and set operation.

The front of the rotating bed is defined as the portion of the rotating bed that is between the axis of rotation of the rotating bed and the position of the load when a load is being lifted. The rear of the rotating bed includes everything opposite the axis of rotation from the front of the rotating bed. The terms "front" and "rear" (or modifications thereof such as "rearward") referring to other parts of the rotating bed, or things connected thereto, such as the mast, are taken from this same context, regardless of the actual position of the rotating bed with respect to the ground engaging members.

The rear-most fixed portion of the rotating bed is defined as the part of the rotating bed that is designed to not move with respect to the rest of the rotating bed during normal crane pick, move and set operations, and that is furthest from the centerline of rotation between the rotating bed and the carbody.

The tail swing of the crane is used to signify the distance from the axis of rotation of the crane to the furthest away portion of the rotating bed (or other component that swings with the rotating bed). The tail swing is dictated by the portion of the crane that swings with the rotating bed but is behind the axis of rotation compared to the boom and which produces the broadest arc when the crane rotates about the rotatable connection between the carbody and the rotating bed. If a back corner of the rotating bed is 25 feet from the axis of rotation, the crane is said to have a tail swing of 25 feet, and when the crane is set up to be used, no obstructions can be present within that tail swing distance. In many cranes the fixed counterweight is mounted on the rear of the rotating bed, and constitutes the furthest away portion of the rotating bed, and thus dictates the tail swing of the crane. On cranes with a movable counterweight, often the counterweight moving backwards to compensate for a greater load will increase the tail swing of the crane. It must be remembered that the width of a part on the rear of a crane may affect the tail swing, because the distance to the axis of rotation of that part is a function of how far back on the rotating bed the part is, and how far to the side it is from the centerline of the crane.

The position of the counterweight unit is defined as the center of gravity of the combination of all counterweight elements and any holding tray to which the counterweights are attached, or otherwise move in conjunction with. All counterweights on a crane that are tied together so as to always move simultaneously are treated as a single counterweight unit for purposes of determining the center of gravity.

The term "upperworks counterweight" means the counterweight that is attached to and rotates with the rotating bed during crane pick, move and set operations. These may be stacks of individual counterweights. Often the upperworks counterweight is removable from the rest of the rotating bed. The term "upperworks counterweight unit" includes the upperworks counterweight and any tray that holds the individual counterweights. If the counterweight is movable, then "upperworks counterweight unit" includes elements that necessarily move with the counterweight. For example, in the embodiment shown in FIGS. 38-60, the upperworks counterweight unit includes the tray 533, the individual counterweights stacked on the tray, and the trolley 570, since it moves with the counterweight. The outer frame member 532 is not part of the upperworks counterweight unit because the counterweight unit can move independently of outer frame member 532.

The term "total weight of the crane" means the weight of the crane without a load on the hook, but includes the weight of all the components of the crane as it is set up for a particular lift. Thus the total weight of a mobile lift crane includes the weight of any counterweights that are included with the crane for the lift, as well as the normal crane components, such as the crawlers, carbody, any carbody counterweight, the rotating bed, any mast that is included, all of the rigging and hoist drums, and all other accessories on the crane that travel with the crane when the assembled crane moves over the ground.

The term "total weight of the crane equipped with a basic boom length" means the total weight of the crane when it is configured with a basic boom, which is defined below.

The top of the mast is defined as the furthest back position on the mast from which any line or tension member supported from the mast is suspended.

The combined boom and load moment is defined as the moment about the center of rotation of the rotating bed created by the dead weight of the boom, including the load hoist line and hook block, and any load suspended from the boom. If no load is on the load hoist line, then the combined boom and load moment will be the moment created by the dead weight of the boom. The moment takes into consideration the length of the boom, the boom angle and the load radius.

The movable ground engaging members are defined as members that are designed to remain engaged with the ground while the crane moves over the ground, such as tires or crawlers, but does not include ground engaging members that are designed to be stationary with respect to the ground, or be lifted from contact with the ground when they are moved, such as a ring on a ring supported crane and outriggers commonly found on truck mounted cranes.

The term "move" when referring to a crane operation includes movement of the crane with respect to the ground. This can be either a travel operation, where the crane traverses a distance over the ground on its movable ground engaging members; a swing operation, in which the rotating bed rotates with respect to the ground; or combinations of travel and swing operations.

The term "center of gravity of the boom" refers to the point about which the boom could be balanced. In calculating the center of gravity, all of the components attached to the boom structure that have to be lifted when the boom is initially raised, such as any sheaves mounted in the boom top for the load hoist line, must be taken into account.

Since booms may have various cross section shapes, but are designed with a centerline about which compressive loads are preferably distributed, the term "boom angle," means the angle of the centerline of the boom compared to horizontal.

The term "basic boom length" is the length of the shortest boom configuration that a crane manufacturer has specified as acceptable for use with a given model of crane.

The term "horizontal boom angle" refers to the boom being at a position where the boom is at or very close to a right angle with the direction of gravity. Likewise, the term "parallel to the ground" has the same meaning. Both of these terms have a meaning that takes into account small variations that occur in normal crane set-up and usage, but which a person of ordinary skill in the art would still think of as being horizontal. For example, when a boom is originally assembled on the ground before being lifted into an operational position, it is considered to be at a horizontal boom angle even if the ground is not exactly level or if parts of the boom are on blocks. The boom can be slightly above or slightly below an exact horizontal position depending on the blocking used, and still be considered to be at a horizontal boom angle and parallel to the ground.

Stability is mostly concerned with the crane as a whole being able to stay upright during crane lifting operations. Rear tipping stability for lift cranes that have an upperworks that rotates about a lowerworks may be expressed as a ratio of a) the distance between the center of gravity of the entire crane and the axis of rotation to b) the distance between the rear tipping fulcrum (typically the center of the last roller in the frame of a crawler for a crawler crane) and the axis of rotation. Thus, if the distance between the center of gravity of the entire crane and the axis of rotation were 3.5 meters, and the distance between the rear tipping fulcrum from the axis of rotation were 5 meters, the stability would be 0.7. The lower the value of this ratio, the more stable the crane is. Of course, the center of gravity of the crane is a function of the relative magnitudes and relative positions of the centers of gravity of the different crane components. Thus, the length and weight of the boom and the boom angle can greatly influence the location of the center of gravity of the entire crane, and thus the crane's stability, as can the weight and position of the counterweight unit. Backward tipping stability is of the greatest concern at high boom angles with no load on the hook. Raising the boom will decrease the rear tipping stability of a crane because the center of gravity of the boom is brought closer to the axis of rotation, and thus the center of gravity of the entire crane may be moved further behind the axis of rotation. The stability number is thus higher, as the numerator of the ratio increases, signifying that the crane is less stable.

When determining the center of gravity of the entire crane, it is often useful to determine contributions to that center of gravity by considering the weight of each individual crane component and the distance that the center of gravity of that component is from a point of reference, and then use a summation of the moments generated about that reference point by each crane component. The individual values in the summation are determined by multiplying the weight of the component by the distance between the center of gravity of that component and the reference point. For rear tipping stability calculations, it is common to use the axis of rotation as the reference point when making the summation to determine the center of gravity of the entire crane.

When considering the moment generated by the boom, it is common to separate the total boom weight, located at the center of gravity of the entire boom, into two separate weights, one at the boom butt called the "boom butt weight", and one at the boom top called the "boom top weight". The total weight of the boom will be equal to the boom top weight plus the boom butt weight. Those weights are determined by calculating what force would be generated if the boom were simply supported at each end, with the assumptions that the load hoist line reaches to but is not reeved through the boom top, and that the boom straps are connected. Thus, if one scale were placed under the boom butt at the point the boom connects to the rotating bed (the boom hinge point) and another scale were placed under the boom top at the point the boom top sheaves are connected, the weight on the two scales combined would of course be the weight of the boom, and the individual scale weights would be the boom butt weight and the boom top weight, respectively.

Figure 13:
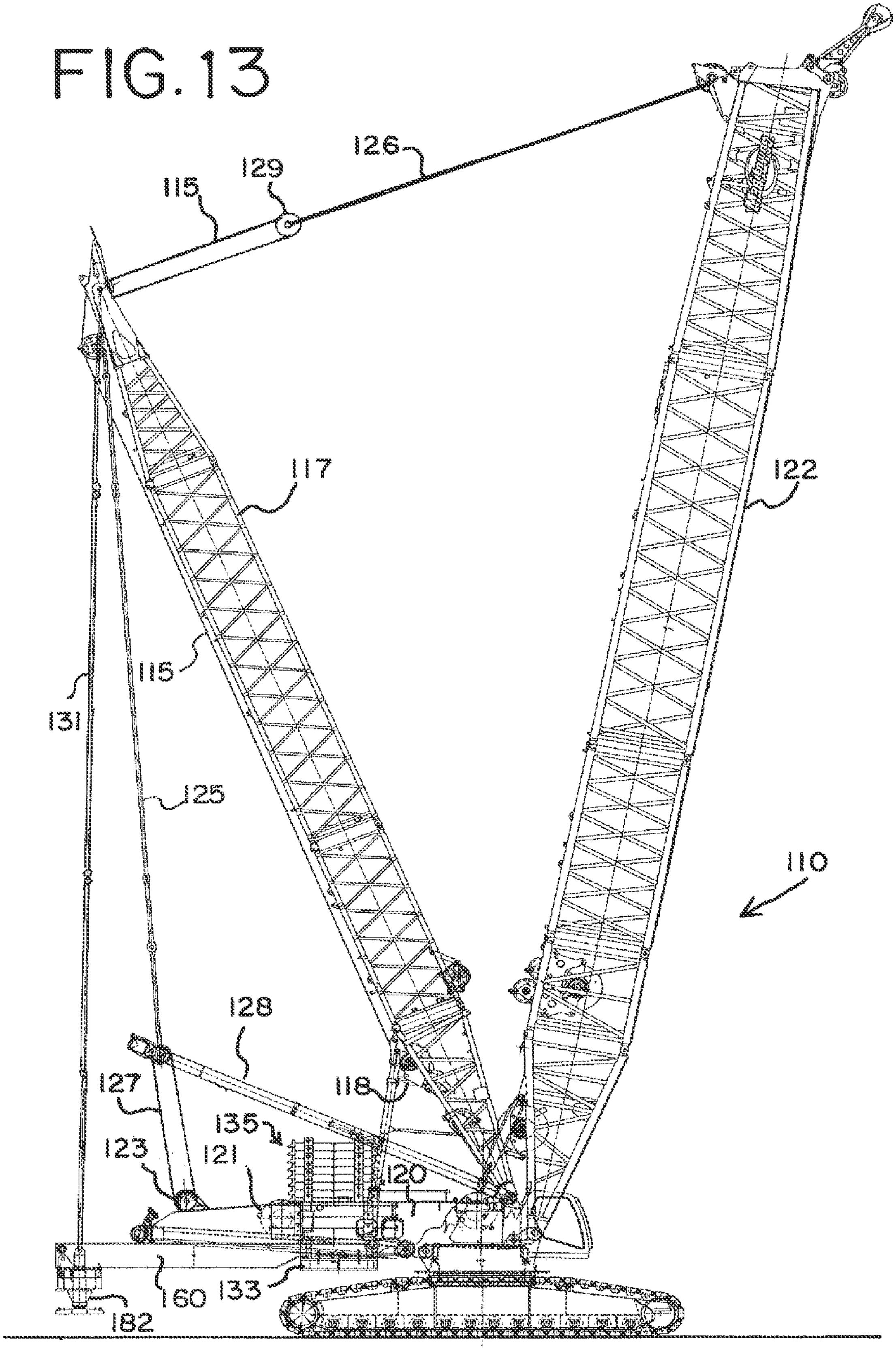
FIG. 13 is a side elevation view of the basic crane of FIG. 1 with the counterweight support beam and counterweights of FIGS. 10-12 attached, as well as a lattice mast and boom, with the counterweight support beam and counterweights both in a far forward position.
Figure 14:
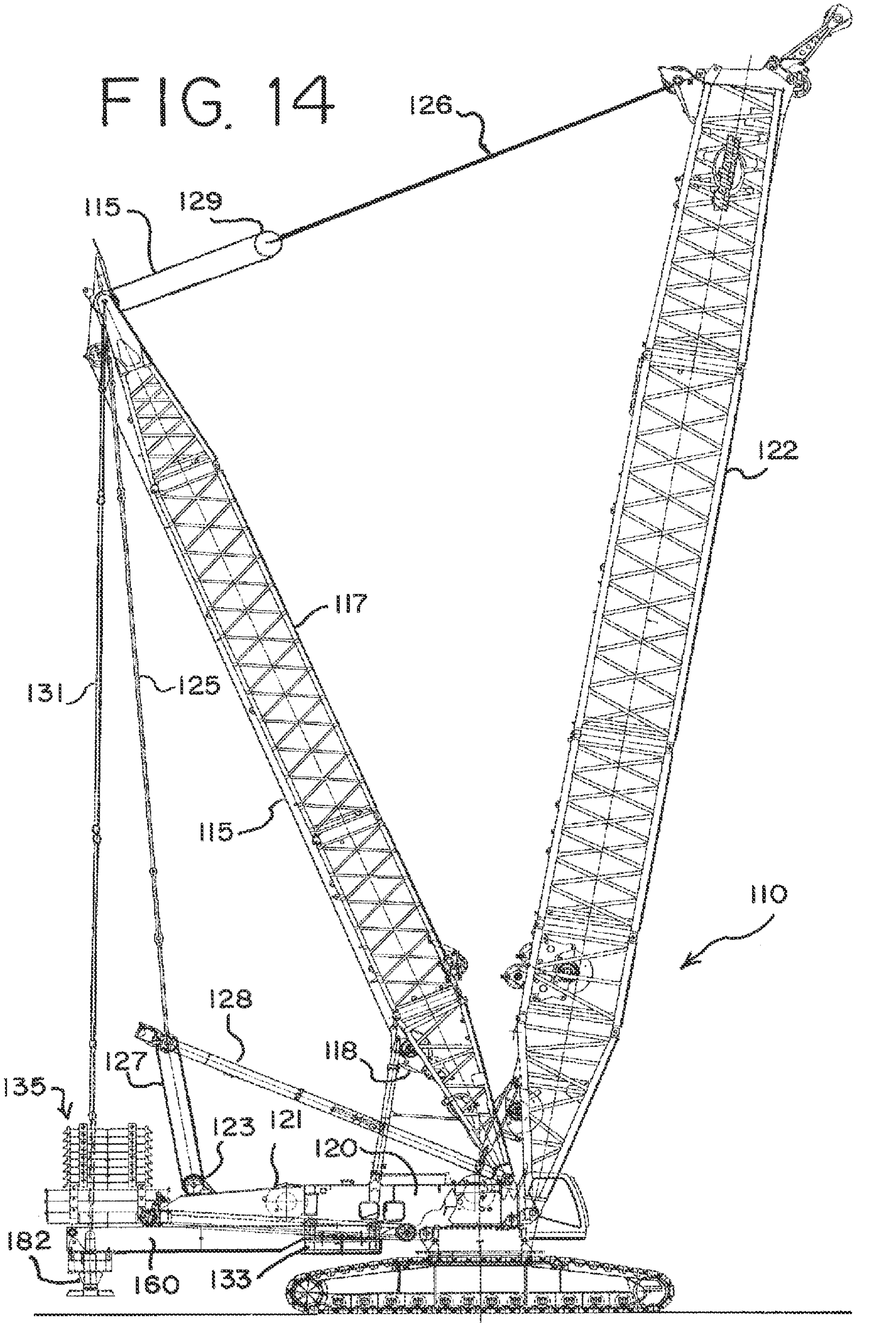
FIG. 14 is a side elevation view of the crane of FIG. 13 with the counterweight support beam in a forward position and the counterweight unit in a rearward position.
Figure 15:
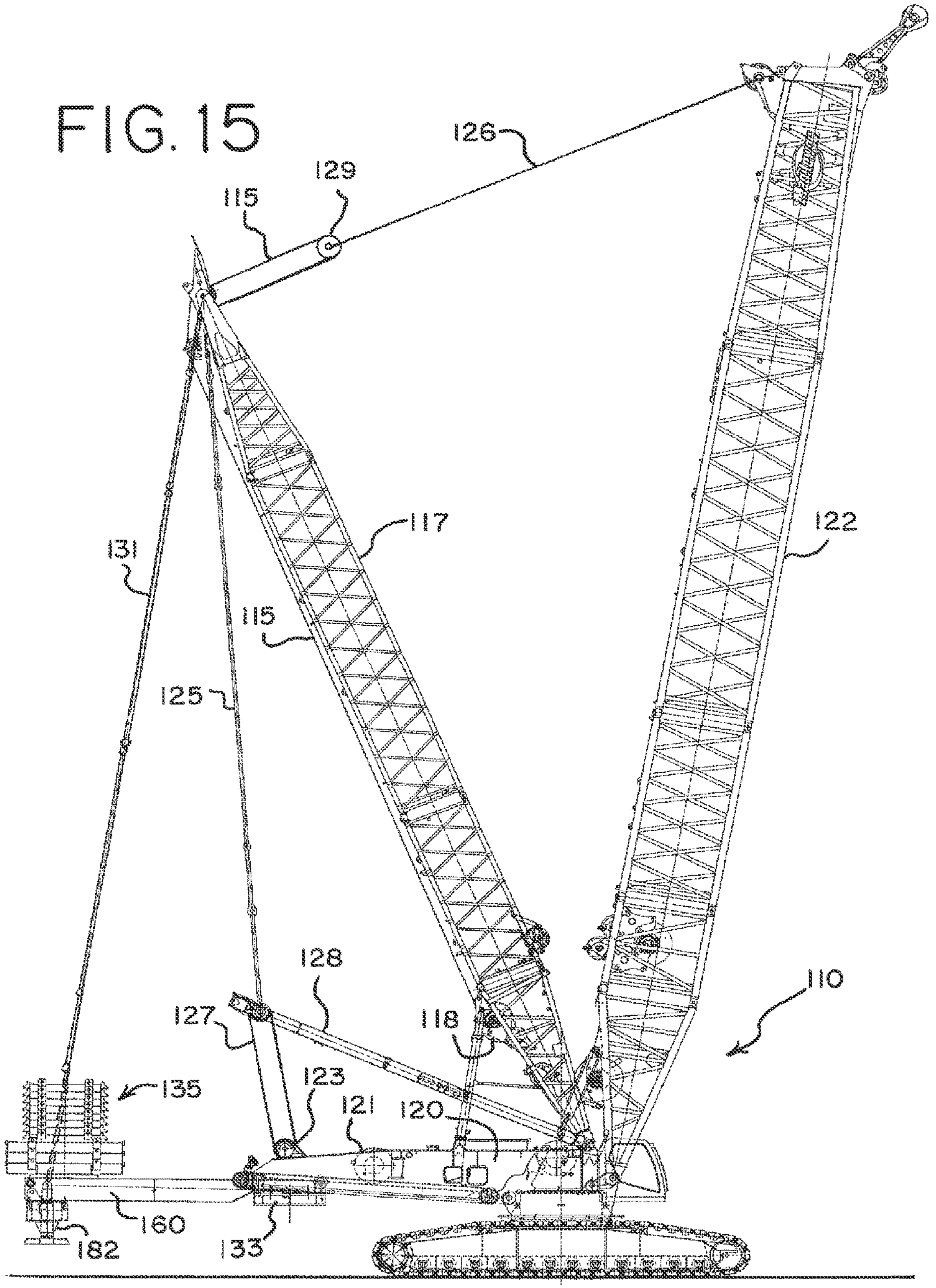
FIG. 15 is a side elevation view of the crane of FIG. 13 with the counterweight support beam in an extended position and the counterweight unit in a rearward position.
Figure 16:
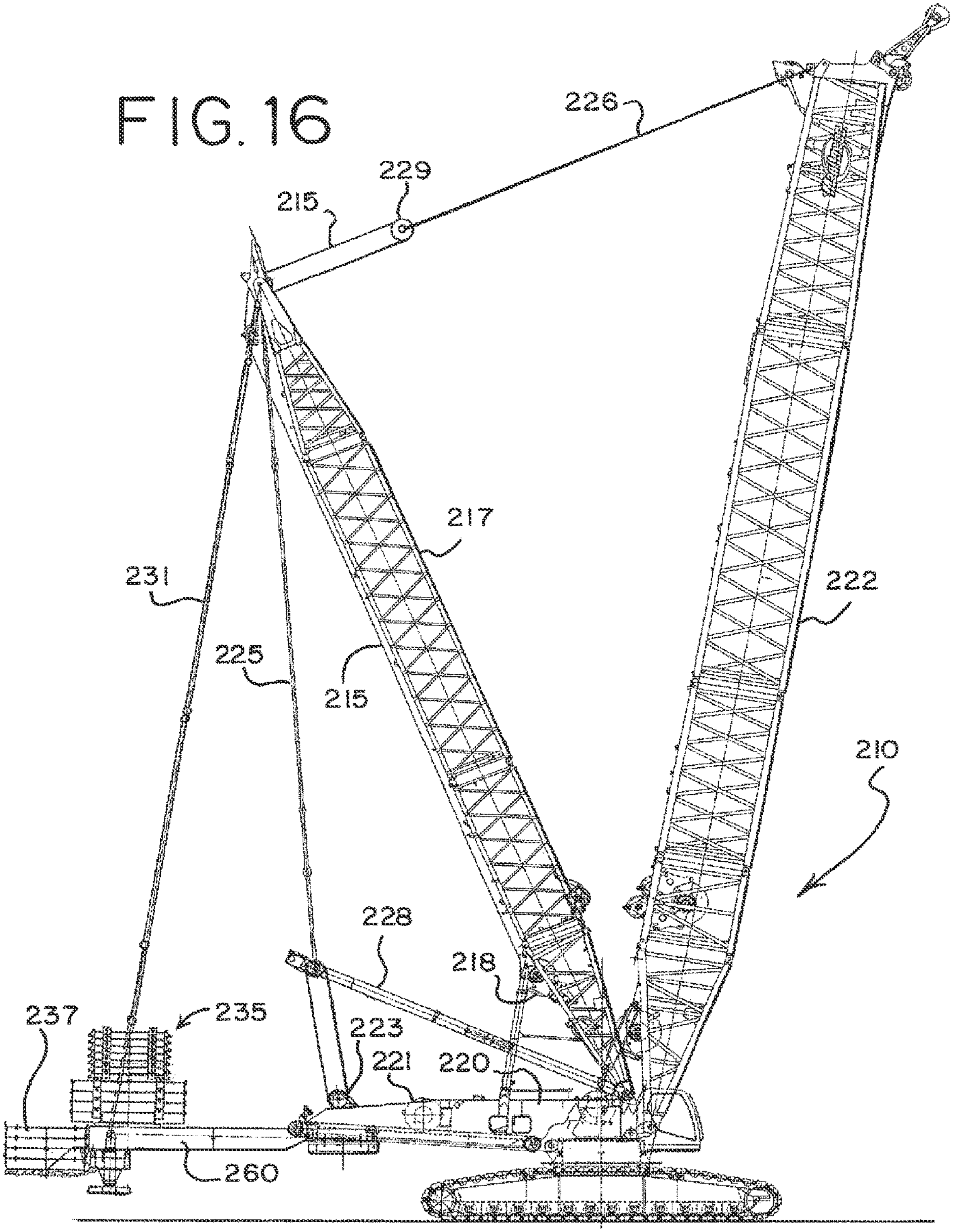
FIG. 16 is a side elevation view of a third embodiment of the invention, utilizing the crane of FIG. 13 with the counterweight support beam in an extended position, the counterweight unit in a rearward position and an additional auxiliary counterweight attached to the rear of the counterweight support beam.
Figure 61:
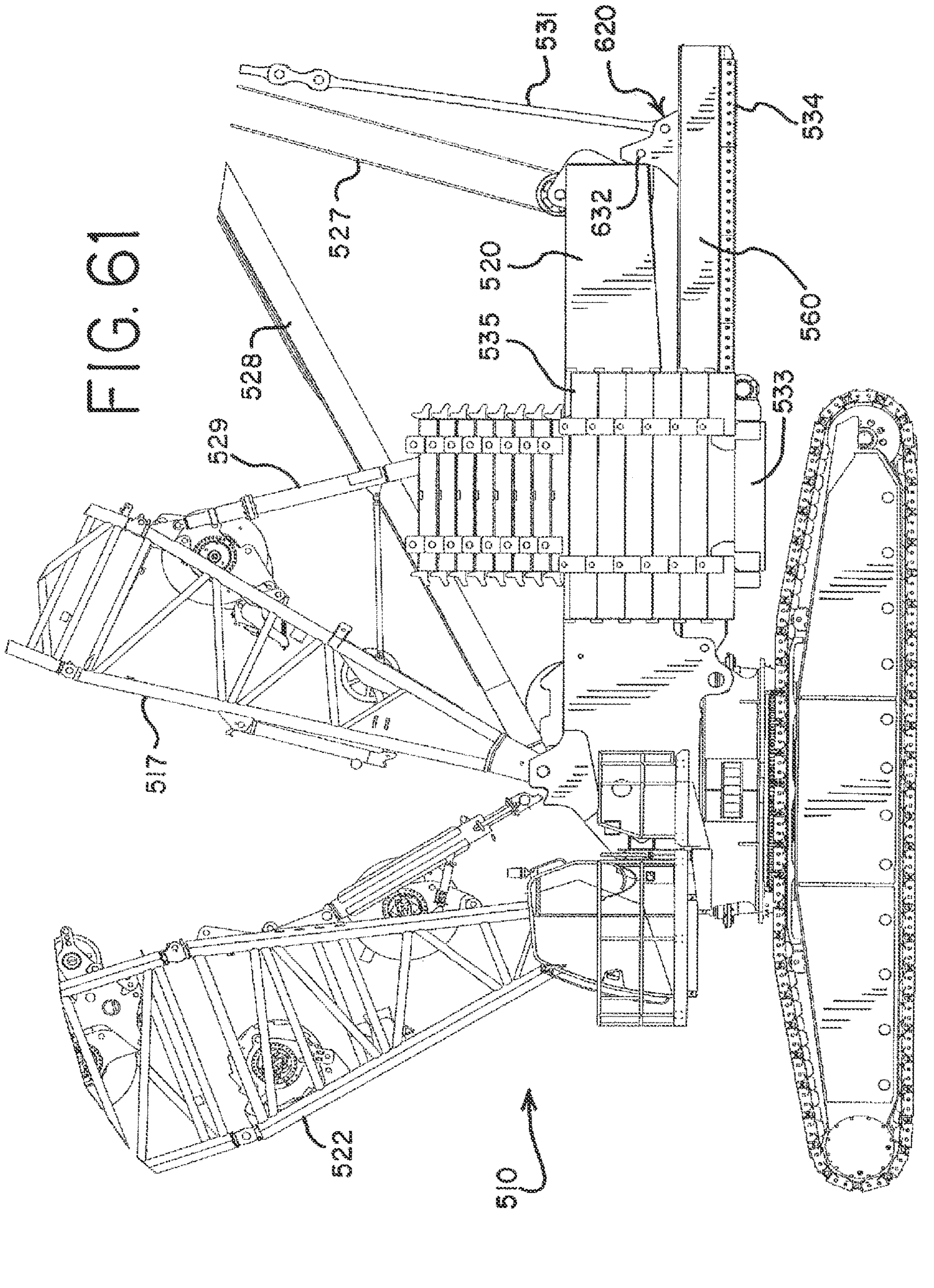
FIG. 61 is a side elevation view of the crane of FIG. 23 like FIG. 39, but showing alternate connection lugs rotating bed and the counterweight support beam.
Figure 62:
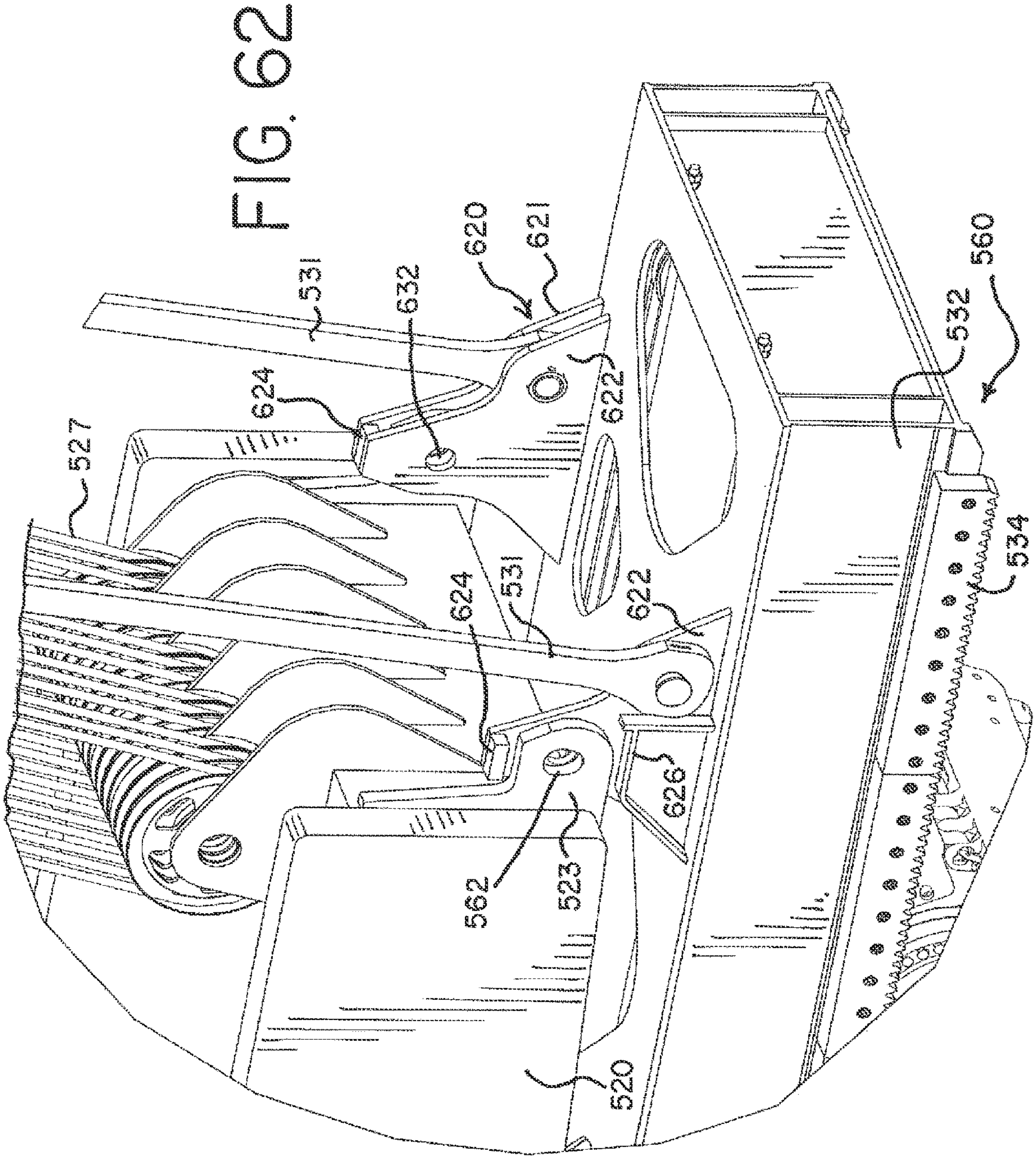
FIG. 62 is a rear perspective view of the crane of FIG. 61 showing the details of the alternate connection lugs, with the left side portion on the left lug of the counterweight support beam removed for sake of clarity.
Figure 63:
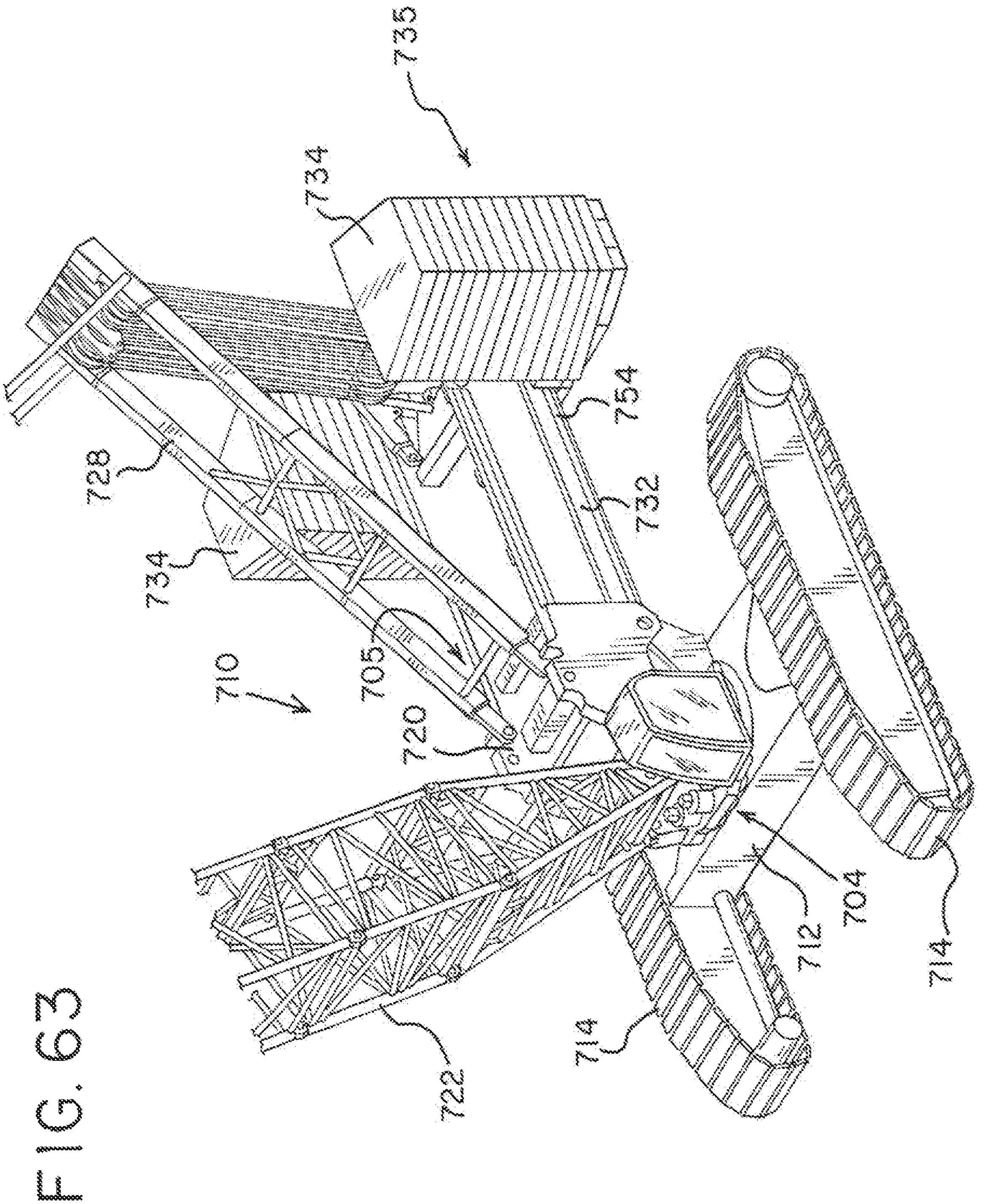
FIG. 63 is a partial front perspective view of a seventh embodiment of a mobile lift crane, using the main crane components of the crane of FIG. 10 but without the counterweight support beam and shown with the counterweight unit in a rearward position.
Figure 64:
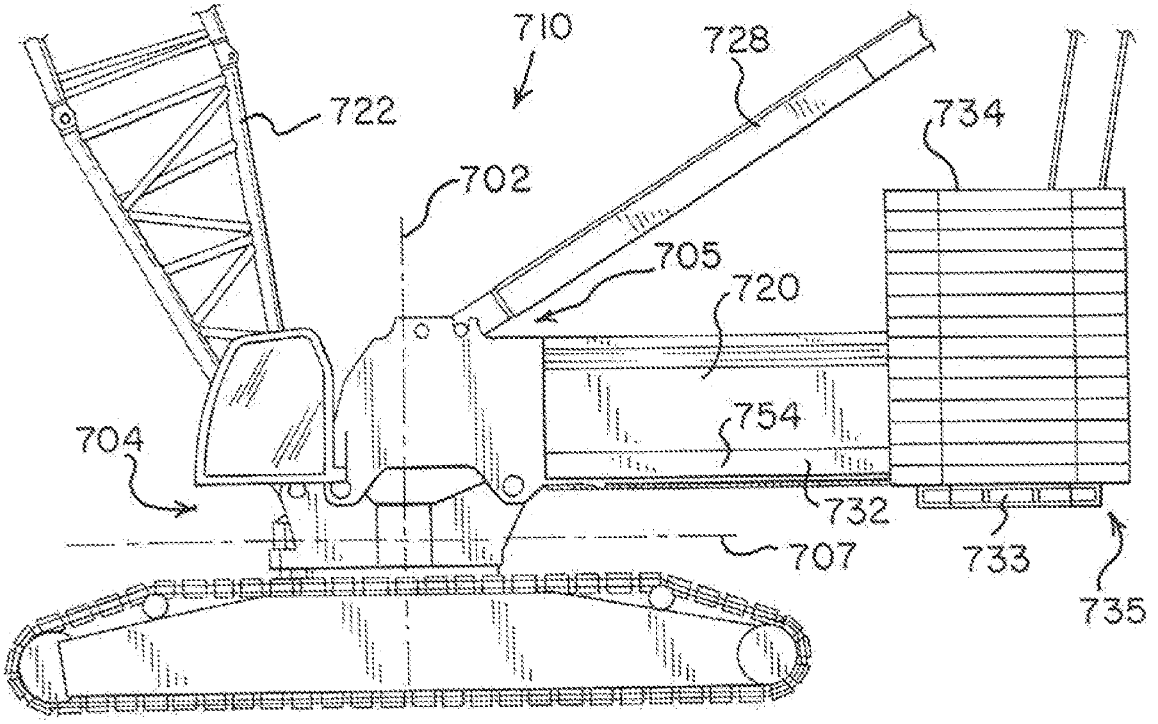
FIG. 64 is a partial side elevation view of the crane of FIG. 63.

Several embodiments of the invention are shown in the attached drawings. A first basic crane model with a first counterweight set-up configuration is shown in FIGS. 1-6. That same basic crane model can be set up with a second counterweight set-up configuration, as shown in FIGS. 13-15. A further modification of the first basic crane with a third counterweight set-up configuration is shown in FIG. 16. A second basic crane model with a first counterweight set-up configuration is shown in FIGS. 24-28. That same second basic crane model can be set up with a second counterweight set-up configuration, as shown in FIGS. 23 and 38-60. FIGS. 17-22 show a third basic crane model set up in a counterweight set-up configuration similar to the second counterweight set-up configurations of the other basic crane models. FIGS. 61-62 show an alternative design for the crane of FIGS. 23 and 38-60. The subsequent figures are the embodiments of the present application. FIGS. 63-72 show a fourth basic crane model set up in a first set-up configuration, and FIGS. 73-81 show the fourth basic model set up in a second set-up configuration. FIGS. 82-89 show an alternative to the fourth basic crane model set up in the second set-up configuration.

Figure 1:
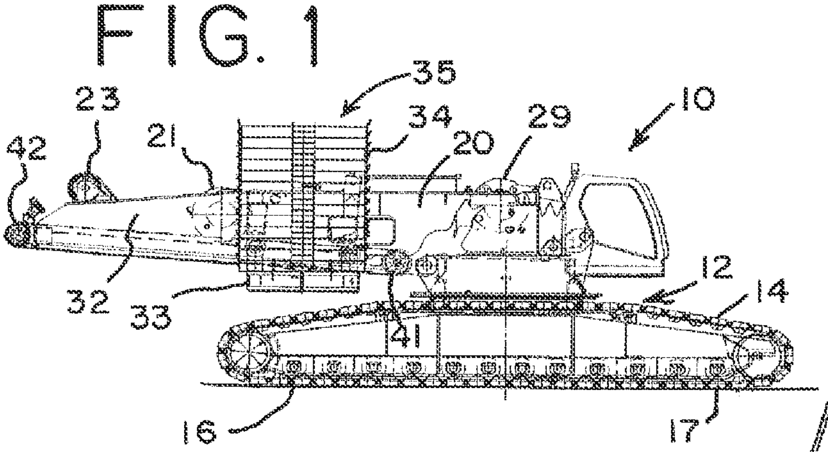
FIG. 1 is a side elevation view of a first embodiment of a mobile lift crane with a variable position counterweight, shown with the counterweight in a far forward position and, for sake of clarity, without a boom, live mast and other components traditionally found on a lift crane.

In the first embodiment, shown in FIGS. 1-6, the mobile lift crane 10 includes lowerworks, or carbody, 12 (best seen in FIGS. 4 and 5), ground engaging members 14 elevating the carbody 12 off the ground; and a rotating bed 20 rotatably connected to the carbody 12 about an axis 2 of rotation. The movable ground engaging members 14 on the crane 10 are in the form of two crawlers, only one of which can be seen from the side view of FIG. 1. (FIG. 1 is simplified for sake of clarity and does not show the boom and mast.) The other ground engaging member or crawler 14 can be seen in the perspective view of FIG. 4 and in the rear view of FIG. 5. In the crane 10, the movable ground engaging members 14 could be multiple sets of crawlers, such as two crawlers on each side, or other movable ground engaging members, such as tires. In the crane 10 the crawlers 14 provide front and rear tipping fulcrums for the crane. FIG. 1 shows the rear tipping fulcrum 16 and the front tipping fulcrum 17 of crane 10.

Figure 4:
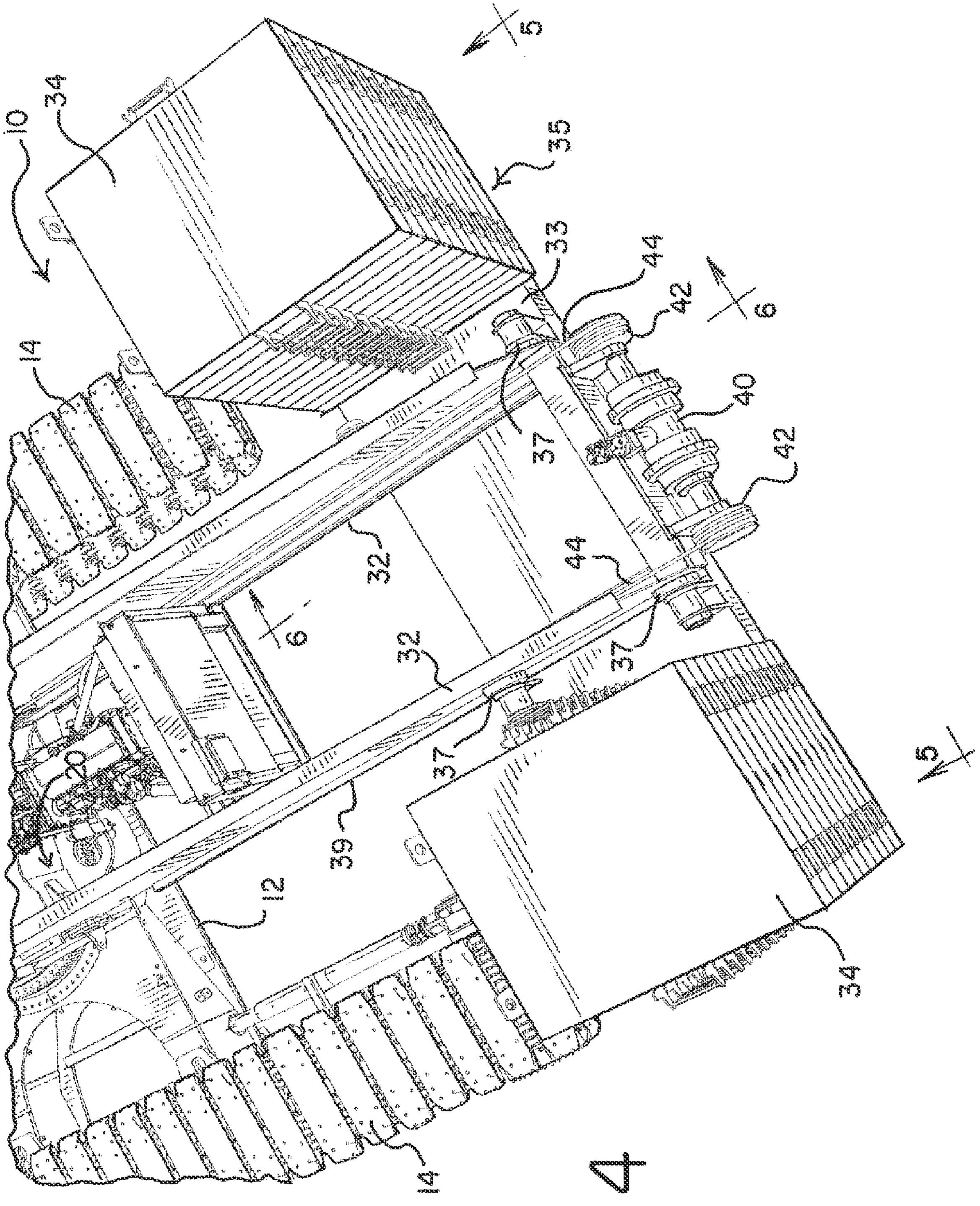
FIG. 4 is a partial perspective view of the crane of FIG. 1 with the counterweight in a rearward position.
Figure 5:
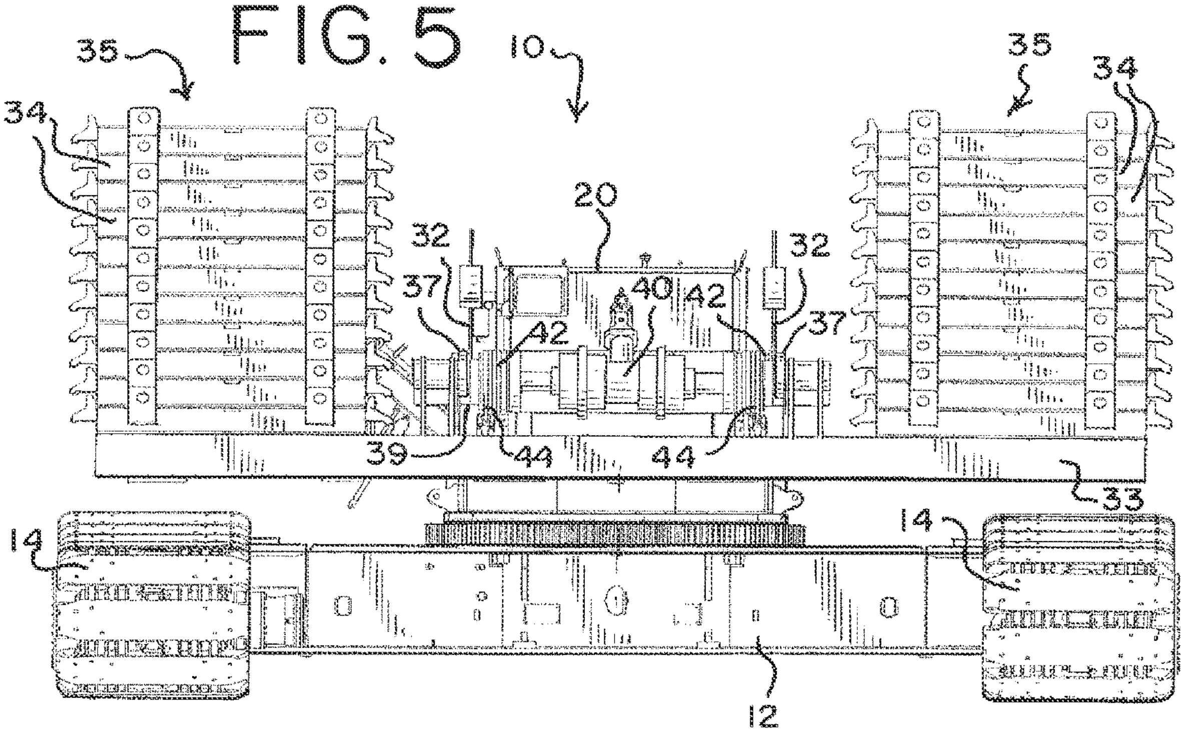
FIG. 5 is a partial rear elevation view of the crane of FIG. 1, taken along line 5-5 of FIG. 4.

The rotating bed 20 is mounted to the carbody 12 with a slewing ring, such that the rotating bed 20 can swing about an axis 2 with respect to the ground engaging members 14. The rotating bed 20 supports a boom 22 pivotally mounted in a fixed position on a front portion 4 of the rotating bed 20; a live mast 28 mounted at its first end 5 on the rotating bed 20; and a movable counterweight unit 35 having one or more counterweights or counterweight members 34 on a support member 33 in the form of a counterweight tray. The counterweights 34 in this embodiment are provided in two stacks of individual counterweight members on the support member 33 as shown in FIGS. 4 and 5. The rotating bed 20 has a rear-most fixed portion 3, which will be discussed in detail below. In the crane 10, since the counterweight unit 35 is movable, it does not constitute the rear-most fixed portion 3 of the rotating bed 20, even though when the counterweight unit 35 is moved to a rearward position the outside corner of the counterweights 34 will be the furthest from the rotational axis or centerline 2 and thus define the tail swing of the crane 10. However, when the counterweight unit 35 is pulled forward, as in FIG. 1, the rear-most fixed portion 3 of the rotating bed 20 will define the tail swing of the crane 10.

A boom hoist system 6 on crane 10 allows the angle of the boom 22 relative to a plane of rotation 7 of the rotating bed 20 to be changed. The plane of rotation 7 is typically perpendicular or nearly so to the axis of rotation 2. In the crane 10, the boom hoist system 6 includes rigging connected between the rotating bed 20, the mast 28, and the boom 22. The boom hoist system 6 includes a boom hoist drum 21 and boom hoist line 27 reeved between a sheave or sheave set 8 on a second end 9 of the mast 28 and a sheave or sheave set 23 on the rotating bed 20. The mast 28 is pivotally connected to the rotating bed 20, and the boom hoist rigging between the mast 28 and the boom 22 comprises only fixed length members or pendants 25 (only one of which can be seen in the side view) connected between the mast 28 and a top 11 of the boom 22. In addition, the boom hoist rigging includes multiple parts of boom hoist line 27 between sheaves 23 on the rotating bed 20 and sheaves 8 on the second end 9 of the mast 28. A boom hoist drum 21 on the rotating bed 20 can thus be used to take up or pay out boom hoist line 27, changing an angle A of the live mast 28 with respect to the rotating bed 20, which in turn then changes an angle B of the boom 22 with respect to the rotating bed 20. (Sheaves 23 and drum 21 are not shown on FIGS. 4-6 for sake of clarity.) Alternatively, the mast 28 could be used as a fixed mast during normal crane operation, with boom hoist line 27 running between an equalizer and the top of the mast 28 to change an angle C between the mast 28 and the boom 22.

Figure 2:
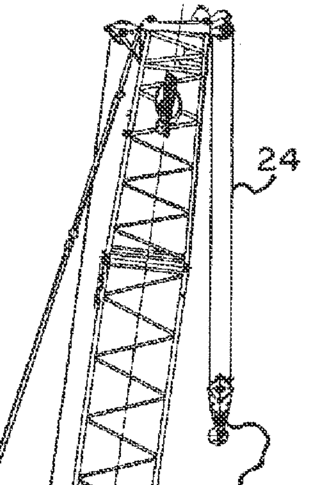
FIG. 2 is a side elevation view of the mobile lift crane of FIG. 1 with the counterweight in a mid-position, and showing the crane with its boom and live mast.
Figure 2:
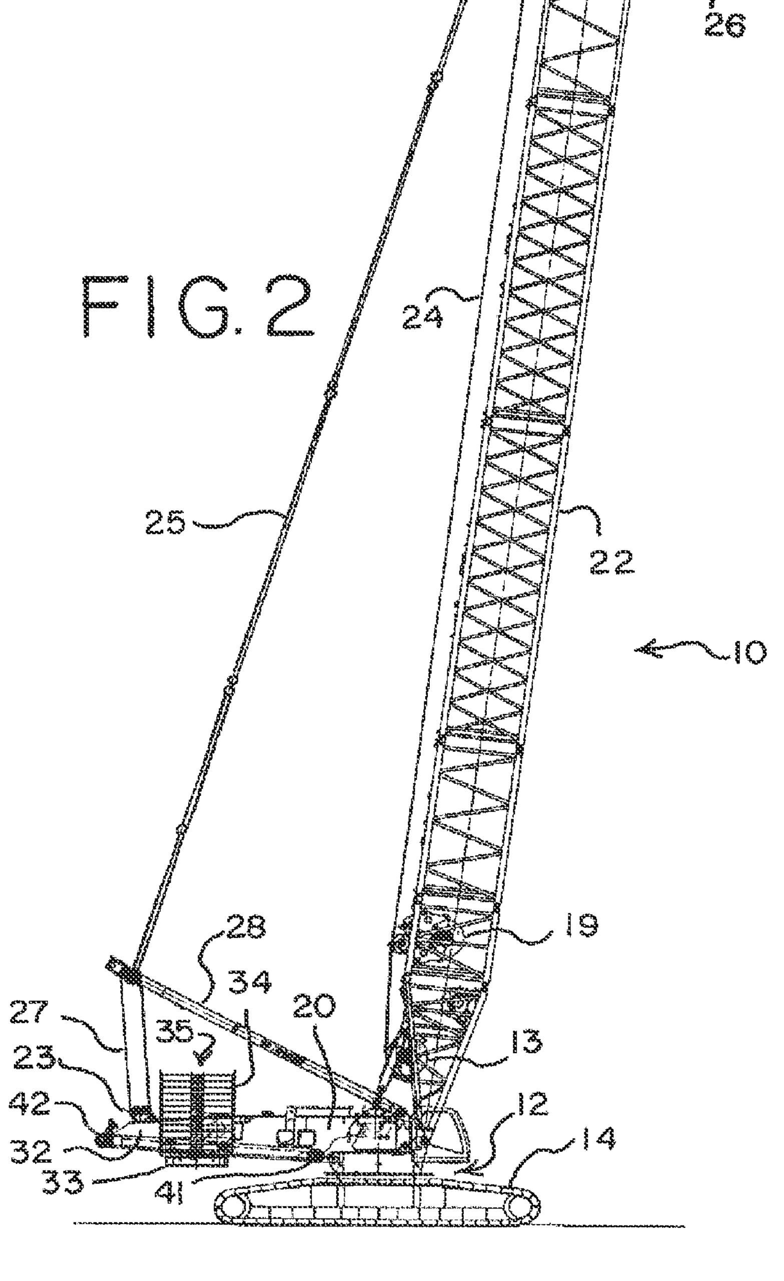
Figure 3:
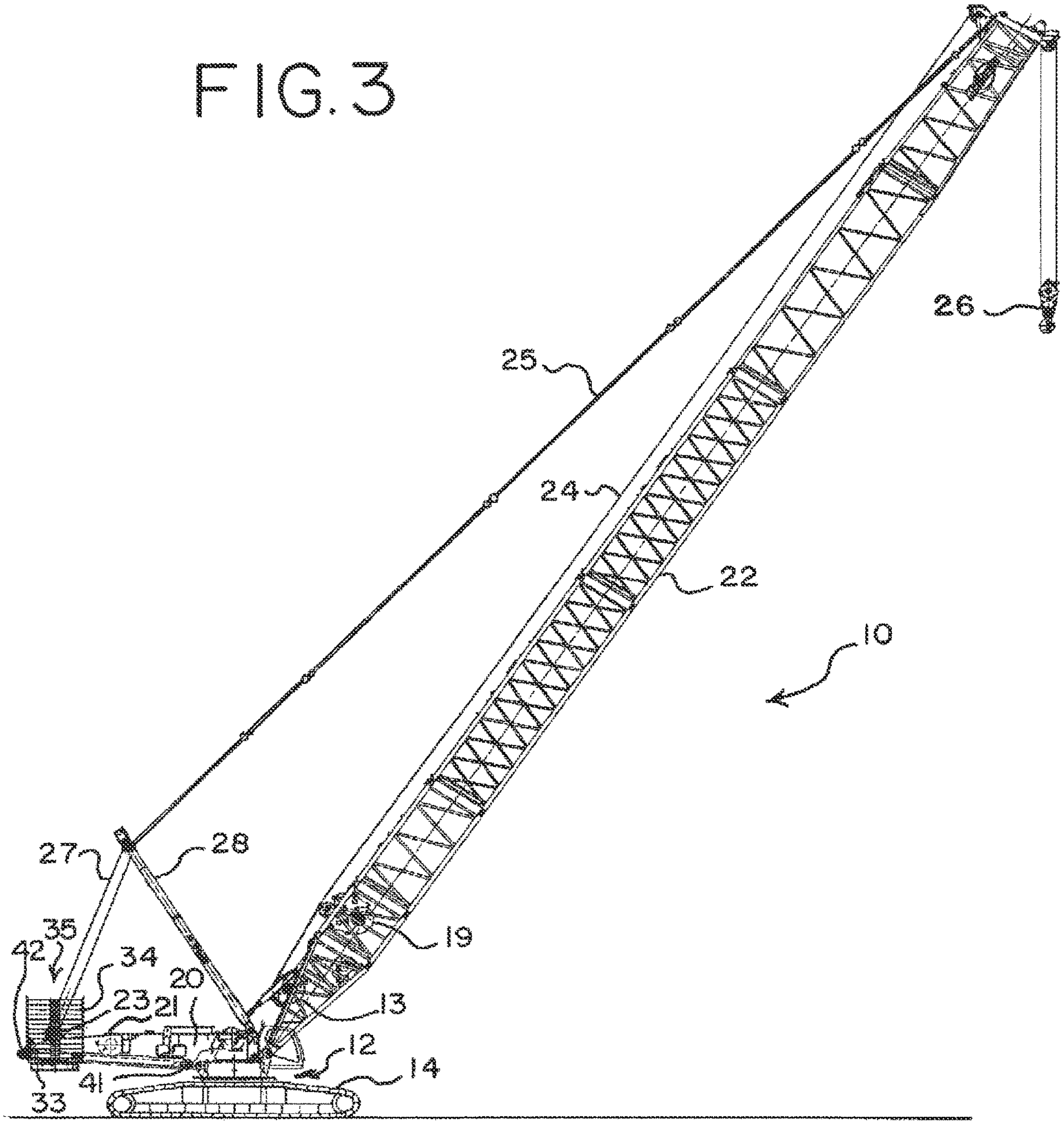
FIG. 3 is a side elevation view of the mobile lift crane of FIG. 1 with the counterweight in a rearward position.

A load hoist line 24 for handling a load extends from the boom 22, supporting a hook 26. The rotating bed 20 may also includes other elements commonly found on a mobile lift crane, such as an operator's cab 1 and whip line drum 29. The load hoist drum 13 for the hoist line 24 is preferably mounted on a boom butt 50 of the boom 22, as shown in FIG. 2. If desired, an additional hoist drum 19 can be mounted at a base 52 of boom 22, as shown in FIGS. 2 and 3. The boom 22 may comprise a luffing jib pivotally mounted to the top 11 of the main boom 22, or other boom configurations.

The counterweight unit 35 is movable with respect to the rest of the rotating bed 20. In the crane 10, the rotating bed 20 includes a counterweight support frame 32, preferably in the form of a welded plate structure best seen in FIGS. 4-6. The counterweight support frame 32 supports the movable counterweight unit 35 in a movable relationship with respect to the counterweight support frame 32. The counterweight support frame 32 comprises a sloped surface 54 provided by flanges 39 welded to the plate structure of the counterweight support frame 32. The counterweight unit 35 moves on the surface 54 if the flanges 39, the surface 54 sloping upwardly compared to the plane of rotation 7 between the rotating bed 20 and the carbody 12 as the counterweight support frame 32 extends rearwardly. The counterweight tray 33 includes rollers 37, which rest on the flanges 39. The rollers 37 are placed on the top of the counterweight tray 33 so that the counterweight tray 33 is suspended beneath the counterweight support frame 32. In the crane 10, the counterweight support frame 32 constitutes the rear-most fixed portion 3 of the rotating bed 20. Further, the counterweight support frame 32 is supported on the rotating bed 20 in a fashion such that the moment generated by the counterweight unit 35 acts on the rotating bed 20 predominantly, and in this case only, through the counterweight support frame 32.

Figure 6:
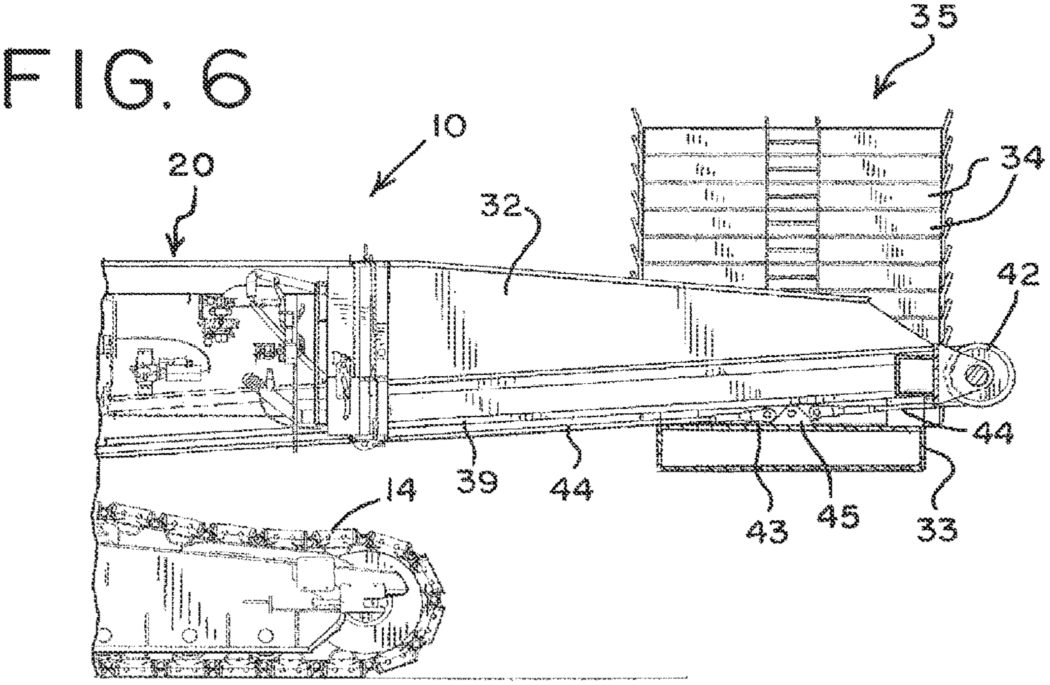
FIG. 6 is a partial side elevation view of the crane of FIG. 1, taken along line 6-6 of FIG. 4.

A counterweight movement system 58 is connected between the rotating bed 20 and the counterweight unit 35 so as to be able to move the counterweight unit 35 toward and away from the boom 22. The counterweight unit 35 is movable between a position where the counterweight unit 35 is in front of the rear-most fixed portion 3 of the rotating bed 20, such that the tail swing of the crane 10 is dictated by the rear-most fixed portion 3 of the rotating bed 20 (as seen in FIGS. 1 and 2), and a position where the counterweight unit 35 dictates the tail swing of the crane 10 (as seen in FIGS. 3, 4 and 6). Preferably the counterweight unit 35 can be moved to a point so that the center of gravity of the counterweight unit 35 is near to, and preferably even in front of, the rear tipping fulcrum 16 the crane 10, as seen in FIG. 1.

The counterweight movement system 58 in the crane 10 comprises a counterweight unit movement device 60 made up of a drive motor 40 and a drum 42 on a rear 62 of the counterweight support frame 32. Preferably the counterweight unit movement device 60 has two spaced apart identical assemblies, and thus the drive motor 40 drives two drums 42, best seen in FIG. 4. Each assembly of the counterweight unit movement device 60 further includes a flexible tension member 44 that passes around a driven pulley and idler pulley 41 (best seen in FIG. 1). The driven pulleys are provided by drums 42. The flexible tension member 44 may be a wire rope as shown, or a chain. Of course, if a chain is used, the driven pulley will be a chain drive. Both ends of each flexible tension member 44 are connect to the counterweight tray 33 as seen in FIG. 6, so that the counterweight unit 35 can be pulled both toward and away from the boom 22. Preferably this is accomplished by having an eye 43 on both ends of the flexible tension member or wire rope 44 and holes in a connector 45 on the counterweight tray 33, with pins through the eyes 43 and the connector 45. Thus, in the crane 10, the counterweight unit movement device 60 is connected between the counterweight support frame 32 and the counterweight unit 35.

While FIG. 1 shows the counterweight unit 35 in its most forward position, FIG. 2 shows the counterweight unit 35 in a mid-position, and FIGS. 3-6 show the counterweight unit 35 in its most rearward position, such as when a large load is suspended from the hook 26, or the boom 22 is pivoted forward to extend a load further from the rotating bed 20. In each of these positions, the crane 10 is configured such that during crane operation, when the counterweight unit 35 is moved to compensate for changes in the combined boom and load moment, the weight of the counterweight unit 35 is transferred to the rotating bed 20 only through the counterweight support frame 32. The phrase "only through the counterweight support frame" is meant to differentiate prior art cranes where a tension member between the top of a mast and the counterweight provides at least some of the support for the counterweight, such as the arrangement disclosed in U.S. Pat. No. 4,953,722, which has a backhitch pendant 149 connecting the rear of the support beam 84 to mast 54, and thus supports the beam 84 from both ends. In the crane 10, all of the counterbalance force provided by the counterweight unit 35 is transmitted through the counterweight support frame 32 to the rest of the rotating bed 20. Meanwhile, the boom hoist rigging transfers forward tipping forces from the boom 22 and any load on the hook to the rear of the rotating bed.

With the preferred embodiment of the present invention, the movable counterweight unit 35 is never supported by the ground during normal operations. The crane can performing a pick, move and set operation with a load wherein the movable counterweight unit 35 is moved toward and away from the front portion 4 of the rotating bed 20 by operating hydraulic motor 40 and drums 42 to move the counterweight unit 35 during the crane operation to help counterbalance the load, but the counterweight unit 35 is never supported by the ground other than indirectly by the movable ground engaging members 14 on the carbody 12. Further, the movable counterweight unit 35 is the only functional counterweight on the crane 10. The carbody 12 is not provided with any separate functional counterweight. The fact that the counterweight unit 35 can be moved very near to the centerline of rotation 2 of the crane 10 means that the counterweight does not produce a large backward tipping moment in that configuration, which would otherwise require the carbody to carry additional counterweight. The phrase "not provided with any separate functional counterweight" is meant to differentiate prior art cranes where the carbody is specifically designed to include significant amounts of counterweight used to prevent backward tipping of the crane. For example, on a standard model 16000 crane from the Manitowoc Crane Company, the carbody is provided with 120,000 pounds of counterweight, and the rotating bed is provided with 332,000 pounds of upperworks counterweight. With cranes of the present invention, all 452,000 pounds of that counterweight could be used in the movable counterweight unit 35, and no functional counterweight added to the carbody 12.

The positioning of the counterweight unit 35 may be manually controlled, or the crane 10 can further comprise a sensor (not shown) that senses a condition that is related to a need to move the counterweight unit 35. In its simplest form, the counterweight unit 35 may be moved in response to a change of boom angle B. In a more sophisticated manner, the combined boom and load moment can be used to control movement of the counterweight unit 35, so that either a change in boom angle B, or picking up a load, will result in movement of the counterweight unit 35. If desired, this can be accomplished automatically if a computer processor is coupled with the sensor. In that case, a computer processor controlling the counterweight movement system 58, and possibly other operations of the crane, receives signals from the sensor indicating the condition (such as the boom angle B), or some other function indicative of the condition (such as tension in the boom hoist rigging, which is indicative of the combined boom and load moment, or the moment of the boom 22 and load about the hinge pins of the boom 22) and controls the position of the counterweight unit 35. The position of the counterweight unit 35 may be detected by keeping track of the revolutions of drums 42, or using a cable and reel arrangement (not shown). The crane 10 using such a system will preferably comprise a computer readable storage medium comprising programming code embodied therein operable to be executed by the computer processor to control the position of the counterweight unit 35.

FIGS. 13-15 show a second embodiment of a crane 110 of the present invention. In addition to the live mast 128, this embodiment includes a fixed position mast 117, which has some disadvantages compared to the crane 10 since the fixed mast structure requires additional components to be delivered to a job site, and the fixed mast 117 sometimes requires clearing potential obstacles when the crane is repositioned. However, the addition of the fixed mast 117 allows the crane 110 to be equipped with other features that increase the lifting capacity of the crane 110. As with crane 10, in crane 110 the carbody 112 is not provided with any separate functional counterweight, and the movable counterweight unit 135 is never supported by the ground during crane pick, move and set operations other than indirectly by movable ground engaging members 114 on the carbody 112.

Crane 110 is made with the same basic crane structure of crane 10, but has an additional counterweight support beam 160 added to it, as well as the fixed mast 117. Instead of a fixed mast, a derrick mast could also be used. The counterweight support beam 160 is shown in FIGS. 7-12. The counterweight support beam 160 is moveably connected to the rotating bed 120. The crane 110 utilizes the same structure that moved the counterweight unit 35 on crane 10 as a counterweight support beam movement device, as explained below. Thus, in this embodiment, the counterweight movement system includes a counterweight unit movement device and a counterweight support beam movement device. This counterweight support beam movement device is connected between the counterweight support beam 160 and the rotating bed 120 such that the counterweight support beam 160 can be moved with respect to the length of the rotating bed 120 away from the rotational connection of the rotating bed 120 and the carbody 112, and extended rearwardly of the rear-most fixed portion 103 of the rotating bed 120. As will be explained more fully below, the movement of the counterweight support beam 160 is generally horizontal and in a direction in line with the length of the counterweight support beam 160. The crane 110 further includes a tension member 131 connected between the fixed mast 117 and the counterweight support beam 160. The counterweight unit 135 is supported on the counterweight support beam 160 in a movable relationship with respect to the counterweight support beam 160. The counterweight unit movement device is connected between the counterweight support beam 160 and the counterweight unit 135 so as to be able to move the counterweight unit 135 toward and away from the boom 122. The counterweight unit 135 may be moved to and held at a position in front of the top 170 of the fixed mast 117 and moved to and held at a position rearward of the top 170 of the fixed mast 117.

Crane 110 includes a live mast 128 just like live mast 28 on crane 10. However, after being used to erect the fixed mast 117, live mast 128 is thereafter disabled from changing position. To change the angle B' of the boom 122 on crane 110, boom hoist line 115 travels up from boom hoist drum 118 mounted at the base 192 of mast 117 and is reeved with multiple parts of line between an equalizer 129 and sheaves 174 on the top 170 of fixed mast 117. The equalizer 129 is connected to the boom 122 by fixed length pendants 126. Fixed length pendants 125 connect the top 170 of fixed mast 117 to the top 175 of mast 128. The rigging 127 connects the top 175 of mast 128 to the rotating bed 120 through the sheave set 123 and drum 121, just as with boom hoist line 27, sheave 23 and drum 21 on crane 10. Although they are not shown, crane 110 also includes a load hoist line and hook block, just like those used in crane 10.

Figure 12:
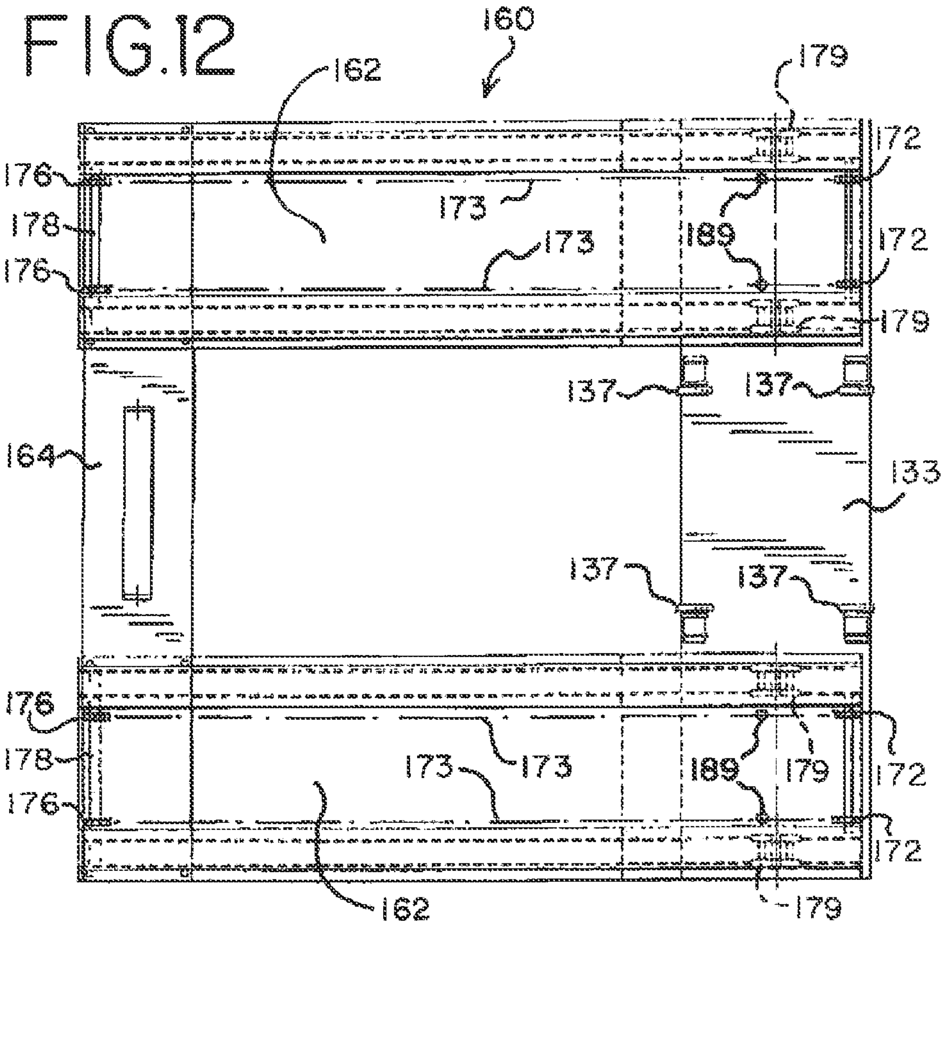
FIG. 12 is a top plan view of the counterweight support beam of FIG. 10.

The counterweight support beam 160 is preferably in a U-shape when viewed from above and made from two spaced apart side members 162 connected together in the rear 177 by a cross member 164, best seen in FIG. 12. The front ends 171 of the two side members 162 connect to a counterweight tray 133, which is moveably mounted on a counterweight support frame 132 on rotating bed 120 using drive motor and drums on the rear of the rotating bed. This is identical to the way counterweight tray 33 is moveably mounted to the rotating bed 20 on crane 10. The counterweight support beam 160 is further equipped with a counterweight unit movement device connected between the counterweight support beam 160 and the counterweight unit 135. The counterweight unit 135 can thus move with the counterweight support beam 160 and move relative to the counterweight support beam 160.

Figure 7:
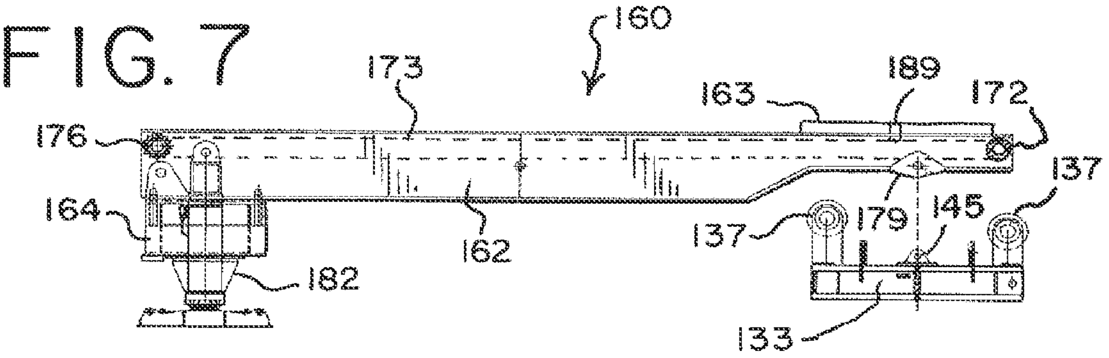
FIG. 7 is a side elevation view of a counterweight support beam that may be attached to the counterweight tray used on the crane of FIG. 1 to produce a second embodiment of a mobile lift crane of the present invention.
Figure 8:
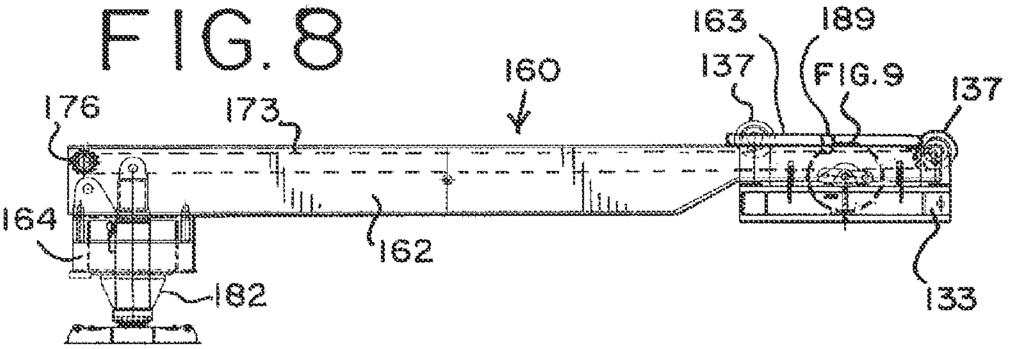
FIG. 8 is a side elevation view of the counterweight support beam of FIG. 7 attached to the counterweight tray.

The tension member 131 is preferably in the form of two sets of connected flat straps (only one set of which can be seen in the side views) attached adjacent the top 170 of the fixed mast 117 and supports the rear of counterweight support beam 160 in a suspended mode. Since the tension member 131 has a fixed length, when the counterweight support beam 160 is moved rearwardly, the rear of the counterweight support beam 160 will move in an arc, with the center of arc being the point where tension member 131 connects to the top 170 of fixed mast 117. Thus, the rear 181 of the counterweight support beam 160 will rise slightly as it moves rearwardly. In order to keep the counterweight support beam 160 as nearly horizontal as possible, the surface 154 on the flange 139 on the counterweight support frame 132 on the rotating bed 120 on which the counterweight tray 133 moves rearwardly comprises a sloped surface that slopes upwardly compared to the plane of rotation 107 between the rotating bed 120 and the carbody 112 as the counterweight support beam 160 is moved rearwardly, just as flanges 39 provided the sloped surface 54 on crane 10. The path could be machined to match the arc shape traveled by the rear of the counterweight support beam 160 but, more practically, a simple straight sloped path is used that provides the same raise in height that the rear 181 of the counterweight support beam 160 will experience as the counterweight support beam 160 is moved to its full rearward position. The movement of the counterweight support beam 160 is thus generally horizontal and in a direction in line with the length of the counterweight support beam 160. As can best be seen in FIGS. 7 and 10, rollers 137 are mounted on the counterweight tray 133 such that the rear rollers 137 are at a higher elevation than the front rollers 137 (FIG. 7). In this manner the counterweight tray 133 will itself remain horizontal while the rollers 137 ride on the sloped surface 154. Support feet 182 are included as a safety feature and can provide support to the counterweight unit 135 in the event of a sudden release of the load. However, the support feet 182 are sized so that when the counterweight support beam 160 is in its most forward positioned (FIG. 13), and thus support feet 182 are at their closest point to the ground in the arc created by pivoting the tension member 131 about the top 170 of the mast 117, the support feet 182 will still be an adequate distance off the ground (such as 15 inches) so that during normal crane operation, the support feet 182 never contact the ground during pick, move and set operations.

The same structure that moved the counterweight tray 33 in crane 10 is used to move the counterweight tray 133 in crane 110. However, since the counterweight support beam

160 is now connected to the counterweight tray 133, the counterweight support beam 160 now moves with the counterweight tray 133. The counterweight support beam 160 can thus be moved to and secured at infinitely variable positions with respect to the rotating bed 120, meaning that it can be moved a small amount, a large amount (up to the maximum movement of the counterweight tray 133 on the counterweight support frame 132 on the rotating bed 120), or any position there between. This is different than other extendable counterweight support surfaces, such as counterweight support beam 84 in U.S. Pat. No. 4,953,722, which can be extended and secured at only two different operational positions.

Figure 9:
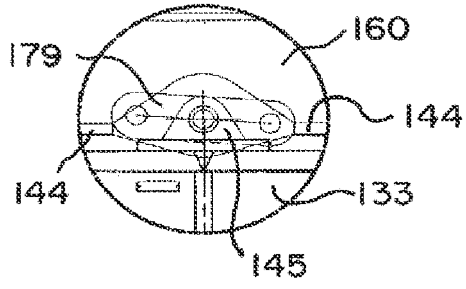
FIG. 9 is an enlarged side elevation view of the attached portion of the counterweight support beam of FIG. 7 attached to the counterweight tray.

FIG. 9 shows the connection of the counterweight support beam 160 to the counterweight tray 133. The individual counterweights 134 are not placed on the counterweight tray 133 in this embodiment. Lugs 179 welded to the side members 162 connect to connectors 145 on the counterweight tray 133. Just as in crane 10, a flexible tension member 144, such as wire rope, is used to move the counterweight tray 133, and an eye 143 on both ends of wire rope 144 and holes in connector 145 on the counterweight tray 133 are pinned together with pins through the eyes 143 and the connector 145. At the same place, a pin holds each lug 179 to a connector 145. When the motor turns the drums, similar to the motor 40 and the drums 42 in FIG. 4, on the end of the counterweight support frame 132 on the rotating bed 120, the wire rope 144 is moved back and forth, just as wire rope 44 moves on crane 10. The wire rope 144 pulls the connector 145 on the counterweight tray 133. At the same time, the counterweight support beam 160 is moved by the connection between lugs 179 and connector 145.

The sections of counterweight 134 are stacked on the counterweight support beam 160 in a movable manner, such as on sliding wear pads (not shown). When they are in a far forward position, the counterweight sections 134 are directly above the counterweight tray 133, to which the counterweight support beam 160 is attached. In this position, just like the counterweight 35, counterweight unit 135 is movable to a position in front of the rear-most fixed portion 103 of the rotating bed 120. In addition, since the counterweight beam 160 can move rearwardly, and the counterweight unit 135 can move rearwardly on the counterweight support beam 160, the counterweight unit 135 may be moved to and held at a first position in front of the top 170 of the fixed mast 117, and moved to and held at a second position rearward of the top 170 of the fixed mast 117.

Figure 10:
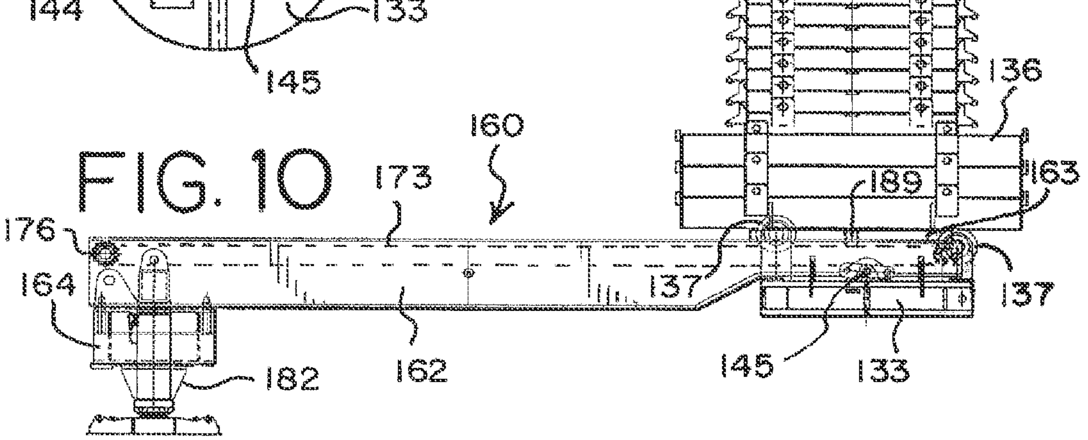
FIG. 10 is a side elevation view of the counterweight support beam of FIG. 7 attached to the counterweight tray with individual counterweights stacked on the counterweight support beam.
Figure 11:
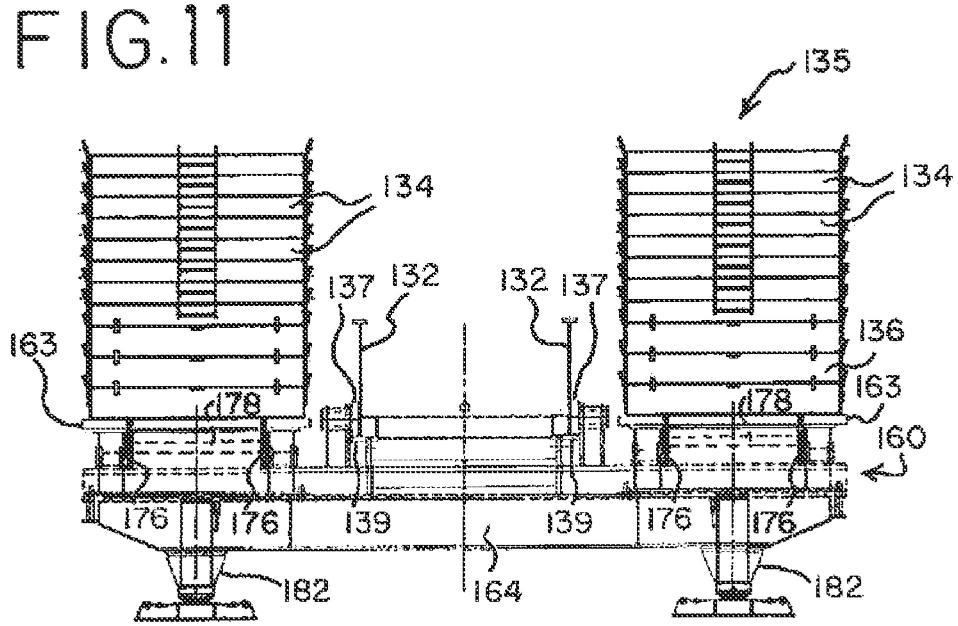
FIG. 11 is a rear elevation view of the counterweight support beam and counterweights of FIG. 10.

In this embodiment, the counterweight unit 135 comprises two stacks 138 of counterweights 134 that are moved simultaneously. The stacks 138 each contain the same counterweights 134 that are identical to the counterweights 34 used on crane 10, plus some additional counterweights 136 (FIGS. 10 and 11). The stacks 138 each rest on a counterweight base plate 163, which in turn includes slider pads (not shown) that allow the counterweight base plates 163 to move on a surface 165 of the side members 162. Rollers could be used instead of slider pads. Pairs of flexible tension members 173, each of which may be a chain as shown, or a wire rope, passes around driven pulleys in the form of chain drives 176 and idler pulleys 172 (best seen in FIGS. 7 and 12). The chain drives 176 are mounted on shafts 178 which are turned by a gear box and motor (not shown). The counterweight base plates 163 each attach to these flexible tension members 173 through a connector 189 so that the stacks 138 of counterweight 134 and/or 136 can be pulled both toward and away from the front 180 of the counterweight support beam 160, and hence toward and away from the boom 122. (The counterweight base plates 163 are not shown in FIG. 12 for sake of clarity).

The crane 110 thus includes a movable a counterweight support beam 160 and a movable counterweight unit 135 supported on the movable counterweight beam 160; the movable counterweight unit 135 can be moved independently on the counterweight support beam 160. The angle B' of the boom 122 can be changed, or the crane 110 can perform a pick, move and set operation with a load, wherein the movable counterweight unit 135 is moved toward and away from the front portion 104 of the rotating bed 120 during the boom angle change or pick, move and set operation to help counterbalance the combined boom and load moment. At first, the counterweight unit 135 will move to the rear 103 of the crane 110 while the counterweight support beam 160 remains in its forward position. If further counterbalancing is needed, the counterweight unit 135 can stay on the counterweight support beam 160 during the change in the combined boom and load moment, and the counterweight support beam 160 and counterweight unit 135 can move together to counterbalance the crane 110 as the boom angle B' is lowered or a load is picked up. As with crane 10, the counterweight unit 135 can move forward of the rear-most fixed portion 103 of the rotating bed 120.

Since the basic crane 10 can be used to make the crane 110, one aspect of the invention is a crane that is configured to be set up with two different counterweight set-up configuration options. The first counterweight set-up configuration option (crane 10) has a first counterweight movement system that can move a first counterweight unit 35 between a first position (FIG. 1) and a second position (FIG. 3). For the crane 10, the counterweight set-up configuration is a counterweight unit 35 directly supported on the counterweight support frame 32 and the counterweight unit movement device is connected so as to move the counterweight unit with respect to the counterweight support frame. The first position is a position in which the first counterweight unit is as near as possible to the axis of rotation for the first counterweight set-up configuration option. This constitutes a first distance from the axis of rotation. The second position is a position in which the first counterweight unit is as far as possible from the axis of rotation for the first counterweight set-up configuration option. This distance constitutes a second distance from the axis of rotation.

The second counterweight set-up configuration option (crane 110) has a second counterweight movement system that can move a second counterweight unit 135 between a third position (FIG. 13) and a fourth position (FIG. 15). For the crane 110, the counterweight set-up configuration includes a counterweight support beam 160 moveably connected to the counterweight support frame 132 and a counterweight unit 135 supported on the counterweight support beam, with the counterweight support beam movement device connected so as to move the counterweight support beam with respect to the counterweight support frame. The third position is a position in which the second counterweight unit is as near as possible to the axis of rotation for the second counterweight set-up configuration option. This constitutes a third distance from the axis of rotation. The fourth position is a position in which the second counterweight unit is as far as possible from the axis of rotation in the second counterweight set-up configuration option, which constitutes a fourth distance from the axis of rotation.

As evident from the drawings, for the cranes 10 and 110, the fourth distance is greater than the second distance, and the difference between the third and fourth distances is greater than the difference between the first and second distances. The difference between the third and fourth distances is preferably at least 1.5 times as large as the difference between the first and second distances, more preferably at least 2.0 times as large as the difference between the first and second distances, and even more preferably at least 2.5 times as large as the difference between the first and second distances. With preferred embodiments of the invention, the difference between the third and fourth distances is at least 3 times as large as the difference between the first and second distances.

In the preferred embodiment, the crane 10 includes a counterweight tray 33 movably supported on the counterweight support frame 32, and in the first option counterweights 34 are stacked directly on the counterweight tray 33, and in the second option the counterweight support beam 160 is attached to the counterweight tray 133 and counterweights 134 are stacked on the counterweight support beam 160. The second counterweight unit will typically have more counterweight boxes included than the first counterweight unit. However, while not shown in the depicted embodiments, the first and second counterweight units could be identically configured.

FIG. 16 shows a third embodiment of a crane, which is just like crane 110 in all but one feature. Thus, the reference numbers used on the parts of crane 210 in FIG. 16 are identical to the parts of the crane 110 with the same reference number with an addend of 100. For example, boom 222 on crane 210 is just like boom 122 on crane 110. Likewise boom hoist line 215, fixed mast 217, boom hoist drum 218 rotating bed 220, drum 221, sheave set 223, fixed length pendants 225, fixed length pendants 226, mast 228, equalizer 229, tension member 231 and counterweight unit 235 are just the same as their respective components in crane 110. The one difference is that crane 210 includes an additional counterweight unit 237 attached to the rear of the counterweight support beam 260. The additional counterweight unit 237 is used to further increase the lifting capacity of the basic crane 10. It moves in and out with the counterweight support beam 260.

Figure 16A:
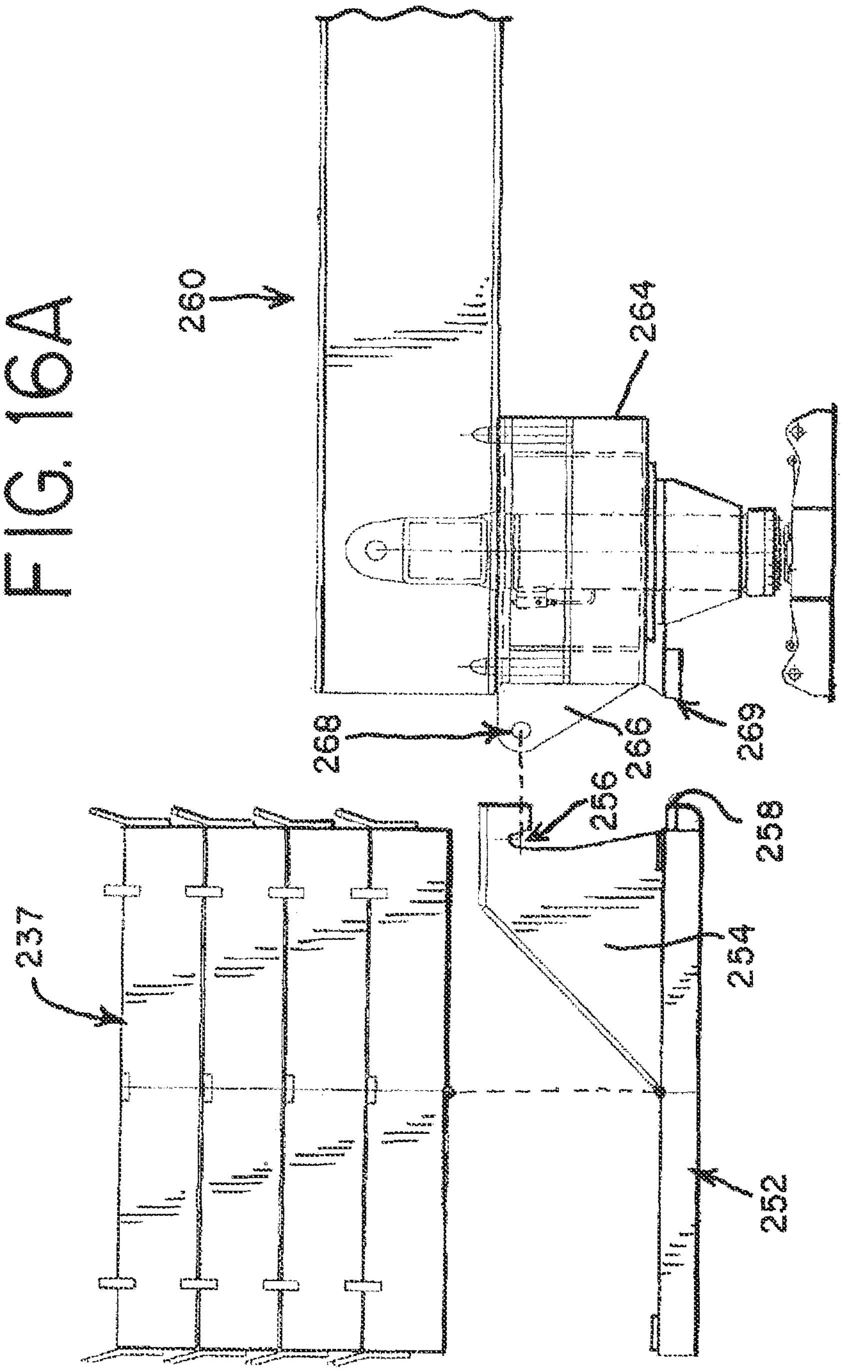
FIG. 16A is an enlarged, partially exploded view of the auxiliary counterweight attached to the crane of FIG. 16.
Figure 18:
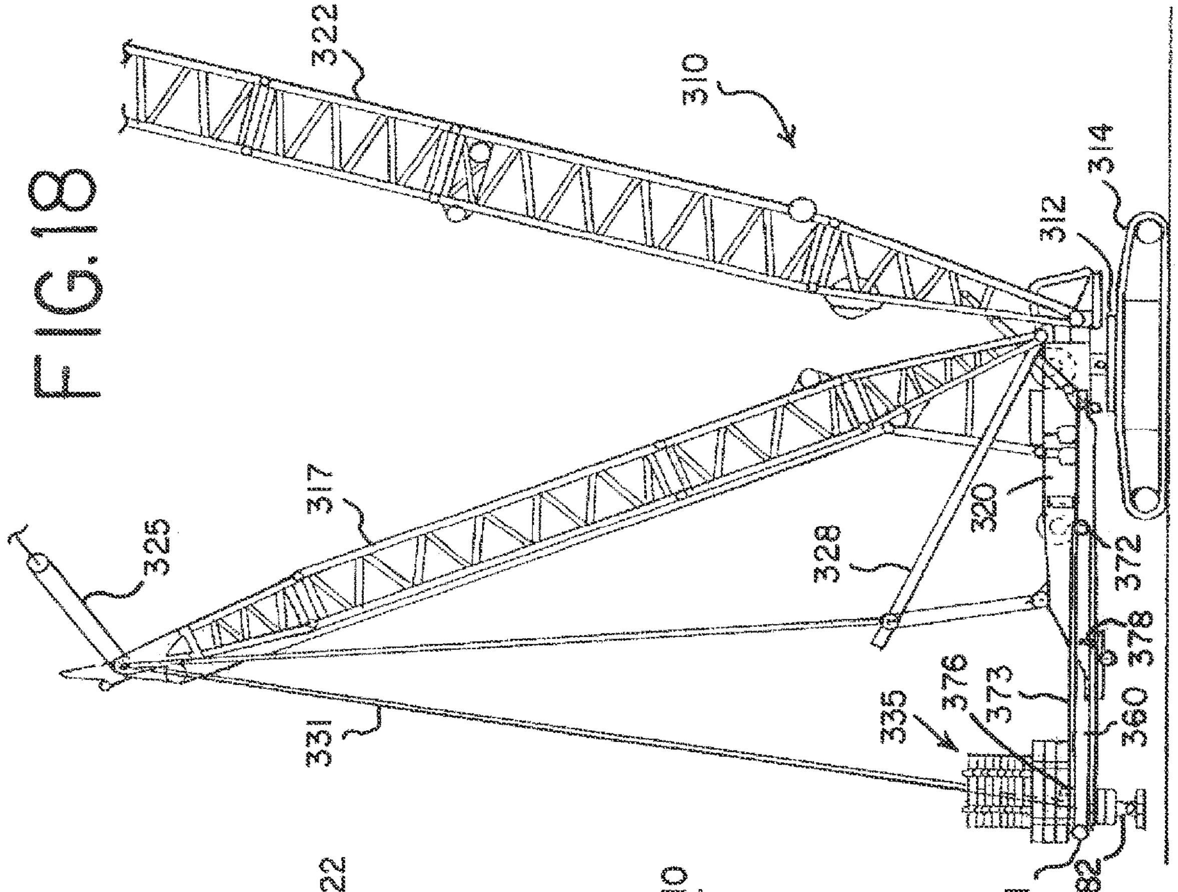
FIG. 18 is a side elevation view of the crane of FIG. 17 with the counterweight support beam and the counterweight unit in a rearward position.

FIG. 16A shows the details of how the auxiliary counterweight attaches to the counterweight support beam 260. The auxiliary counterweight 237 includes a counterweight tray 252 which is provided with side panels 254 that include a hook element 256. The counterweight support beam 260 is provided with extensions 266 on the rear side of cross member 264, which mate with the side panels 254. A pin 268 in each extension 266 allows the hook element 256 to connect to the pin 268 from above, with a rotational engagement. Each side panel 254 is provided with a bearing surface 258, and the cross member 264 is provided with a bearing surfaces 269 that abut the surfaces 258 to limit the rotation when the hook element 256 is engaged with the pin 268, thus holding the tray 252 in a connected, horizontal position.

FIGS. 17-22 show a fourth embodiment of a crane 310 of the present invention. Like crane 110, crane 310 includes a carbody 312, crawlers 314, rotating bed 320, boom 322, boom hoist rigging 325, a fixed mast 317, a live mast 328, a counterweight support beam 360 moveably connected to the rotating bed such that the rear portion of the counterweight support beam 360 can be extended away from the rotational connection of the rotating bed 320 and the carbody 312, a counterweight unit 335 supported on the counterweight support beam 360 in a movable relationship with respect to the counterweight support beam, and a tension member 331 connected between the fixed mast and the counterweight support beam 360. The primary difference between the crane 310 compared to crane 110 is that the counterweight support beam 360 has a telescoping feature, and the front portion of it stays connected to the rotating bed 320 at the same place all of the time. Further, the counterweight movement system simultaneously causes the counterweight unit 335 to move rearwardly with respect to the counterweight support beam 360 as the telescoping rear portion of the counterweight support beam moves rearwardly with respect to the rotating bed 320. In this fashion a single driving device moves the counterweight support beam with respect to the rotating bed (serving as the counterweight support beam moving device) and moves the counterweight unit with respect to the counterweight support beam (serving as a counterweight unit movement device).

Figure 17:
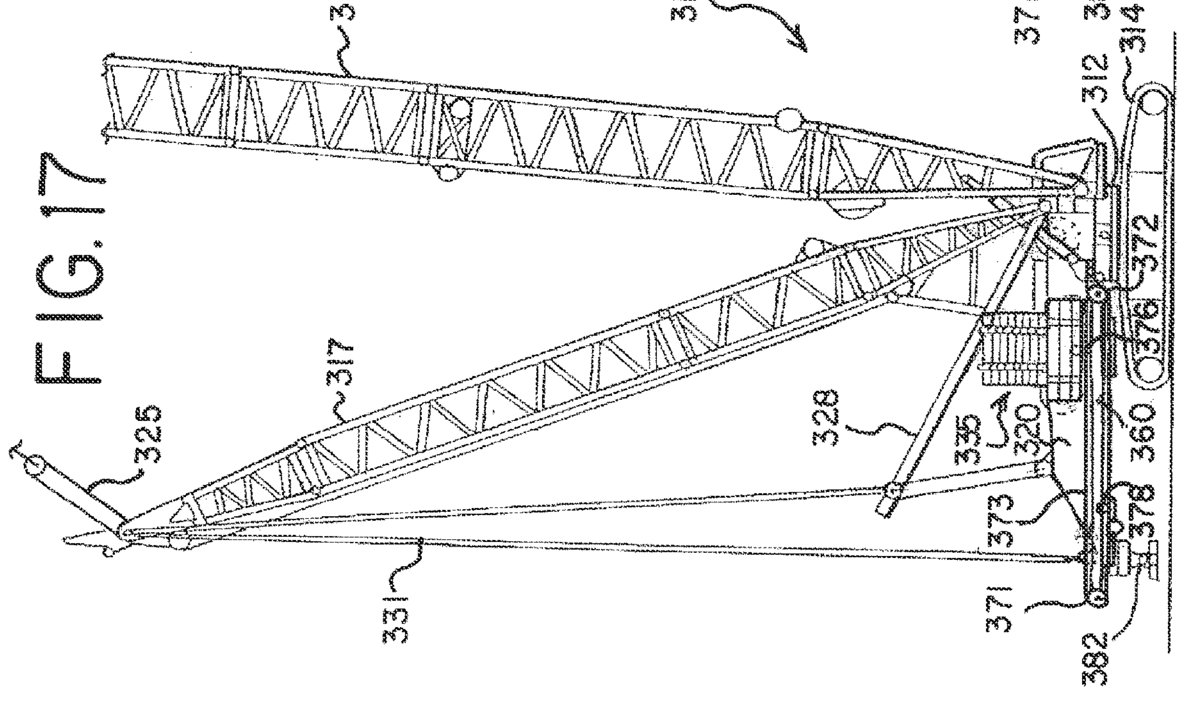
FIG. 17 is a side elevation view of a fourth embodiment of a lift crane of the present invention, with an alternative counterweight support beam attached, with the counterweight support beam and the counterweight unit in a forward position.
Figure 19:
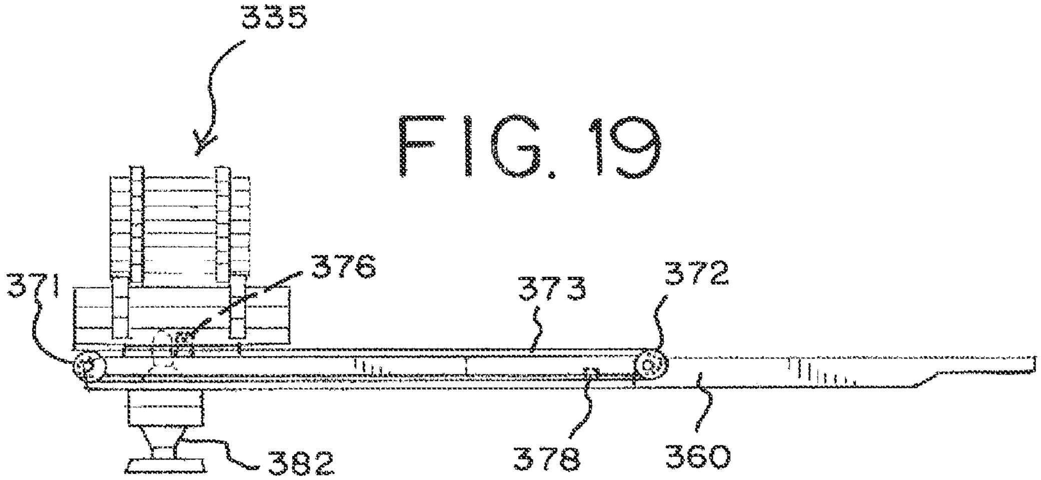
FIG. 19 is a side elevation view of the counterweight support beam and counterweight unit used on the crane of FIG. 17.
Figure 22:
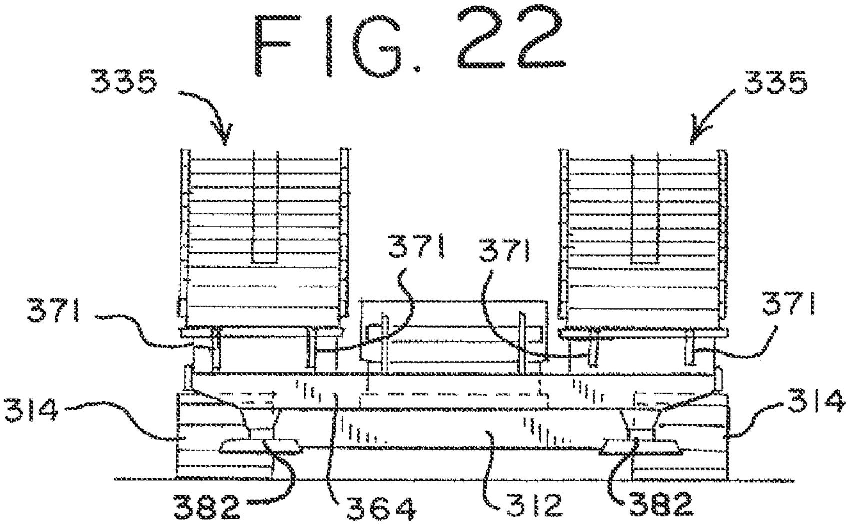
FIG. 22 is a rear elevation view of the crane of FIG. 17 with the boom and masts removed for sake of clarity.
Figure 20:
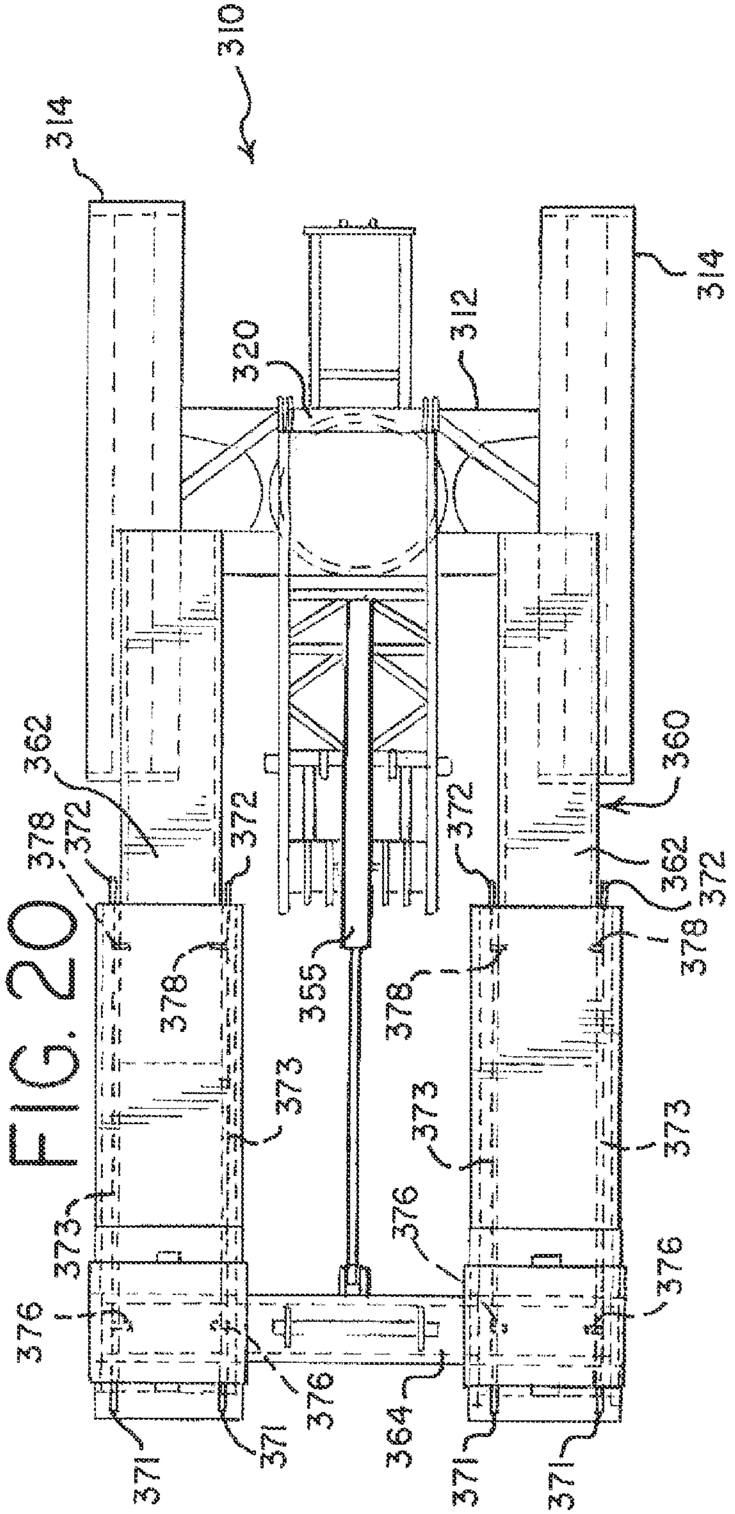
FIG. 20 is a top plan view of the crane of FIG. 17 with the boom and masts removed for sake of clarity.
Figure 21:
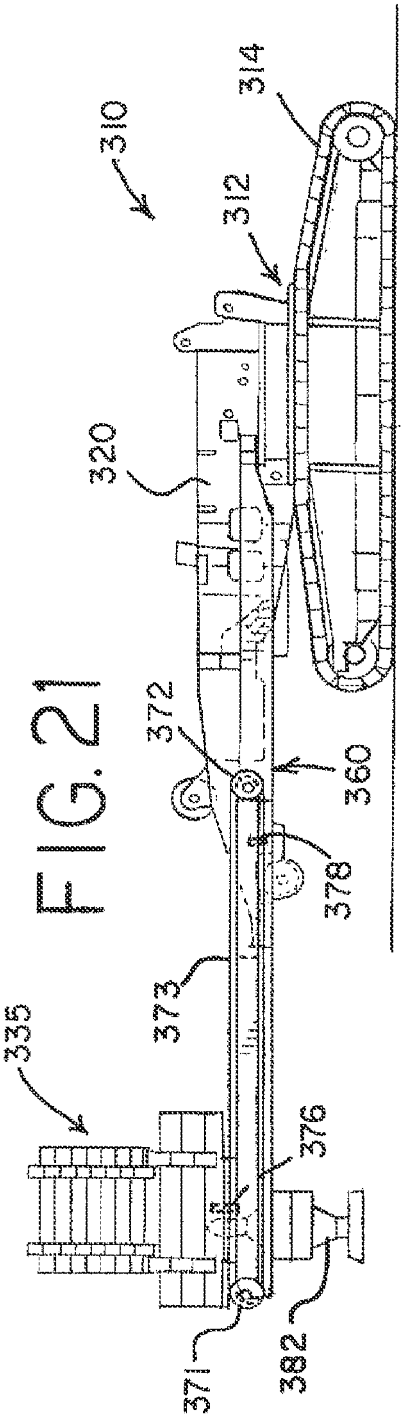
FIG. 21 is a side elevation view of the crane of FIG. 17 with the boom and masts removed for sake of clarity.
Figure 23:
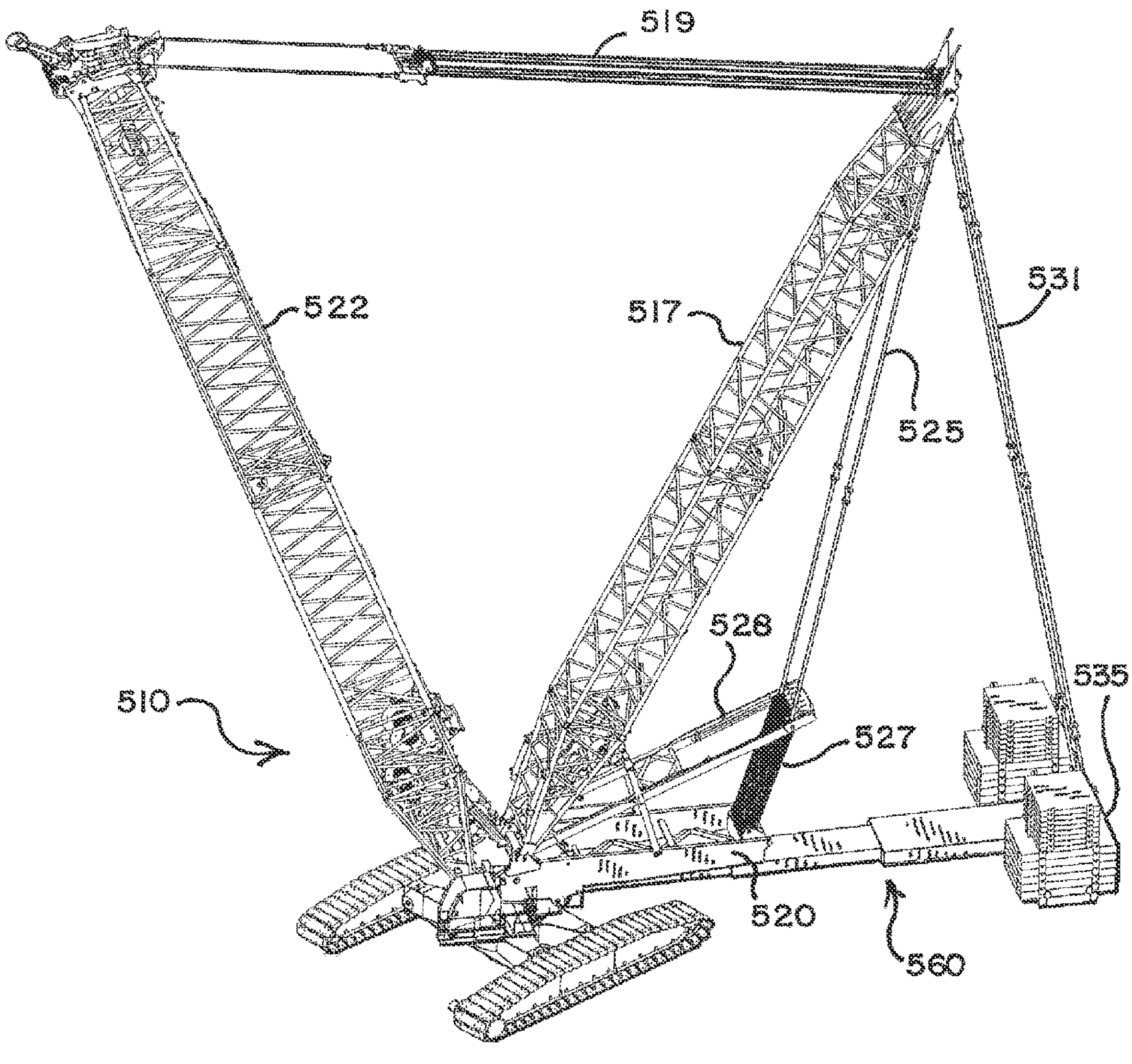
FIG. 23 is a perspective view of a fifth embodiment of a mobile lift crane with a variable position counterweight, shown with the counterweight in a rearward position.

The counterweight support beam 360 is preferably in a U shape, made from two spaced apart side members 362, connected together in the rear by a cross member 364, best seen in FIG. 20. The front ends of the two side members 362 connect to the rotating bed 320. Each side member 362 is made from two sections that fit together in a telescoping fashion. FIG. 17 shows the two sections in a retracted position, while FIGS. 18-21 show the two sections in an extended position.

FIG. 19, which shows the counterweight support beam 360 by itself, with the counterweight unit 335 resting on it, and FIG. 20, which shows the counterweight support beam 360 connected to the rotating bed 320 of crane 310 but with other portions of crane 310 removed for sake of clarity, shows the counterweight support beam movement device. The counterweight support beam movement device comprises a telescoping cylinder 355 attached between the rotating bed 320 and the counterweight support beam 360, and a plurality of flexible tension members in the form of wire ropes 373 that pass around pulleys 371 and 372 and which connect to the counterweight unit 335 at connections 376 and to the counterweight support beam 360 at connections 378. The counterweight unit 335 can be pulled toward the boom as the telescoping cylinder 355 retracts and pulls the rear portion 364 of the counterweight support beam towards the boom. When this happens, the pulleys 372 on the counterweight support beam 360 have to also move forward. Since the wire ropes 373 are connected at both the connections 376 and 378, in order for the pulleys 372 to move forward, the wire rope has to travel in a clockwise fashion (as seen from the side view in FIG. 21), which moves the connection 376 forward, which in turn pulls the counterweight unit 335 forward on the counterweight support beam, in addition to the movement of the section of the counterweight support beam itself. On the other hand, when the cylinder 355 is extended, pulleys 371 are pushed backward as the telescoping cylinder extends and pushes the rear portion of the counterweight support beam away from the boom. This causes the wire rope 373 to travel in a counterclockwise direction, pulling connections 376 and counterweight 335 rearwardly.

As can be seen from FIG. 17, the rotating bed 320 has a rear-most fixed portion, and the counterweight unit 335 is movable to a position where the counterweight unit 335 is in front of the rear-most fixed portion of the rotating bed. The counterweight unit 335 may be moved to and held at a position in front of the top of the fixed mast (FIG. 17) and moved to and held at a position rearward of the top of the fixed mast (FIG. 18) during crane pick, move and set operations. During this operation the movable counterweight unit 335 is never supported by the ground other than indirectly by the movable ground engaging members 314 on the carbody 312. The support feet 382 are included as a safety feature and can provide support to the counterweight unit in the event of a sudden release of the load. However, the support feet 382 are sized so that when the rear 364 of the counterweight support beam 360 is positioned directly below the top of the mast 317 (FIG. 17), and thus support feet 382 are at their closest point to the ground in the arc created by pivoting the tension member 331 about the top of the mast 317, the support feet 382 will still be an adequate distance off the ground so that during normal crane operation, the support feet never contact the ground during pick, move and set operations.

FIGS. 23-60 show the details of another embodiment of a crane that can be set up with two different counterweight set-up configurations. FIGS. 24-28 show the crane 410 with a movable counterweight supported on a counterweight support frame. FIGS. 23 and 38-41 show the same crane with a mast and a movable counterweight support beam. In this configuration the crane is referred to as crane 510.

Like crane 10, crane 410 has a carbody 412; movable ground engaging members 414 mounted on the carbody 412 allowing the crane 410 to move over the ground; a rotating bed 420 rotatably connected to the carbody 412 about an axis of rotation; a boom 422 pivotally mounted about a fixed boom hinge point on the front portion of the rotating bed; and a boom hoist system, provided by a live mast 428 and boom hoist rigging 427, connected between a sheave set on the rotating bed and the boom that allows the angle of the boom relative to the plane of rotation of the rotating bed to be changed. As with crane 10, the boom hoist system comprises a boom hoist drum and boom hoist line reeved between a sheave set on the mast and a sheave set on the rotating bed. In this embodiment, the rotating bed includes a counterweight support frame 432 that is attached to the remainder of the rotating bed 420 in a detachable fashion, as described in more detail below. The counterweight unit 435 is supported on the counterweight support frame 432 in a movable relationship with respect to the counterweight support frame 432. A counterweight unit movement device, also described in more detail below, connects between the rotating bed and the counterweight unit 435 so as to be able to move the counterweight unit 435 toward and away from the boom 422. In this configuration, as with crane 10, during crane operation, when the counterweight unit is moved to compensate for changes in the combined boom and load moment, the moment generated by the counterweight unit 435 acts on the rotating bed predominantly, and in this case only, through the counterweight support frame.

The counterweight support frame 432 in this embodiment is located below the remainder of the rotating bed. The counterweight support frame is made of a welded plate structure, best seen in FIGS. 29-34. It is mounted in a removable fashion to the remainder of the rotating bed. An adapter 450 is used to make an easily removable connection between the rotating bed 420 and the front of the counterweight support frame 432. The adapter 450 includes holes 452 through ears 454 that fit between lugs 429 on the lower portion of the rotating bed 420 to connect the adapter 450, and hence the counterweight support frame 432, to the rotating bed 420. The adapter 450 is itself secured to the counterweight support frame 432 by pins 456 (best seen in FIG. 34). The use of pins 456 allows the adapter 450 to be detached from the counterweight support frame 432 so that the counterweight support frame 432 can be reused in the configuration of crane 510. Front holes 481 serve as a place to pin the counterweight support frame 432 and adapter 450 together. Rear holes 483 and top holes 484 in the counterweight support frame 432 are not used in this embodiment, but are included so that the counterweight support frame 432 can be used in the configuration of crane 510, as explained below.

At the rear, the counterweight support frame 432 connects to the rotating bed through two short links 462. The links 462 are each pinned at one end to a lug 464 on the rotating bed and at the other end in between a pair of lugs 466 on the rear of the counterweight support frame 432. Once the pinned connections are made with the adaptor 450 at the front and the links 462 at the rear, the counterweight support frame 432 is in reality a detachable portion of the rotating bed of the crane 410.

Figure 35:
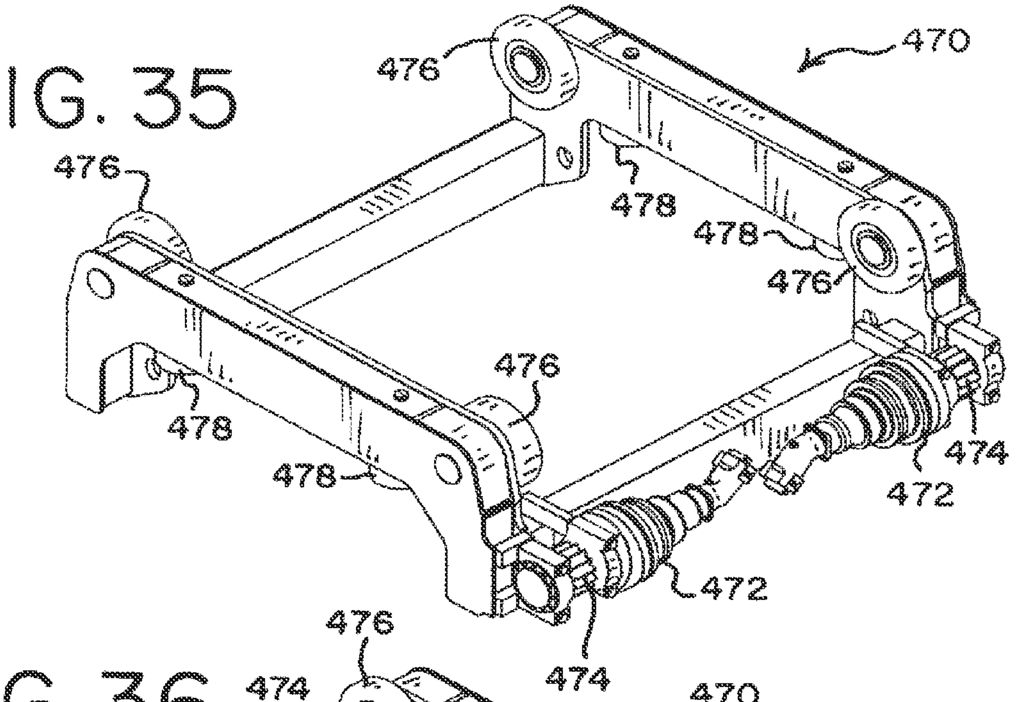
FIG. 35 is a rear perspective view of the counterweight unit movement device used on the crane of FIG. 24 and shown in FIG. 30.
Figure 36:
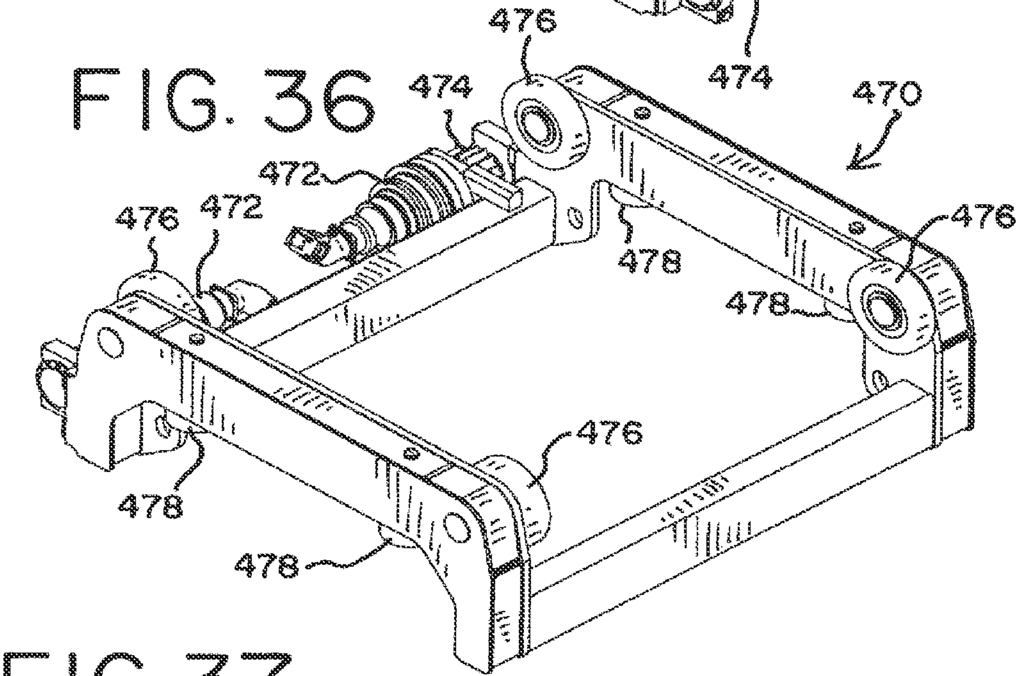
FIG. 36 is a front perspective view of the counterweight unit movement device shown in FIG. 35.
Figure 37:
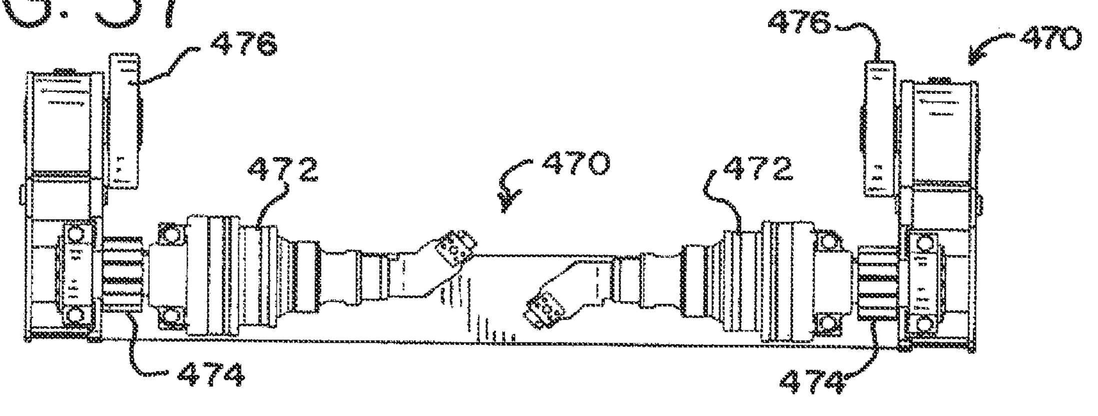
FIG. 37 is a rear elevation view of the counterweight unit movement device shown in FIG. 35.
Figure 38:
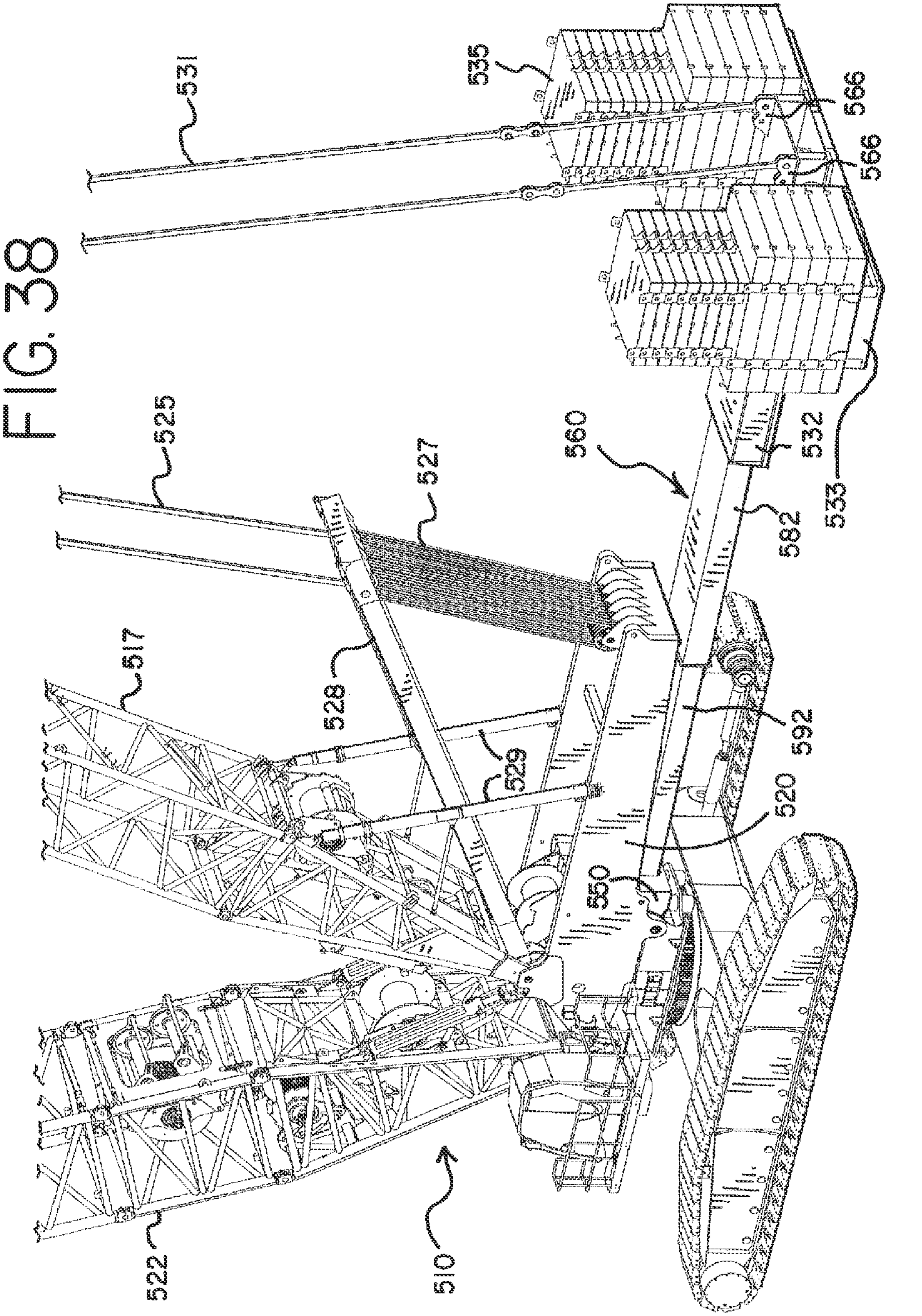
FIG. 38 is a rear perspective view of the crane of FIG. 23 with the counterweight support beam and the counterweight unit in a rearward position.
Figure 39:
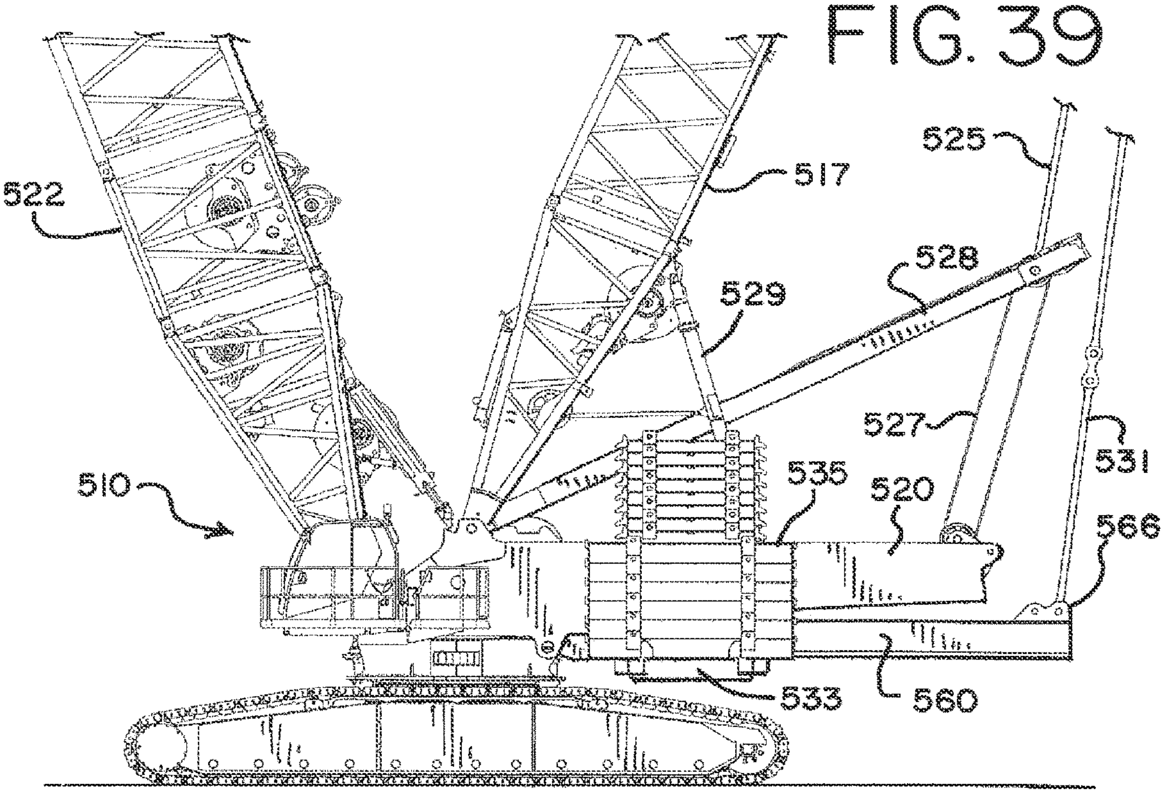
FIG. 39 is a side elevation view of the crane of FIG. 23 with the counterweight support beam and the counterweight unit in a forward, retracted position.
Figure 40:
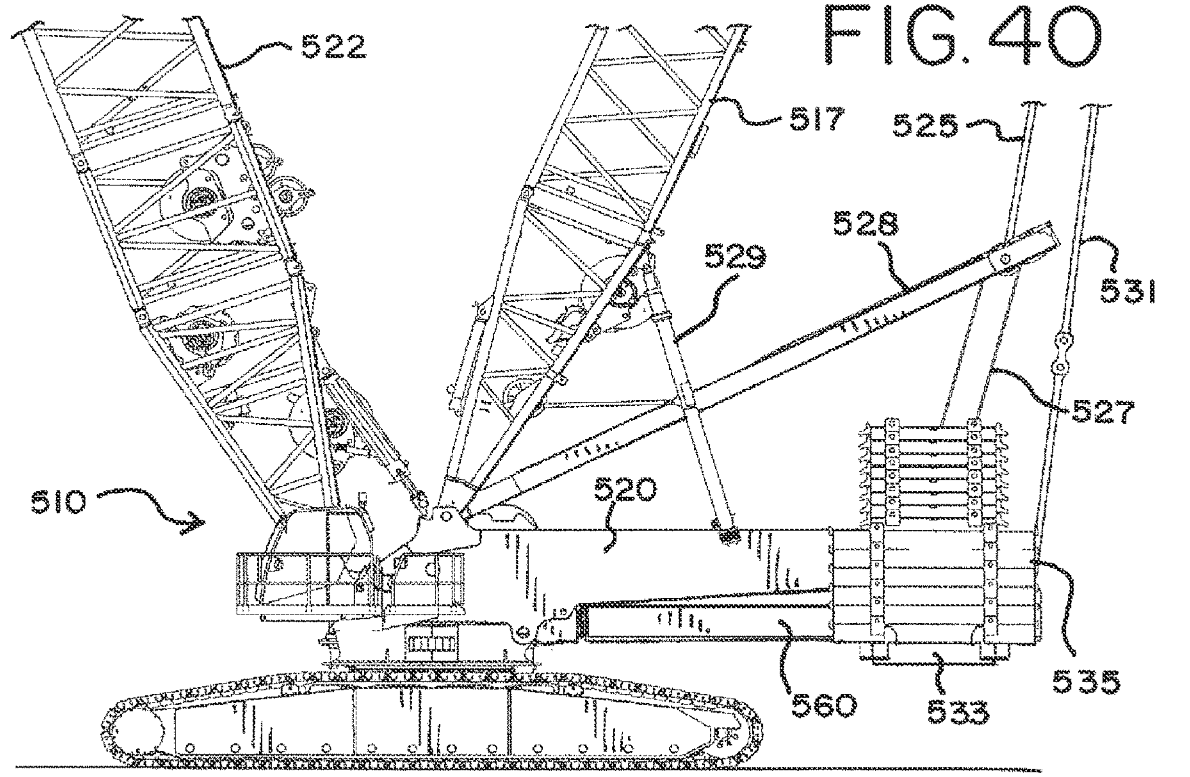
FIG. 40 is a side elevation view of the crane of FIG. 23 with the counterweight support beam in a forward, retracted position and the counterweight unit in a rearward position on the counterweight support beam.
Figure 41:
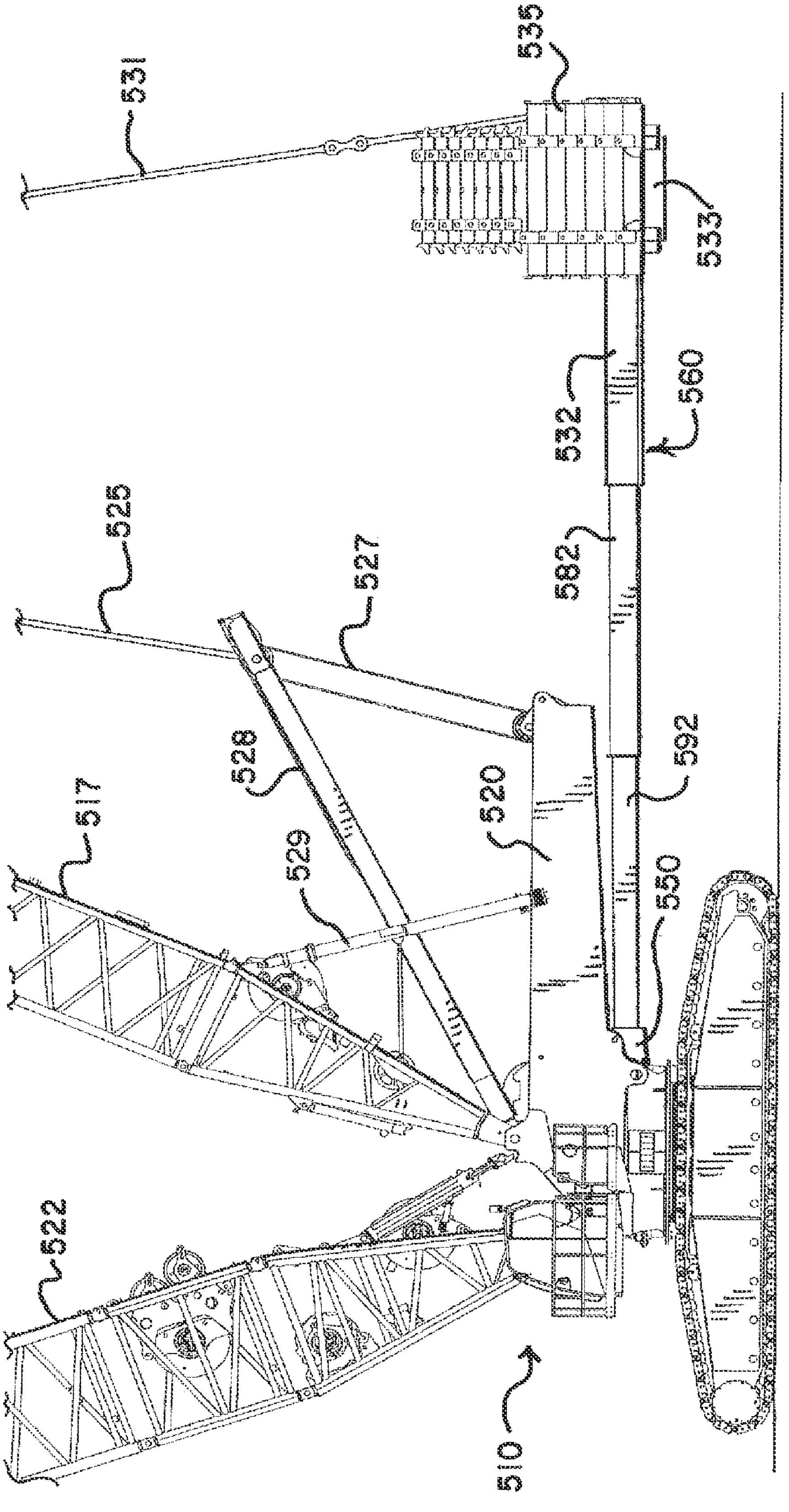
FIG. 41 is a side elevation view of the crane of FIG. 23 with the counterweight support beam and the counterweight unit in a fully extended, rearward position.
Figures 42, 43:
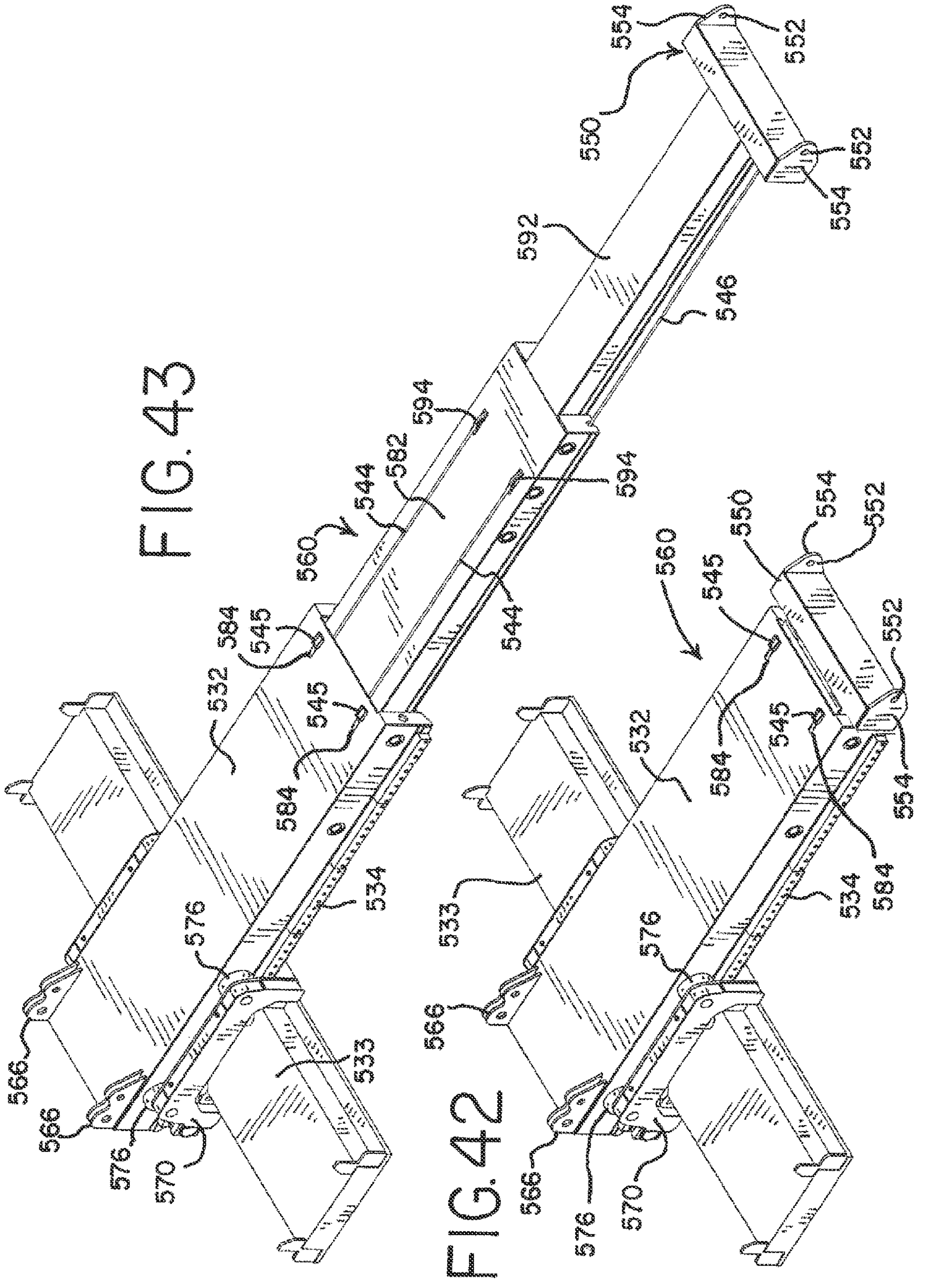
FIG. 42 is a front perspective view of the counterweight support beam used on the crane of FIG. 23 with the frame of the counterweight support beam in a retracted position, and also shows the counterweight unit movement device and counterweight tray, with the individual counterweights removed for sake of clarity.
FIG. 43 is front perspective view of the counterweight support beam of FIG. 42 with the frame of the counterweight support beam in an extended position.
Figure 44:
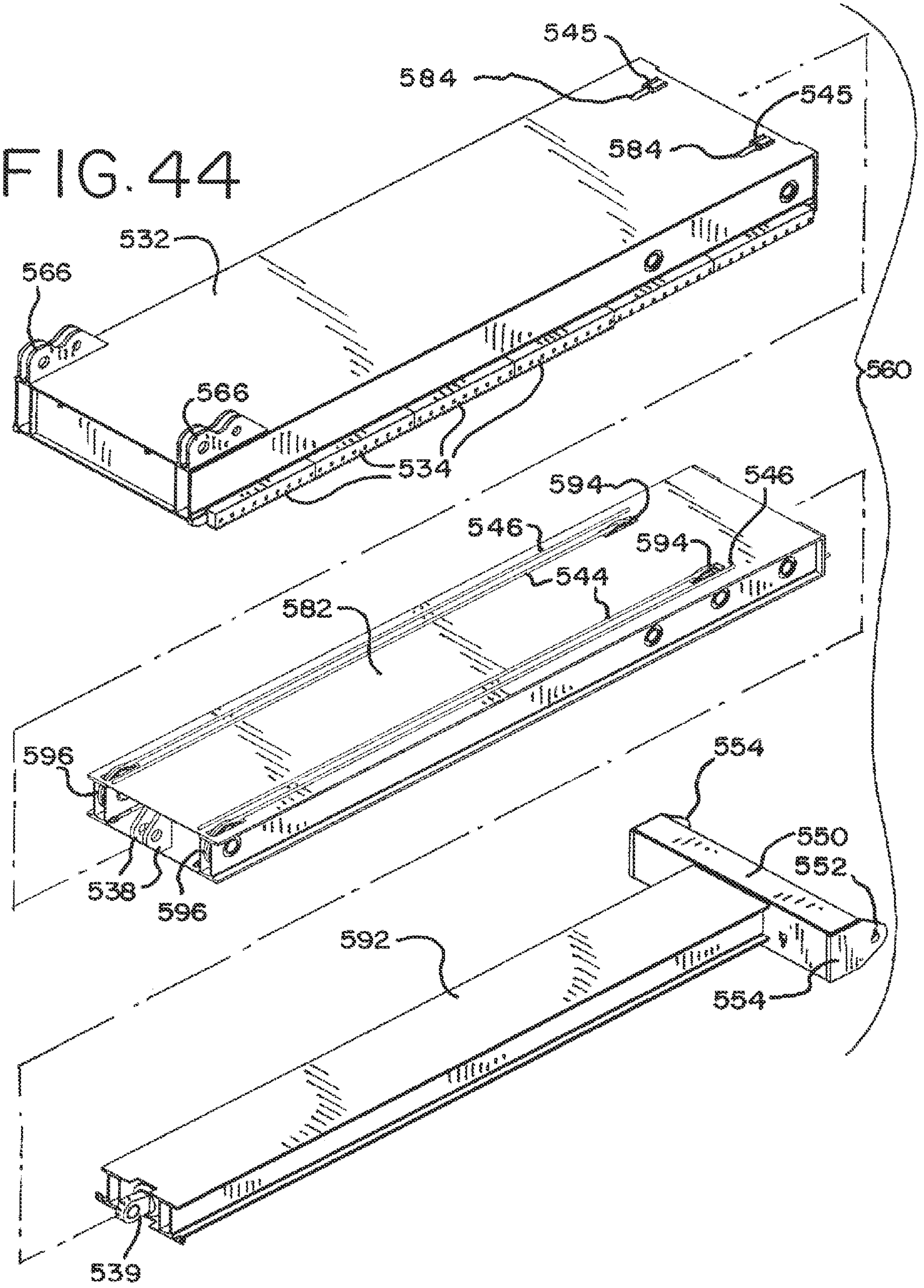
FIG. 44 is an exploded view of the telescopic frame of the counterweight support beam of FIG. 42.

In crane 410, the counterweight unit movement device is connected between the rotating bed 420 and the counterweight unit 435 by being connected between the counterweight support frame 432, as part of the rotating bed, and the counterweight unit. The counterweight unit 435 comprises a counterweight tray 433 pinned to a movable trolley 470 (FIGS. 35-37). As with earlier embodiments, the counterweight tray is suspended beneath the counterweight support frame. The tray 433 pins into holes 471 (FIG. 31) on the trolley 470. The holes 471 are bigger on top than on bottom. The bottom dimension is the same as the outside diameter of the pins (not shown) used to connect the tray 433 and the trolley 470. The larger dimension on top allows for easy insertion of the pins.

The trolley 470 rides on four vertical rollers 476 that engage a flange 438 along each side of the counterweight support frame 432. The trolley 470 also includes four horizontal rollers 478 (FIG. 33) that provide sideways positioning of the trolley 470 on the counterweight support frame 432.

The counterweight unit movement device comprises at least one, and in this embodiment, two hydraulic motors and gear boxes 472 each driving a gear 474 connected to the trolley 470. The counterweight support frame 432 includes a set of teeth 436 (FIG. 29) on each side. The gears 474 engage with the teeth 436 on the two sides of the counterweight support frame 432 to move the trolley 470 with respect to the counterweight support frame as the motor and gearbox 472 turns the gear 474. In this way the counterweight unit 435 can move with respect to the counterweight support frame 432 by being mounted on trolley 470.

Figure 32:
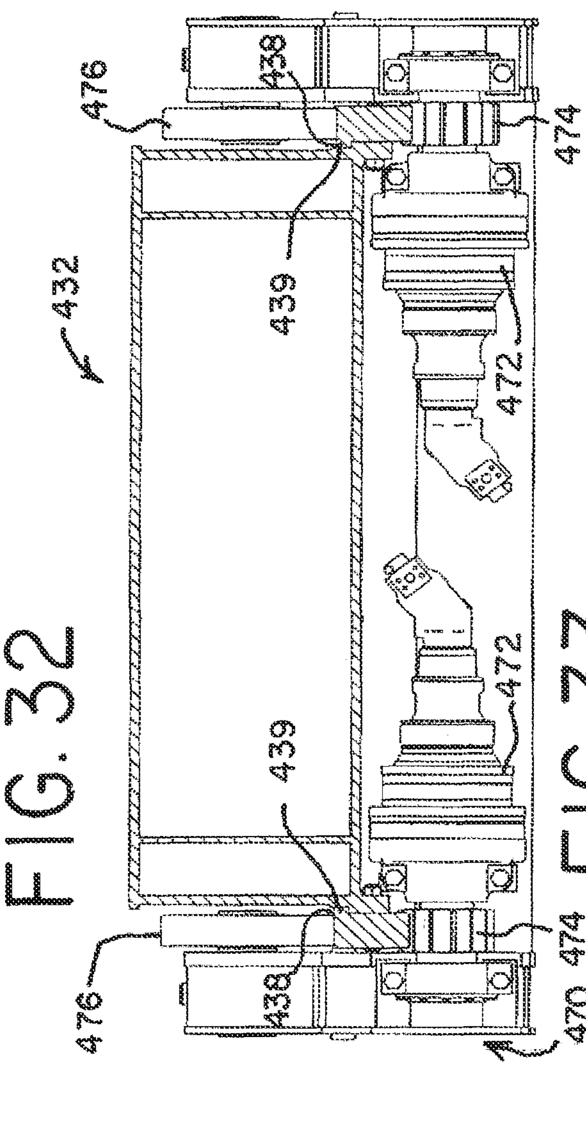
FIG. 32 is a cross-sectional view taken along line 32-32 of FIG. 31.
Figure 33:
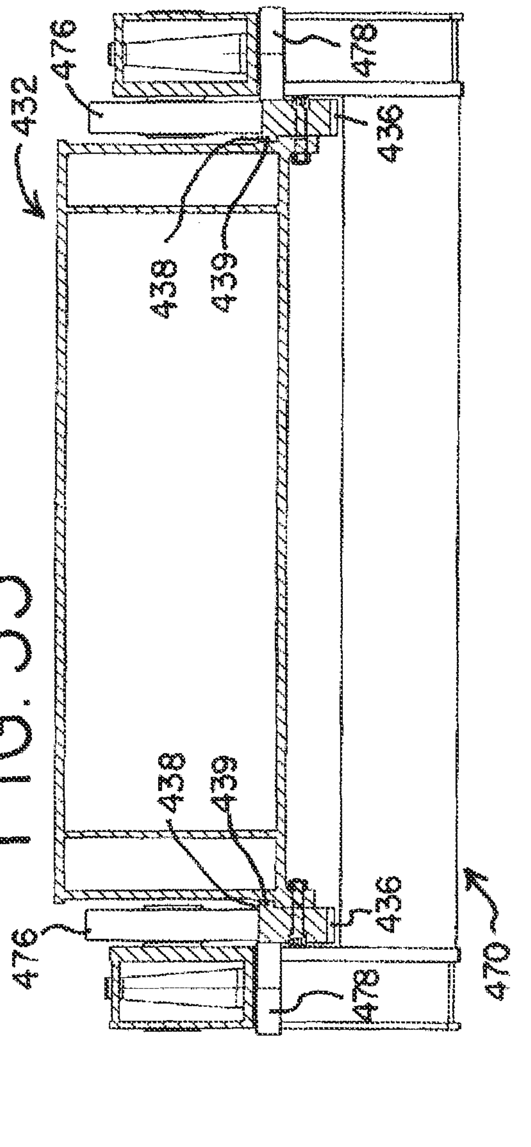
FIG. 33 is a cross-sectional view taken along line 33-33 of FIG. 31.

For ease of fabrication, several individually replaceable sections of steel bar 434 (best seen in FIG. 29) may be bolted onto the rest of the counterweight support frame 432 with socket head cap screws to provide both flange 438 and the teeth 436. In addition, the side surfaces of these steel bars provide the engagement surface for the horizontal rollers 478, as seen in FIG. 33. Preferably the surfaces of these steel bars 434 are hardened to provide better wear resistance with the rollers 476 and 478. The steel bars 434 include shear blocks surfaces 439 (FIGS. 32 and 33) to help carry the load from the rollers 476 on the trolley 470 to the counterweight support frame 432. As seen in FIG. 32, the rollers 476 are preferably mounted in the same vertical plane as the gears 474.

In the preferred embodiment, the crane is configured such that during crane operation, when the counterweight unit is moved to compensate for changes in the combined boom and load moment, the moment generated by the counterweight unit with respect to a front tipping fulcrum of the crane is not transferred to the rotating bed through the mast. Rather, the moment is transferred to the rotating bed by the counterweight support frame, such as through the pinned connections at lugs 429 and 464.

The crane 510 is made from the same components used to make crane 410, with an added fixed mast 517 and a movable counterweight support beam 560. In addition, the structure used as the live mast 428 in crane 410 is no longer used as a live mast. Instead, boom hoist rigging 519 is provided between the boom top and the top of fixed mast 517 to allow the boom angle to be changed. Fixed length pendants 525 connect the top of fixed mast 517 to the top of mast 528. The rigging 527 and the mast 528 are held in a fixed position during normal operation of crane 520. Also, a tension member 531 is added between the top of mast 517 and counterweight support beam 560. In the drawings, the components used on the crane 410 that are the same as in crane 510 have the same reference number with an addend of 100; thus boom 422 on crane 410 is boom 522 on crane 510. The counterweight unit 535 is the same as counterweight unit 435.

The counterweight unit 535 on crane 510 may be moved in two ways. First, just like counterweight unit 435, counterweight unit 535 includes a trolley 570 with rollers 576 that ride on flanges on a counterweight support frame 532. However, in this counterweight set-up configuration, the counterweight support frame 532 is part of the telescoping counterweight support beam 560. Thus, another way to move the counterweight unit 535 is to telescope out the beam 560 while maintaining the location of the counterweight unit 535 on the frame 532. The first type of movement can be seen by comparing FIGS. 39 and 40, and the second type of movement can be seen by comparing FIGS. 40 and 41. Both types of movement can be carried out independently and need not be carried out to the full extent possible. However, usually the counterweight unit 535 will be moved back on frame 532 until it has moved as far as possible before the beam 560 is extended. As can be seen by comparing FIGS. 39 and 41, with the counterweight movement system of crane 510, the counterweight unit can be moved to a position where it is between the boom hoist sheave set on the rotating bed and the axis of rotation of the carbody 512, and moved to a position where it is behind the boom hoist sheave set on the rotating bed.

The counterweight support beam 560 is preferable made with three nested, telescoping beam members: an inner beam member 592, a middle beam member 582 and an outer beam member 532, also referred to above as the counterweight support frame 532. Thus, the counterweight support beam movement device comprises a telescoping frame with at least one inner frame member fitting inside an outer frame member. As shown, more preferably the counterweight support beam has an intermediate frame member inside the outer frame member and surrounding the inner frame member. The counterweight support beam comprises the outer frame member of the telescoping frame that is part of the counterweight support beam movement device.

Interestingly, the structure used as the counterweight support frame 432 in the first counterweight set-up configuration option (crane 410) can be used as the outer beam member 532 in the counterweight support beam 560 in the second counterweight set-up configuration option (crane 510). When the counterweight support frame 432 is used as the outer beam member 532, it includes additional internal structure so that it can be connected to the rest of the beam members and move with respect to the rotating bed 520.

Because the trolley 570 is just the same as trolley 470, and the outer beam member 532 has an external configuration like counterweight support frame 432, the way that counterweight unit 535 moves with respect to outer beam member 532, the structure of the trolley 570, motors and gearboxes 572 and gears 574 engaging teeth on sections of steel bar 534 will not be described again in detail. Because of these similarities, in this embodiment the driving gear connected to the trolley engages teeth on the counterweight support beam 560 to move the trolley with respect to the counterweight support beam 560 as the motor turns the gear 574.

The counterweight support beam 560 mounts to the rest of the crane 510 in a fashion similar to how counterweight support frame 432 connected to the rest of crane 410. Instead of short links 462, connecting between lugs 466 and the rear of the rotating bed, the tension members 531 connect from the top of the fixed mast 517 through lugs 566 to the rear of the counterweight support beam 560. On the front, instead of adaptor 450, the inner beam member 592 includes a connector 550 on its end. This connector has ears 554 with holes 552 through them so that the connector 550 can be pinned to the underside of the rotating bed 520, just as adapter 450 was pinned to rotating bed 420.

The counterweight support beam movement device comprises a linear actuation device, preferably in the form of a trunnion mounted hydraulic cylinder. The counterweight support beam movement device further comprises ropes and pulleys mounted to the intermediate and outer frame members such that the outer frame member moves in a slave relationship to the movement of the intermediate frame member with respect to the inner frame member. In the preferred embodiment of counterweight support beam 560, a double acting hydraulic cylinder 540 with a rod 542 is connected between the inner beam member 592 and the middle beam member. Thus, as the rod 542 is extended and retracted, the middle beam member 582 moves with respect to the inner beam member 592. Meanwhile, the outer beam member 532 is connected to the other beam members in a slaved fashion, so that movement of the other beam members with respect to each other necessarily and simultaneously causes a movement of the outer beam member 532 with respect to the middle beam member 582. The details of how this happens are best seen in FIGS. 42-52, with additional details in FIGS. 53-60.

The inner, middle and outer beam members are each made from welded plates into a box structure. Rollers 585 and 586 support the inside surface of outer beam member 532 on the outside of middle beam member 582. Likewise, rollers 587 and 588 support the inside of middle beam 582 to the outside of inner beam member 592. The holes 481 and 483 in the sides of counterweight support frame 432 are used to mount rollers 585 and 586 when the member 432 is reused as outer beam member 532 in crane 510.

Figures 45, 46:
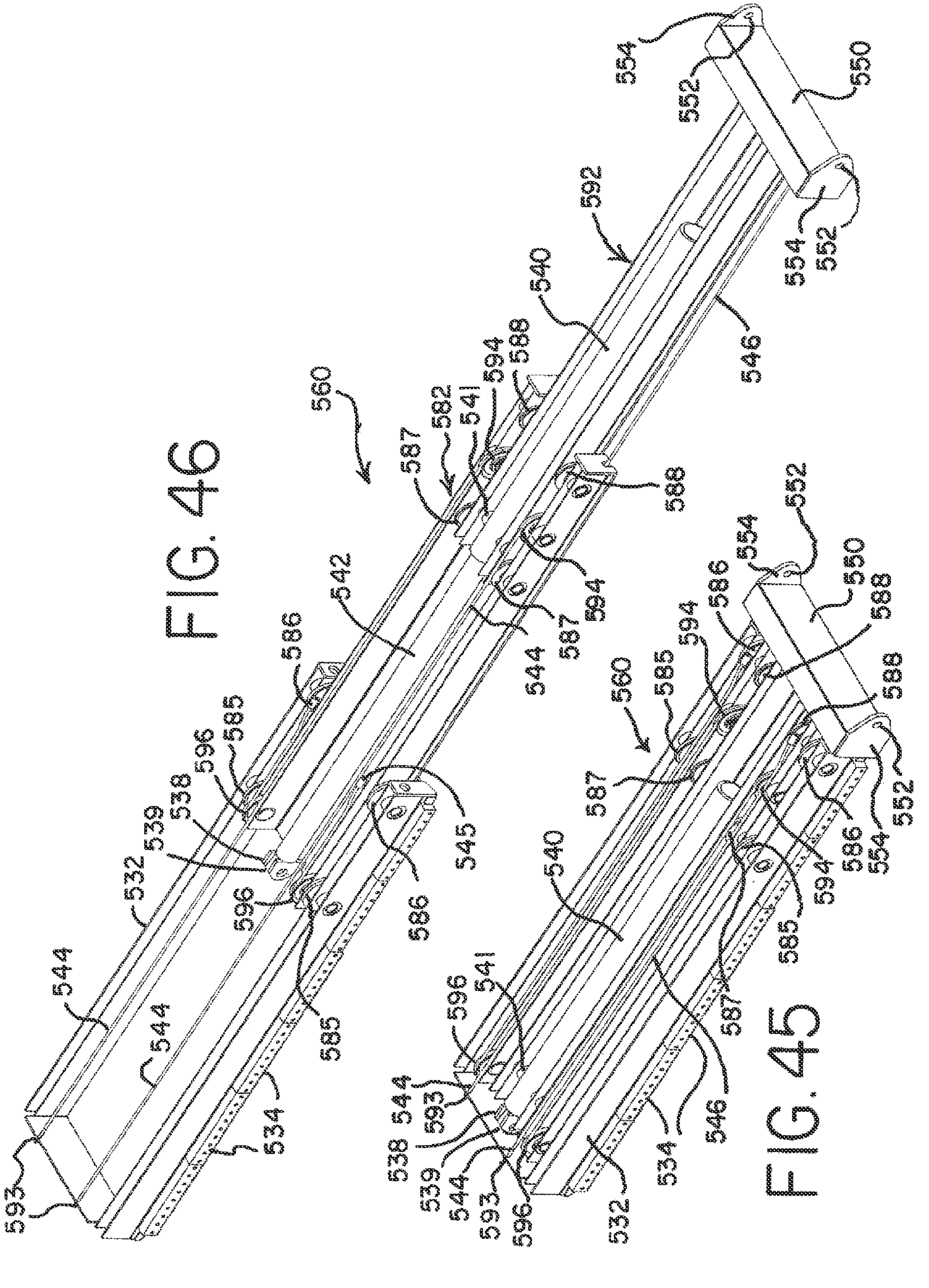
FIG. 45 is front perspective view of the counterweight support beam of FIG. 42 in a retracted position, with the top plates of the telescopic frame members removed for sake of clarity.
FIG. 46 is front perspective view of the counterweight support beam of FIG. 42 in an extended position, with the top plates of the telescopic frame members removed for sake of clarity.
Figures 47, 48:
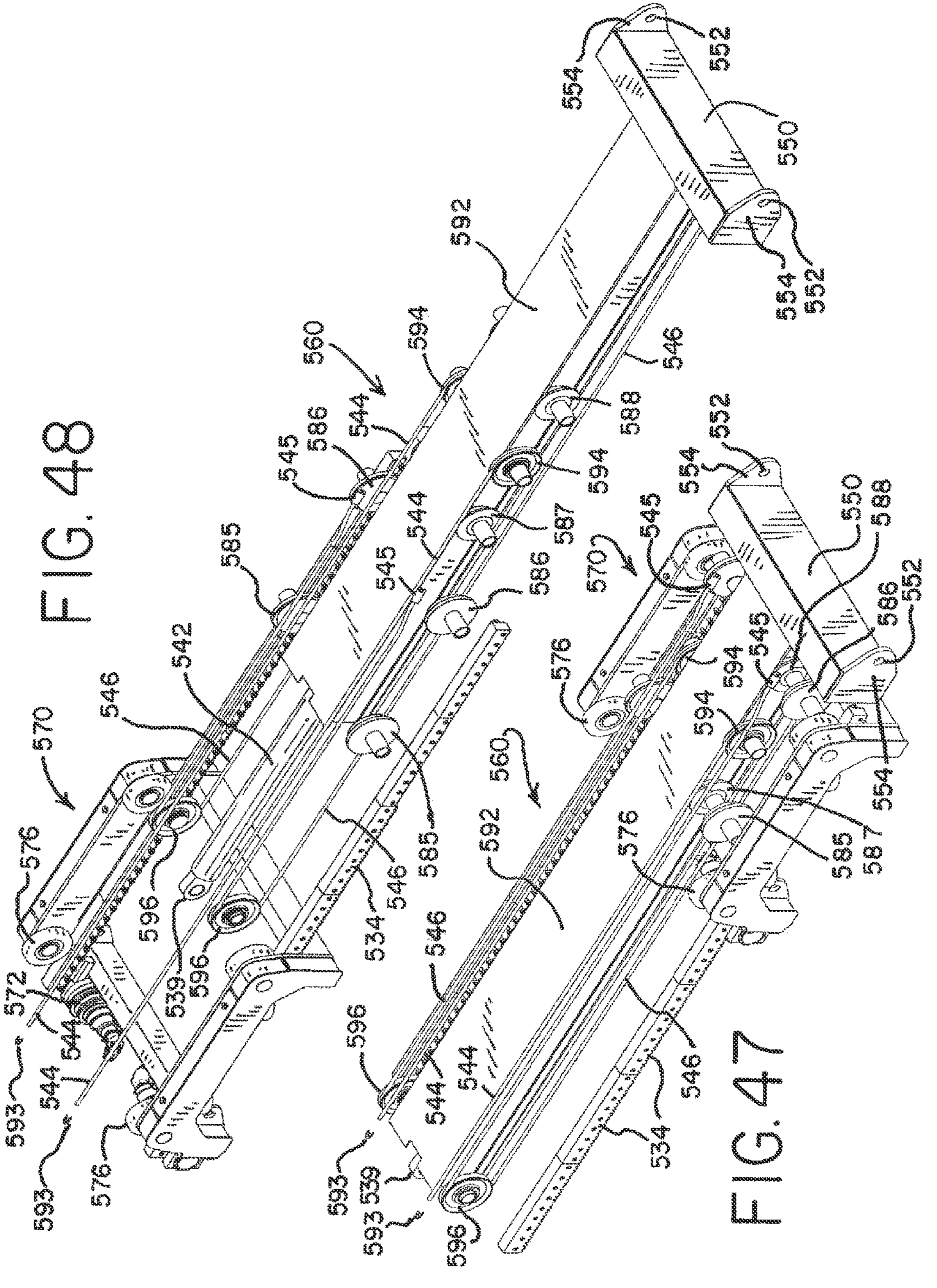
FIG. 47 is front perspective view of portions of the counterweight support beam of FIG. 42 in a retracted position, also showing the counterweight unit movement device.
FIG. 48 is front perspective view of portions of the counterweight support beam and counterweight unit movement device shown in FIG. 47 in an extended position.
Figure 50:
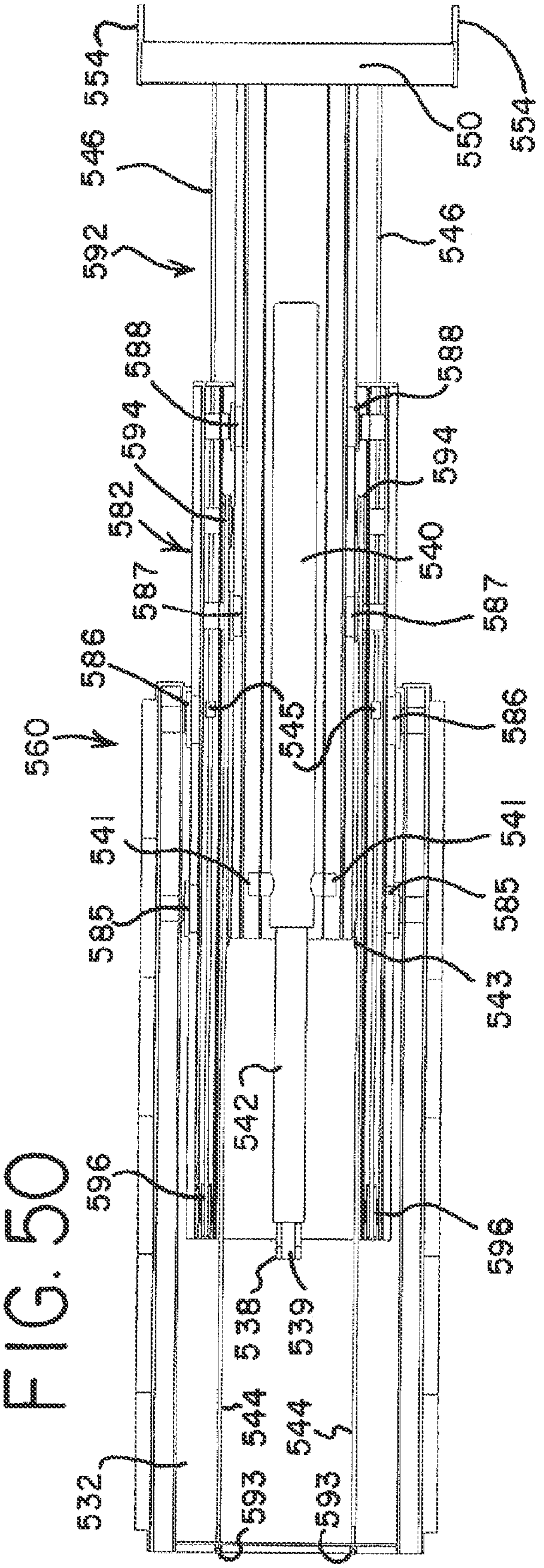
FIG. 50 is top plan view of the counterweight support beam of FIG. 49 in an extended position, with top plates of the frame members removed for sake of clarity.
Figure 49:
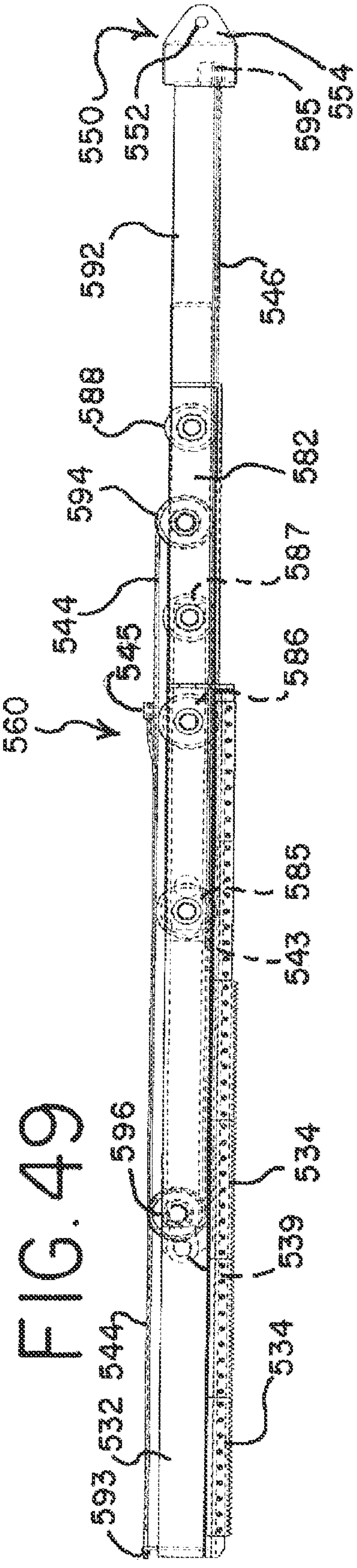
FIG. 49 is side elevation view of the counterweight support beam of FIG. 42 in an extended position, with the counterweight unit movement device and counterweight tray removed for sake of clarity.
Figures 51, 52:
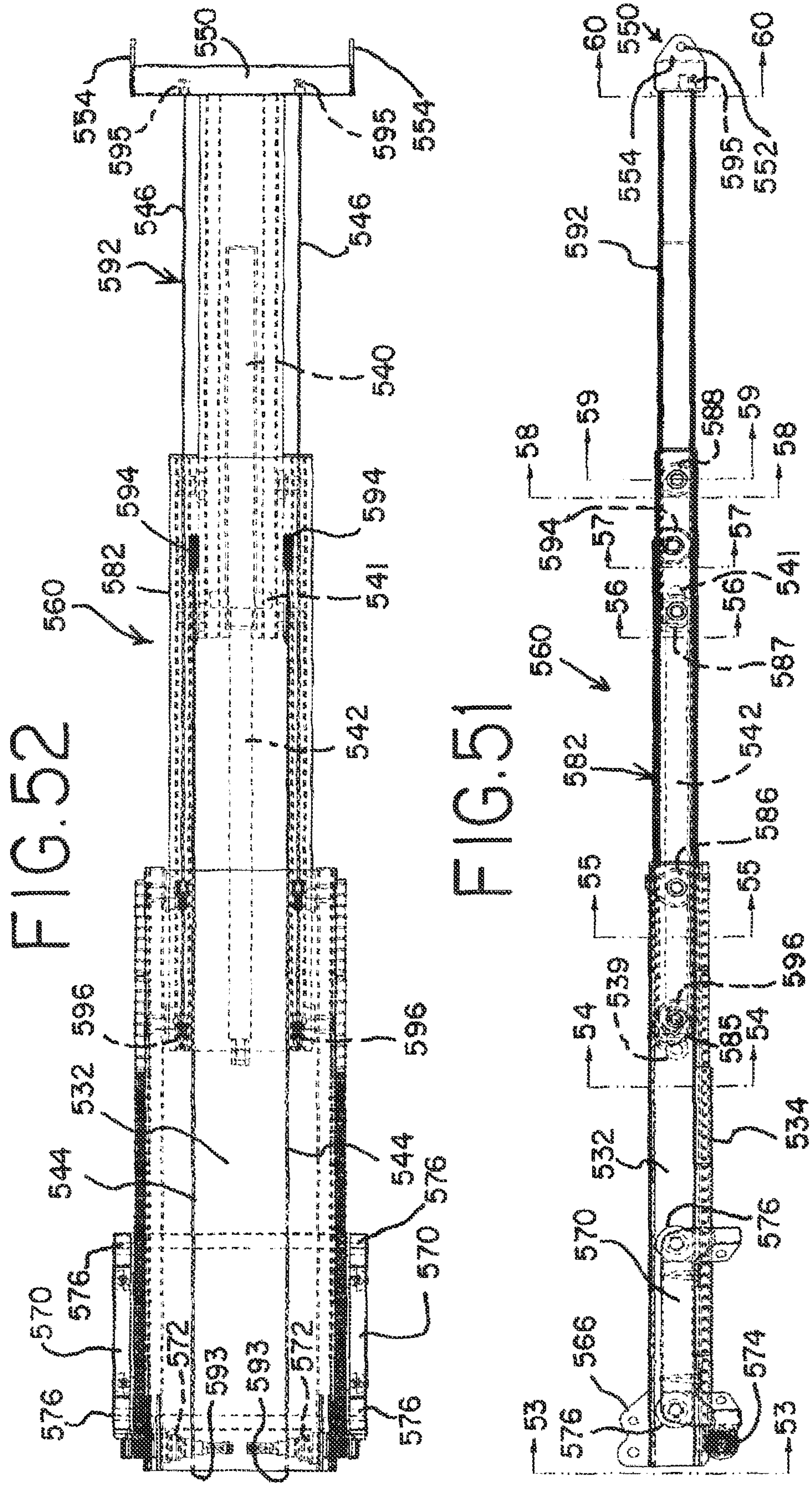
FIG. 51 is side elevation view of the counterweight support beam of FIG. 42 in an extended position, with the counterweight unit movement device in a rearward position, but without the counterweight tray.
FIG. 52 is top plan view of the counterweight support beam of FIG. 51 in an extended position.
Figure 53:
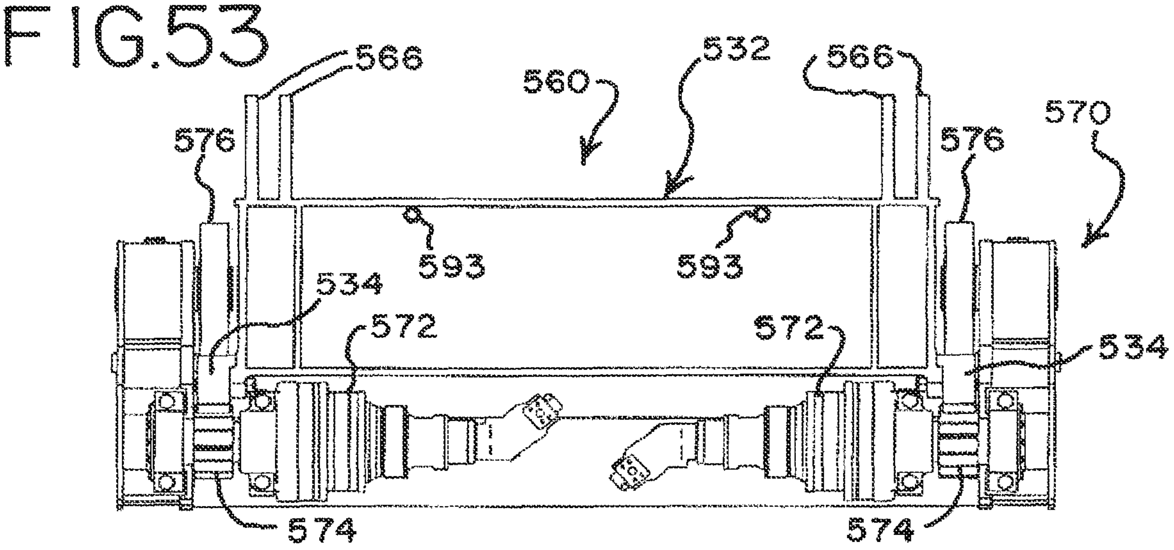
FIG. 53 is a rear elevation view taken along line 53-53 of FIG. 51.
Figure 54:
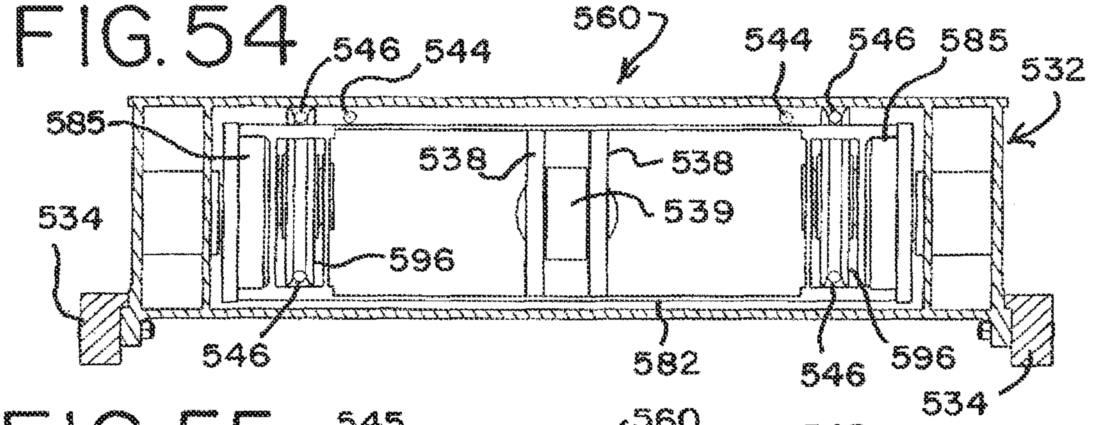
FIG. 54 is a cross-sectional view taken along line 54-54 of FIG. 51.
Figure 55:
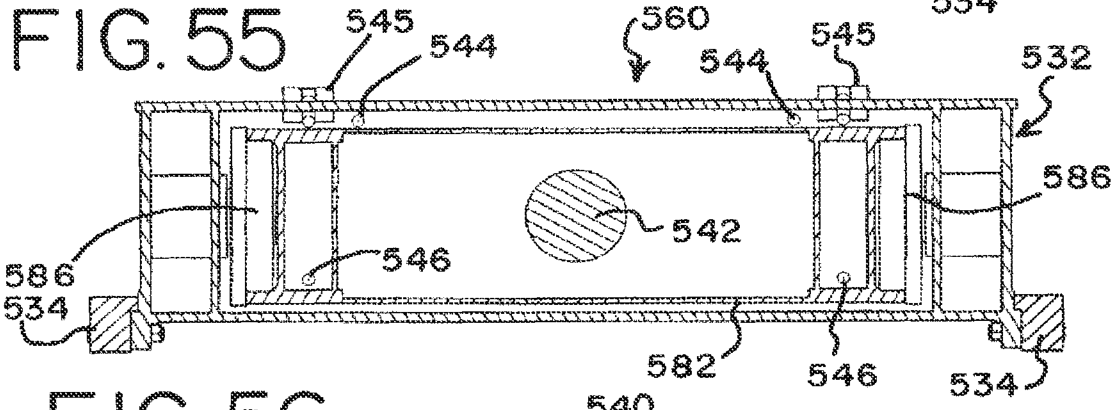
FIG. 55 is a cross-sectional view taken along line 55-55 of FIG. 51.
Figure 56:
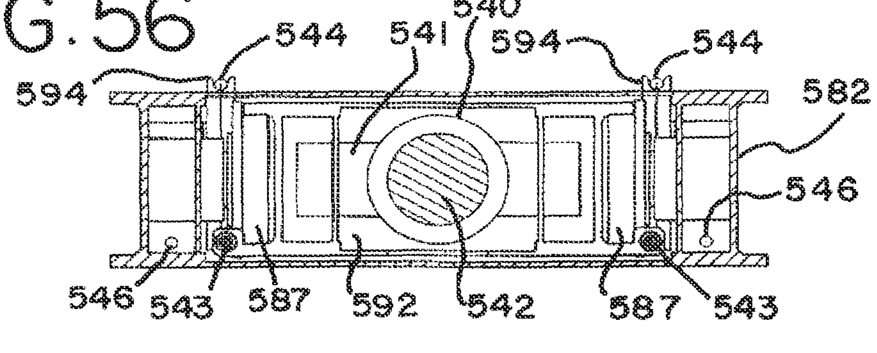
FIG. 56 is a cross-sectional view taken along line 56-56 of FIG. 51.
Figure 57:
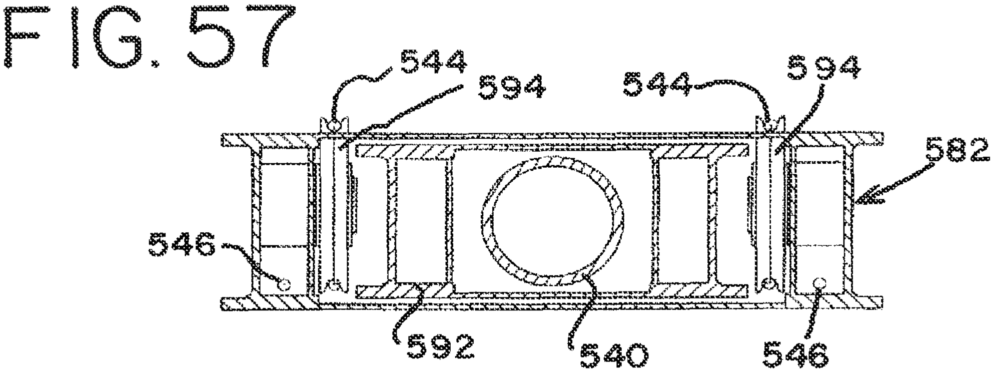
FIG. 57 is a cross-sectional view taken along line 57-57 of FIG. 51.

To help explain the movement of the beams with respect to each other, some of the drawings, like FIGS. 45-50, are shown with some of the plate members removed. As best seen in FIGS. 45 and 46, the hydraulic cylinder is trunnion mounted through mounting 541 to the side walls of the inner beam member 592. The rod portion 542 of the hydraulic cylinder terminates in a head 539 with a hole through it that can be pinned between lugs 538 welded to the back plate of middle beam 582. Thus, as the rod 542 inside hydraulic cylinder 540 is extended and retracted, middle beam member 582 will likewise extend and retract with respect to inner beam member 592.

The movement of the outer beam member 532 is controlled by a pair of retract wire ropes 544 and a pair of extend wire ropes 546. The extend wire ropes 546 are tied off at one end by connectors 545 to the front of the outer beam member 532. The extend wire ropes pass through holes 584, which are the same as unused holes 484 in the counterweight support frame 432. The extend wire ropes 546 pass around extend sheaves 596 mounted on the rear portion of the middle frame member 582. The other ends of the extend wire ropes 546 are tied off by connectors 595 to the back of the counterweight support beam connector 550 located at the front of the inner beam member 592. If the counterweight support beam 560 is in a retracted mode, and the hydraulic cylinder 540 is extended, causing the middle beam member 582 to move backwards with respect to the inner beam member 592, the extend sheaves 596 will be pushed backward with the middle beam member, requiring the extend wire ropes 546 to pass around the extend sheaves 596, necessarily pulling the front of the outer beam member 532 backward by the connections 545. Because the extend wire ropes 546 are tied off at connectors 545 on the outer beam member 532 and connectors 595 at the front of the inner beam member 592, but pass around extend sheaves 596 attached to the middle beam member 582, one foot of travel distance of the middle beam member will cause the outer beam member 532 to extend two feet.

The retract wire ropes 544 are tied off at one end by connectors 543 (FIGS. 49 and 56) to the rear of the inner beam member 592. The retract wire ropes pass around retract sheaves 594 mounted on the front portion of the middle beam member 582. The other ends of the retract wire ropes 544 are tied off by connectors 593 to the back of the outer member 532. If the counterweight support beam 560 is in an extended mode, and the hydraulic cylinder 540 is retracted, causing the middle beam member 582 to move forward with respect to the inner beam member 592, the retract sheaves 594 will be pushed forward with the middle beam member, requiring the retract wire ropes 544 to pass around the retract sheaves 594, necessarily pulling the rear of the outer beam member forward by the connectors 593. Because the retract wire ropes are tied off at connectors 543 to the inner beam member, but pass around retract sheaves 594 attached to the middle beam member 582, one foot of travel distance of the middle beam member will cause the outer beam member 532 to retract two feet. The retract wire ropes 544 could attach to the outer beam member 532 at any point in the beam behind where the retract sheaves 594 are located when the beam is retracted. However, by having the retract wire ropes 544 tie off at the very rear of the outer beam member 532, the connectors 593 are more readily accessible if adjustment is needed.

Figure 58:
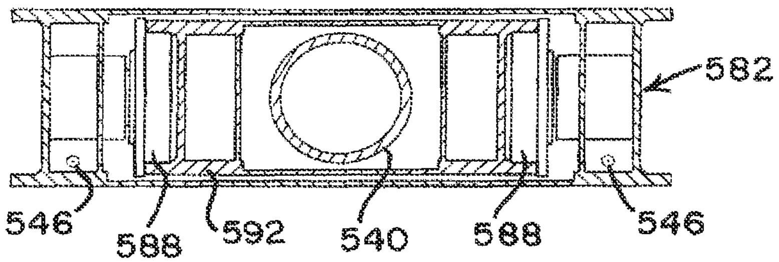
FIG. 58 is a cross-sectional view taken along line 58-58 of FIG. 51.
Figure 59:
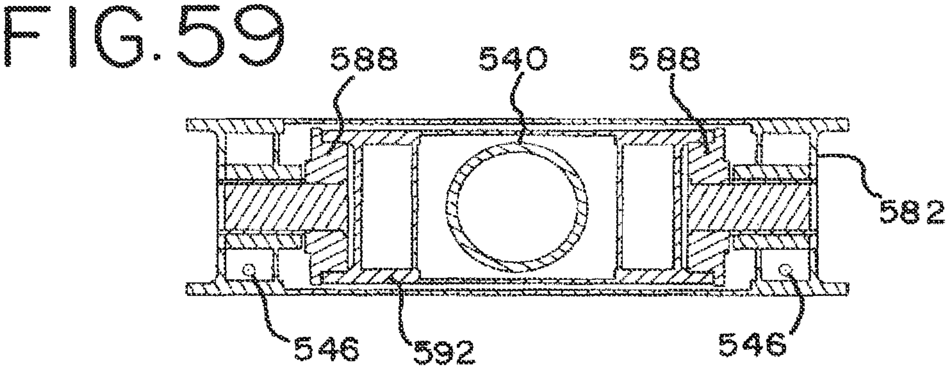
FIG. 59 is a cross-sectional view taken along line 59-59 of FIG. 51.
Figure 60:
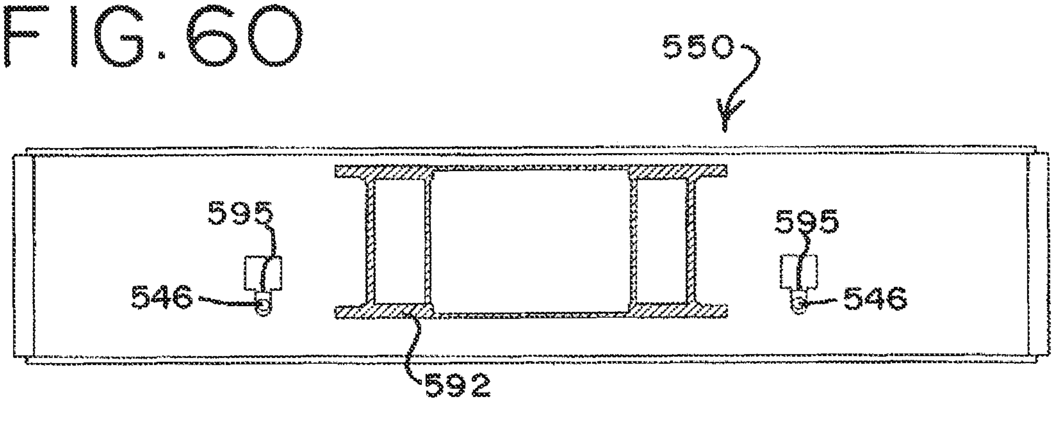
FIG. 60 is a cross-sectional view taken along line 60-60 of FIG. 51.

It will be noticed from FIGS. 58 and 59 that the rollers 588 have flanges on the outside to help keep the beams aligned side-to-side. Rollers 585, 586 and 587 also have such flanges. Preferably the rollers 585, 586, 587 and 588 are mounted in the side of the middle beam member 582 with bearings between the roller shaft and the roller, although no bearings are shown in the figures. Also, it is not clear from the drawings, but one of ordinary skill in the art will understand that there is a slight clearance on the sides and the top or bottom of the rollers compared to the beam members supported thereon.

FIGS. 61 and 62 show an alternative arrangement for the connection between the rear of the rotating bed 420 and the counterweight support frame 432 when the crane is set up without the fixed mast 517 (when the crane is set up in its first counterweight set-up configuration), as well as an alternative arrangement for the connection between the telescoping counterweight support beam 560 and the tension members 531 when the crane is set up in its second counterweight set-up configuration. Rather than using short links 462, the support on the rear of the rotating bed in the form of lugs 523 are located at a position where they can be pinned directly to lugs 620 on outer beam member 532, used as part of counterweight support beam 560 in the embodiment shown in FIGS. 61 and 62. Like the lugs 566, lugs 620 are each made of two plates with holes through them used for making a pinned connection with either the rotating bed (when the crane is set up in its first counterweight set-up configuration), or the bottom of a tension member 531 (when the crane is set up in its second counterweight set-up configuration). In the first counterweight set-up configuration, pins (not shown) pass through holes 632 in the lugs 620 and holes 562 in the lugs 523.

One of the benefits of the lugs 620 is that they include a top bar 624 and lower bar 626 between plates 621 and 622 that engage with the lug 523 on rotating bed 520 when the counterweight support beam 560 is fully retracted, as shown in FIG. 62 (where the left side plate has been removed for sake of clarity). Thus, the support 523 on the rear of the rotating bed engages with a counterweight beam support engagement (bars 624) positioned such that when the counterweight beam is in a fully retracted position, the support and the support engagement are able to transfer load from the counterweight beam directly to the rotating bed. At high boom angles, with no load on the hook, the moment of the counterweight system may exceed the offsetting moment of the combined boom and load moment as seen by the fixed mast 517. In that situation, the fixed mast will try to move backward and will compress the fixed mast stops 529 until the top bars 624 on the outer beam member lugs 620 engage the lug 523 on the rotating bed 520. (It should be noted that when the crane is set up with mast 517, no pins are placed in holes 562 and 632. These holes just also happen to line up when the tension member 531 is pinned to the lugs 620 and the counterweight support beam 560 is fully retracted.) At that point the rear of the rotating bed will be carrying part of the counterweight load, reducing the tendency of the mast 517 to tip backwards any further.

In addition, or alternatively, rather than the fixed mast 517 rotating backwards some distance under the deflection of the load until the bars 624 engage the support 523, some embodiments of the crane utilize an active control system. In such a system, encoders or other position and load sensors send signals reflective of the mast position, the counterweight position, the load on the hook, the counterweight load, and other parameters to a controller, such as a general or specific purpose computer programmed to receive such data. A control or stability program evaluates the data and, given the circumstances and if the counterweight is positioned sufficiently close to the rear-most fixed portion of the carbody, the controller will provide a signal to move the live mast 517 slightly rearward. In moving the live mast 517 rearward, the tension member 531 moves relatively downward, thereby lowering the counterweight support beam 560, the connected counterweight unit 535, and, of course, the counterweight support bars 620 onto the support 523. This, in turn, transfers a portion of the load of the counterweight unit 535 from the tension member 531 onto the rotating body 520 via the supports 523.

Preferably the counterweight unit is movable to a position so that the center of gravity of the counterweight unit is within a distance from the axis of rotation of less than 125% of the distance from the axis of rotation to the rear tipping fulcrum, and more preferably within a distance from the axis of rotation of less than 110% of the distance from the axis of rotation to the rear tipping fulcrum.

As noted above, prior art mobile lift cranes generally had multiple counterweight assemblies. The variable position counterweight of the preferred crane has only one counterweight assembly. Where the conventional designs require 330 metric tonne of counterweight, the crane 10 with a single variable position counterweight will require approximately 70% of this amount, or 230 metric tonne of counterweight, to develop the same load moment. The 30% counterweight reduction directly reduces the cost of the counterweight, although this cost is partially offset by the cost of the counterweight movement system. Under current U.S. highway constraints, 100 metric tonne of counterweight requires five trucks for transport. Thus, reducing the total counterweight reduces the number of trucks required to transport the crane between operational sites. Because the counterweight is reduced significantly, the maximum ground bearing reactions are also reduced by the same amount. The counterweight is positioned only as far rearward as required to lift the load. The crane and counterweight remain as compact as possible and only expand when additional load moment is required. A further feature is the capability to operate with reduced counterweight in the mid-position. The reduced counterweight would balance the backward stability requirements when no load is applied to the hook. The variable position function could then be turned off and the crane would operate as a traditional lift crane. With preferred embodiments of the invention, the total counterweight compared to a crane with a comparable capacity can be reduced, or if the total counterweight is the same, the stability of the crane can be increased, or the crane can be designed with a smaller footprint. Of course, some combination of all three of these advantages may be used in producing a new crane model.

A crane customer may initially decide to purchase and use the crane 410 with only the counterweight support frame 432, and not include an inner beam member 592 and middle beam member 582, nor the fixed mast 517. Then later the crane 410 could be converted to crane 510 by adding the fixed mast 517 and inserting the inner beam member 592 and middle beam member 582 into the counterweight support frame 432, making the counterweight support beam 560. Thereafter, inner beam member 592 and middle beam member 582 could be removed when the crane was set up without the fixed mast 517. However, it is more likely that the counterweight support beam 560 would remain intact once assembled, and used on the crane 410 without being extended, but simply used as a counterweight support frame 432.

In the first counterweight set-up configuration option (crane 10 or crane 410), the counterweight unit is not supported by a fixed mast or a derrick mast. Rather, the counterweight unit is supported on a counterweight support frame on the rotating bed. A counterweight movement system comprises a counterweight unit movement device connected so as to move the counterweight unit with respect to the counterweight support frame. In the second counterweight set-up configuration option (crane 110 or crane 510), the second counterweight unit is supported by a mast selected from a fixed mast and a derrick mast. A counterweight support beam is moveably connected to the rotating bed and the counterweight unit is supported on the counterweight support beam. The counterweight movement system comprises a counterweight support beam movement device connected so as to move the counterweight support beam with respect to the rotating bed. In the crane 110, the counterweight support beam is moveably connected to the rotating bed by being moveably connected to the counterweight support frame. In the crane 510, the counterweight support beam is moveably connected to the rotating bed by having a telescoping section that moves is moveably connected to the rotating bed by a front portion of the counterweight support beam.

In the first counterweight set-up configuration option, the crane 10 or crane 410 includes a counterweight tray movably supported on the counterweight support frame and counterweights are stacked directly on the counterweight tray. In the second counterweight set-up configuration option of crane 110, the counterweight support beam is attached to the counterweight tray and counterweights are stacked on the counterweight support beam by being stacked on a base plate that is on the counterweight support beam.

With each of the following embodiments, each may incorporate some or all of the features as described above. Any elements from each of the earlier embodiments discussed earlier that are not expressly discussed are incorporated and included as if reprinted here.

FIGS. 63-72 illustrate another embodiment that is similar to the crane 10 with the differences now explained. A mobile lift crane 710 includes lowerworks, or carbody, 712, ground engaging members 714; and a rotating bed 720 rotatably connected to the carbody 712 about an axis 702 of rotation that provides a plane of rotation 707 perpendicular to the axis 702.

Figure 65:
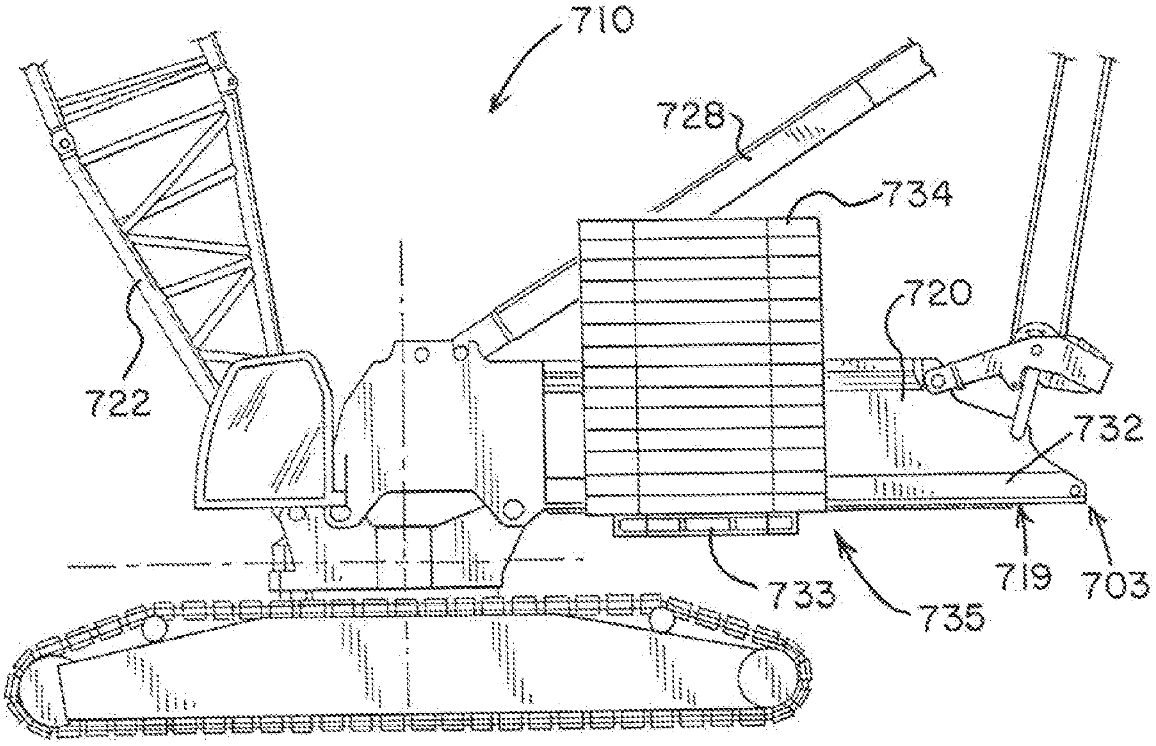
FIG. 65 is a partial side elevation view of the crane of FIG. 63 with the counterweight unit in a forward position.
Figure 66:
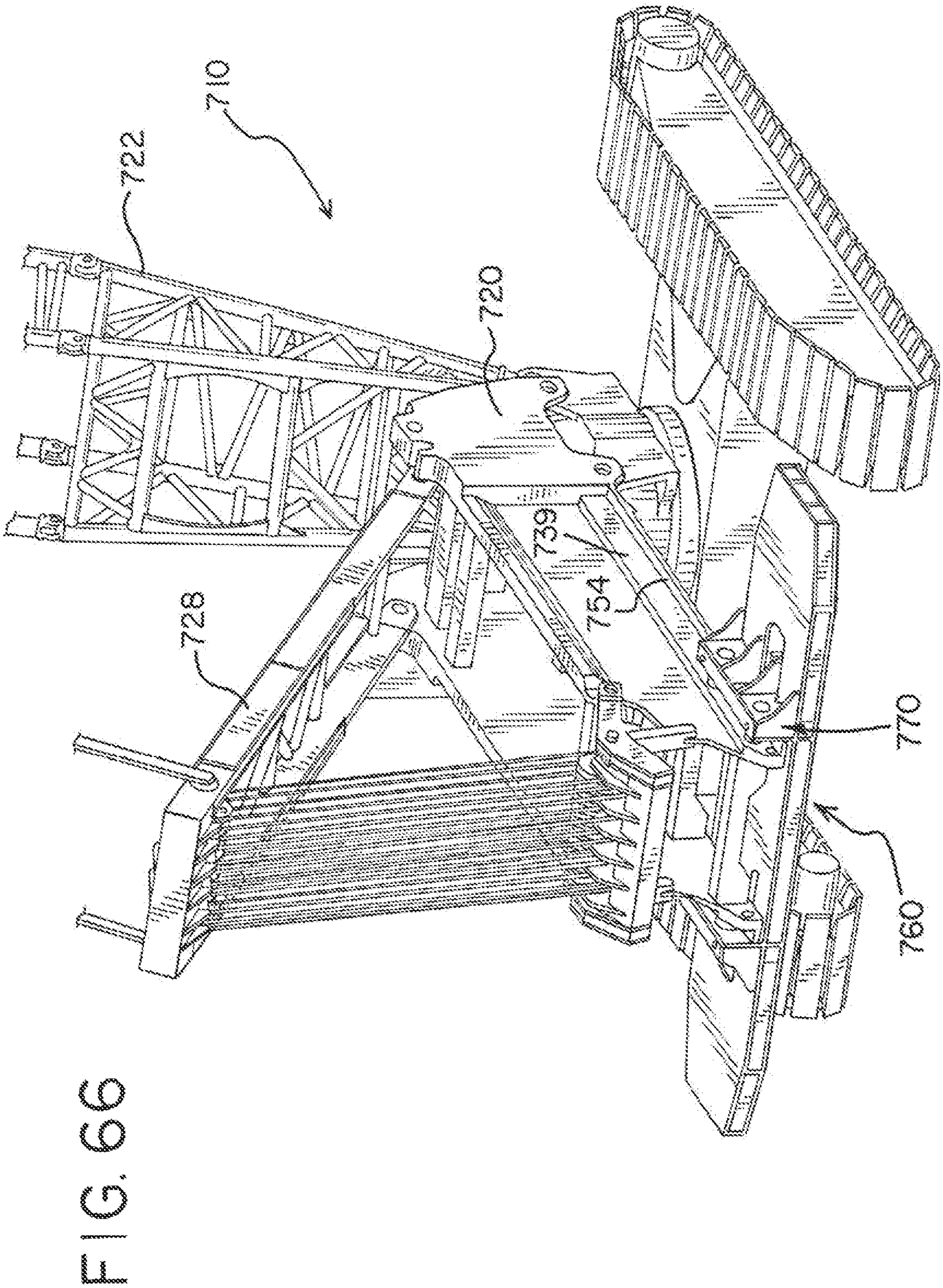
FIG. 66 is a partial rear perspective view of the crane of FIG. 63 with the counterweight unit in a rearward position.
Figure 67:
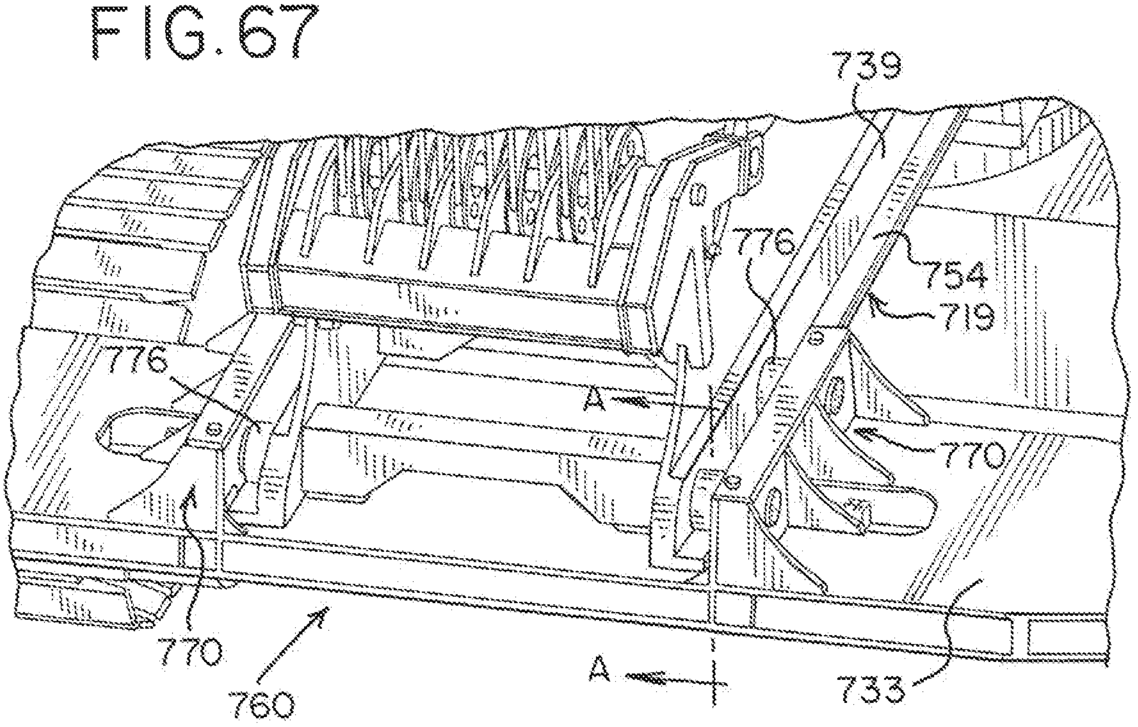
FIG. 67 is a close-up and partial rear perspective view of the crane in FIG. 63 and more particularly the counterweight movement unit.
Figure 68:
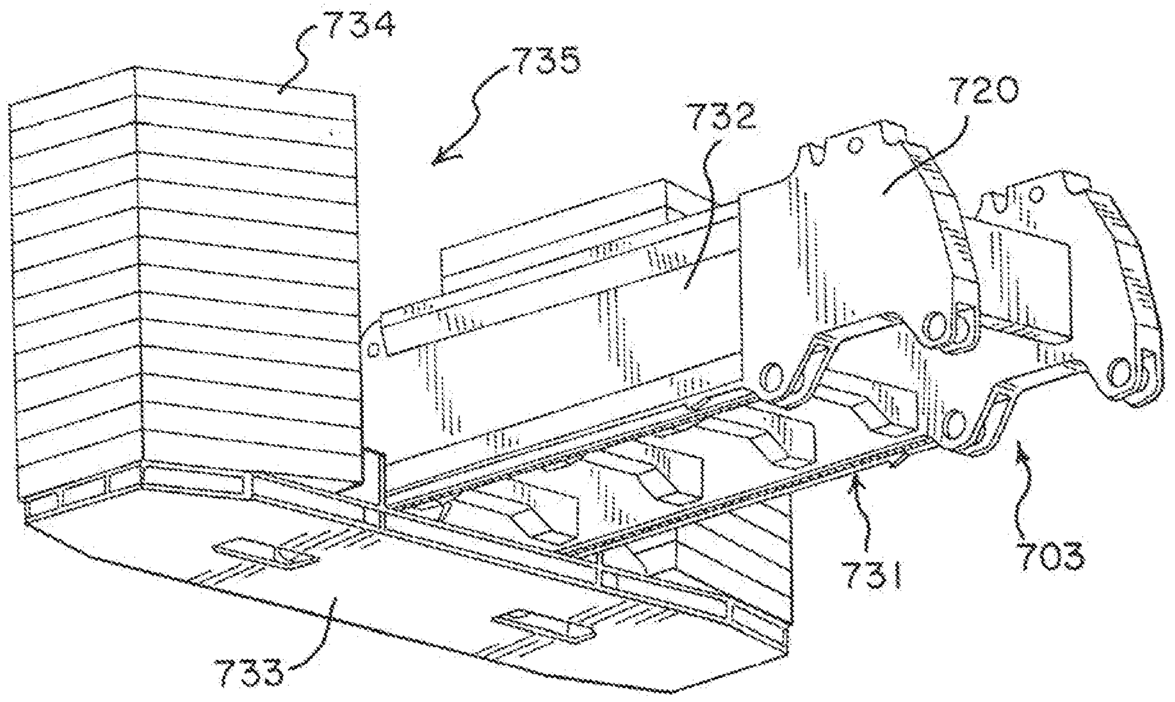
FIG. 68 is a partial front perspective view taken from below of a rotating body, counterweight support frame, counterweight unit, and counterweight tray of the crane of FIG. 63 with the counterweight unit in a rearward position.
Figure 69:
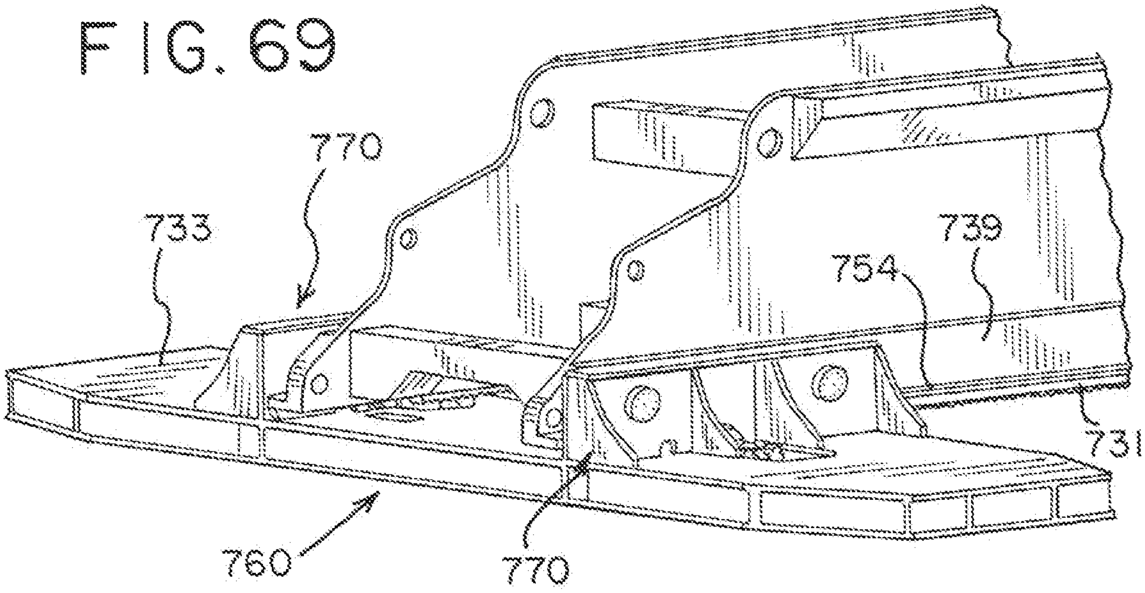
FIG. 69 is a partial rear perspective of the counterweight unit movement device and trolley coupled to the counterweight support frame and without the counterweight, all part of the crane of FIG. 63.
Figure 70:
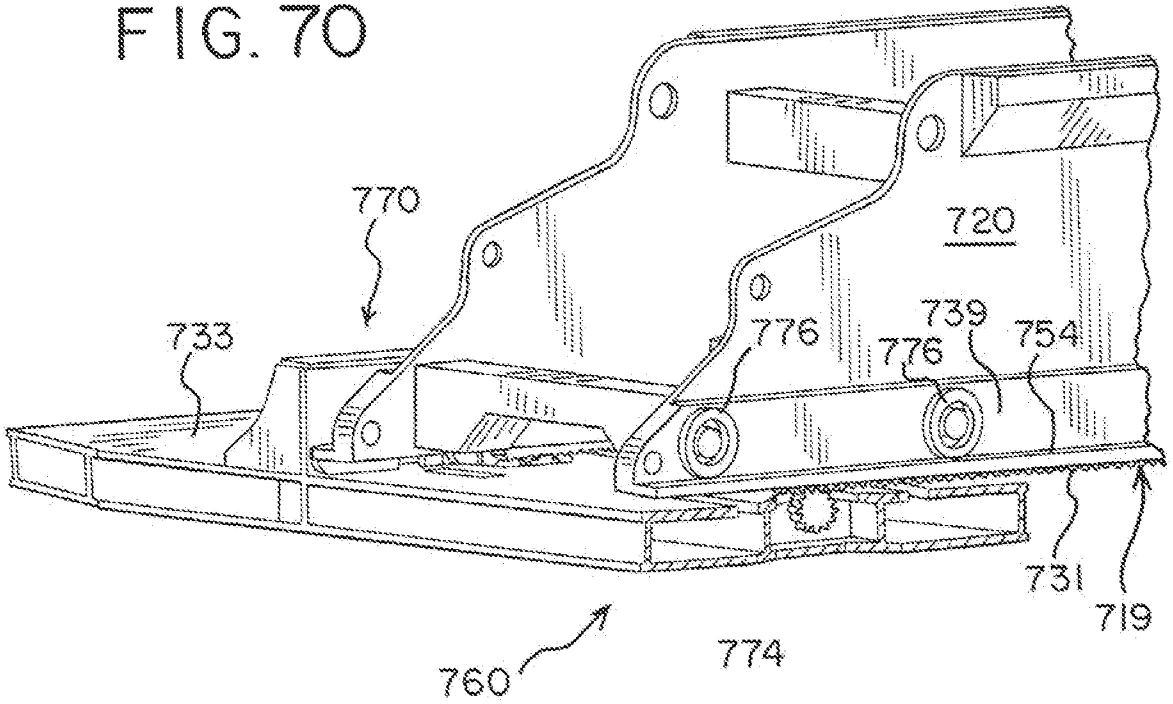
FIG. 70 is a partial rear perspective view of the counterweight unit movement device and trolley coupled to the counterweight support frame and without the counterweight in taken through cross-section A-A of FIG. 67.

The rotating bed 720 supports a boom 722 pivotally mounted in a fixed position on a front portion 704 of the rotating bed 720; a live mast 728 mounted at its first end 705 on the rotating bed 720; and a movable counterweight unit 735 having one or more counterweights or counterweight members 734 on a support member 733 in the form of a counterweight tray. The rotating bed 720 has a rear-most fixed portion 703 as best seen in FIG. 65.

A boom hoist system (not illustrated) on crane 710, like that of the boom hoist system 6 in FIG. 1, allows the angle of the boom 722 relative to a plane of rotation 707 of the rotating bed 720 to be changed. The boom hoist system includes those features and elements described above in detail with respect to crane 10. Alternatively, the mast 728 could be used as a fixed mast during normal crane operation, much like mast 28 as discussed above.

The counterweight unit 735 in this embodiment is similar to the counterweight unit 435 discussed above. The counterweight unit 735 is movable with respect to the rest of the rotating bed 720. In the crane 710, the rotating bed 720 includes a counterweight support frame 732, either formed integrally with the rotating bed 720 or in the form of a welded plate structure coupled to the rotating bed 720. The counterweight support frame 732 supports the movable counterweight unit 735 in a movable relationship with respect to the counterweight support frame 732 and the rotating bed 720.

While the counterweight support frame 732 may comprise a sloped surface as discussed above with respect to counterweight support frame 32, in the illustrated embodiment the counterweight support frame 732 includes a surface 754 without a substantial positive or negative slope. Flanges 739 provide the surface 754. Replaceable wear surfaces (not labeled) optionally are attached to the surface 754. In addition, one or more individually replaceable sections of steel bar 731 (best seen in FIGS. 70 and 71), like steel bar 434, may be bolted onto a lower surface 719 of the counterweight support frame 732 with fasteners of known types, such as socket head cap screws. In some embodiments, the steel bar 731 forms the surface 754 opposite of a side that includes machined or forged teeth 736. The steel bar 731 with the teeth 736 forms a rack.

In crane 710, the counterweight unit movement device 760 is connected between the rotating bed 720 and the counterweight unit 735 by being connected between the counterweight support frame 732, as part of the rotating bed 720, and the counterweight unit 735. The counterweight unit 735 comprises a counterweight tray 733 pinned or otherwise coupled to a movable trolley 770 (FIGS. 66, 67, and 69-72). In some embodiments (including those discussed above and below), the trolley 770 and the counterweight tray 733 form an integrated unit. The counterweight tray 733 is suspended beneath the counterweight support frame 732.

The trolley 770 rides on four vertical rollers 776 that engage the surface 754 along each side of the counterweight support frame 732. The trolley 770 optionally includes horizontal rollers 779 similar to horizontal rollers 478, which bear at least a portion of lateral or side-loading, such as when the rotating bed 720 rotates.

The counterweight unit movement device 760 comprises at least one, and in this embodiment, two motors and associated gear boxes 772, with each motor and gear box 772 driving a gear 774 connected to the trolley 770. The motors can be hydraulic motors, electric motors, or motors of other types. The gears 774 engage with the teeth 736 on the two sides of the counterweight support frame 732 to move the trolley 770 with respect to the counterweight support frame 732 as the motor and gearbox 772 turns the gear 774. In this way the counterweight unit 735 can move with respect to the counterweight support frame 732 and/or the rotating bed 720 by being mounted on trolley 770.

As with the counterweight unit 35, the position of the counterweight unit 735 may be detected by keeping track of the revolutions of the motor and gear box 772 and/or the gear 774 as it engages and travels along the teeth 736.

FIGS. 73-81 disclose a crane 810 similar in many respects to the crane 110 disclosed in FIGS. 13-15 and incorporates the same features and elements except as modified and described below. In addition to the live mast 828, this embodiment includes a fixed position mast 817. In the crane 810, as with the other embodiments disclosed herein, the rotating bed 820 is not provided with any separate functional counterweight, and the movable counterweight unit 835 is never supported by the ground during crane pick, move and set operations other than indirectly by movable ground engaging members 814 on the rotating bed 820.

As with crane 710, the rotating bed 820 includes a counterweight support frame 832, either formed integrally with the rotating bed 820 or in the form of a welded plate structure coupled to the rotating bed 820. In this embodiment, the counterweight support frame 832 supports a movable counterweight support beam 859 in a movable relationship with respect to the counterweight support frame 832 and the rotating bed 820.

In this embodiment, the counterweight support frame 832 includes a surface 854. Flanges 839 provide the surface 854. Replaceable wear surfaces (not labeled) optionally are attached to the surface 854. In addition, one or more individually replaceable sections of steel bar 831 are positioned on a lower surface 819 of the counterweight support frame 832. In some embodiments, the steel bar 831 forms the surface 854 opposite of a side that includes machined or forged teeth (not illustrated), similar to forged teeth 736. The steel bar 831 with the teeth forms a rack.

Crane 810 includes an additional counterweight support beam 859 added to it, as well as the fixed mast 817. The counterweight support beam 859 is moveably connected to the counterweight support frame 832 and/or the rotating bed 820. In the embodiment illustrated, the counterweight support beam 859 is positioned below the counterweight support frame 832 and/or the rotating bed 820.

Other embodiments, however, include a counterweight support beam that is positioned to the sides, or laterally away, from the counterweight support frame and/or the rotating bed. For example, in alternative embodiments the counterweight support beam might be spaced laterally away from the counterweight support frame and/or the rotating bed while also being parallel, above, or below the counterweight support frame and/or the rotating bed. Such an alternative configuration might be preferred, for example, when the distance between the counterweight support frame and/or rotating bed relative to the carbody is insufficient to position the counterweight support beam below the counterweight support frame and/or the rotating bed.

The crane 810 uses a counterweight support beam movement device 890, as explained below. Thus, in this embodiment, the counterweight movement system includes a counterweight unit movement device 860 and a counterweight support beam movement device 890. This counterweight support beam movement device 890 is connected between the counterweight support beam 859 and the counterweight support frame 832 and/or the rotating bed 820 such that the counterweight support beam 859 can be moved with respect to the length of the rotating bed 820 away from the axis of rotation 802 at the rotational connection of the rotating bed 820 and the carbody 812, and extended rearwardly of the rear-most fixed portion 803 of the rotating bed 820. The movement of the counterweight support beam 859 is generally horizontal and in a direction in line with a length of the counterweight support beam 859. As will be appreciated, the counterweight support beam 859 and associated elements may be added to crane 710 as an aftermarket addition to increase the capacity of the crane 710.

Figure 77:
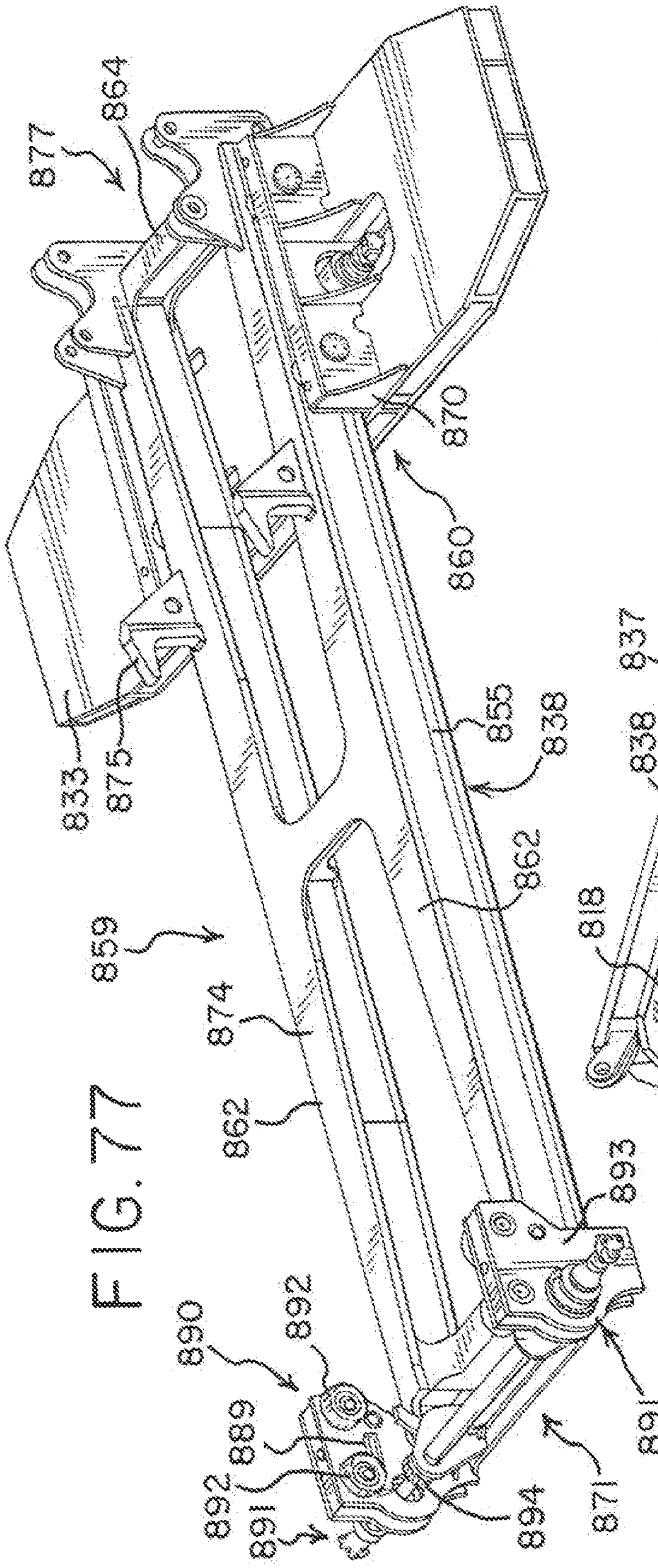
FIG. 77 is a top perspective view of the counterweight support beam, counterweight support beam movement device, the counterweight tray without counterweight, and the counterweight unit movement device of the crane in FIG. 73.
Figure 78:
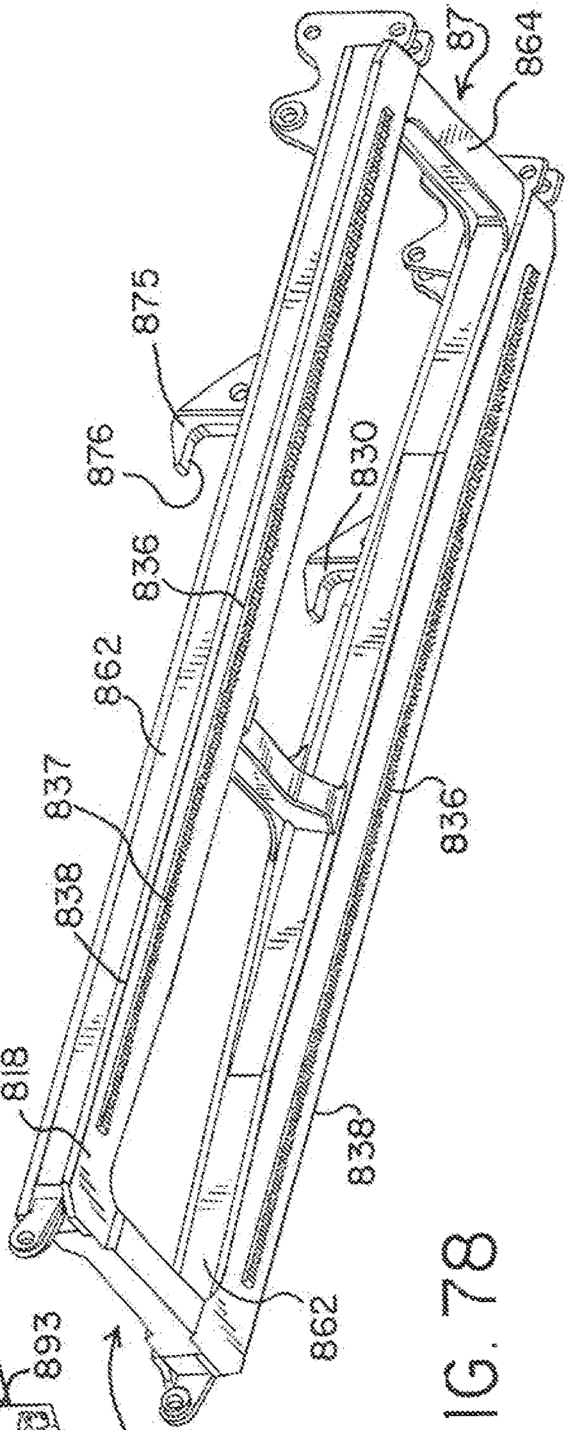
FIG. 78 is a bottom perspective view of the counterweight support beam of the crane in FIG. 73.

The counterweight support beam 859 can be solid, formed of rectangular or tubular structures, or other configurations. The embodiment disclosed in FIGS. 77 and 78 illustrates a counterweight support beam 859 that is made from two spaced apart side members 862 connected together in the rear 877 by a cross member 864. The front ends 871 of the two side members 862 connect to a counterweight support beam movement device 890, which is moveably mounted on a counterweight support frame 832 on the rotating bed 820.

Much like counterweight support frame 832, each side 862 of the counterweight support beam includes a surface 855, as best seen in FIGS. 77 and 78. Flanges 838 provide the surface 855. Replaceable wear surfaces (not labeled) optionally are attached to the surface 855. In addition, one or more individually replaceable sections of steel bar 836, like steel bar 831, may be bolted or otherwise positioned on a lower surface 818 of the counterweight support beam 859 with socket head cap screws, for example, or other known fasteners. In some embodiments, the steel bar 836 forms the surface 855 opposite of a side that includes machined or forged teeth 837 similar to forged teeth 736. The steel bar 836 with the teeth 837 forms another rack.

Figure 79:
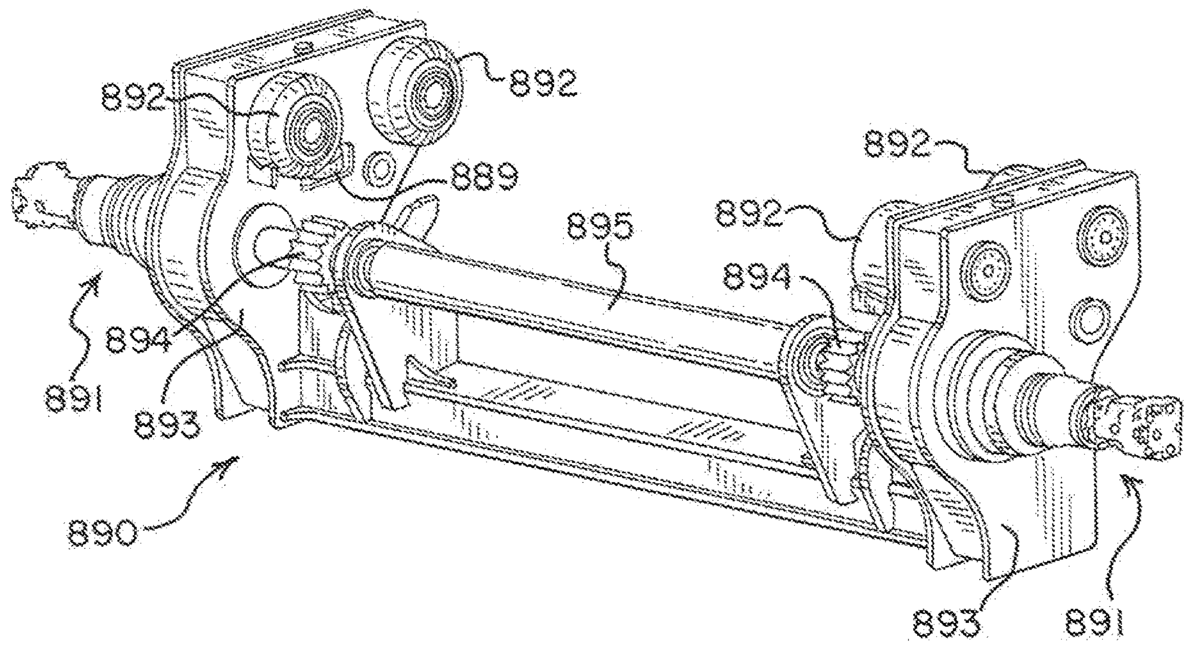
FIG. 79 is a top perspective view of the counterweight support beam movement device of the crane in FIG. 73.

The counterweight support beam movement device 890 includes a frame 893 with a plurality of rollers 892 as best illustrated in FIGS. 77 and 79. In this embodiment, four vertical rollers 892 engage the surface 854 along each side of the counterweight support frame 832. The frame 893 optionally includes horizontal rollers 889 to bear at least a portion of any lateral or side-loading.

The counterweight support beam movement device 890 includes at least one motor and associated gear 891. In the illustrated embodiment, the counterweight support beam movement device 890 includes a plurality of motors and associated gears 891, and while two motors are illustrated more than two may be used. While the following embodiment discusses electric or hydraulic motors for use with a rack and pinion arrangement, as discussed above other embodiments of acceptable motors and gears include ropes and pulleys, hydraulic cylinders (single and double action, for example), chain and gear systems, threaded rods/screw drives, and others. Each motor and gear box 891 drives a gear 894 connected to the frame 893. The motors can be hydraulic motors, electric motors, or motors of other types. The gears 894 engage with the teeth on the two sides of the counterweight support frame 832 to move the frame 893 with respect to the counterweight support frame 832 as the motor and gearbox 891 turns the gear 894. In this way the counterweight support beam 859 can move with respect to the counterweight support frame 832 and/or the rotating bed 820 by being mounted on the frame 893.

In some embodiments, each motor and gear box 891 can operate independently of the other. In the illustrated embodiment, each motor and gear box 891 is coupled to the other via a shaft 895. The shaft 895 allows one motor and gear box 891 to assist the other motor and gear box 891 under certain operating conditions.

For example, counterweight unit 835 may be at its most rearward position, i.e., furthest distance from the axis of rotation 802 during a heavy-lift pick, move, and set operation. Perhaps during the pick, move, and set operation it is necessary for the crane operator to bring the load closer to the axis of rotation 802 by raising the boom 822, which would draw the center of gravity closer to the axis of rotation 802. As a consequence, the counterweight movement unit 860 and/or the counterweight support beam movement device may individually or collectively operate to draw the counterweight unit 835 nearer to the axis of rotation 802 to ensure that the center of gravity does not move too far rearward and cause an unstable operating condition.

Consider, now, the circumstance in which the crane operator must concurrently swing or rotate the rotating bed 820 while simultaneously raising the boom 822 during the pick, set, and move operation. Recall that at the initiation of the movement the counterweight unit 835 was at its most distant. The process of rotating or swinging the counterweight will impose a large compressive load on one side member 862 and its associated motor 891 of the counterweight support beam 859, while imposing a large tensile load on the other side member 862 and associated motor 891 of the counterweight support beam. The disparity in loads may cause one motor 891 to operate more slowly or asynchronously relative to the other motor 891. Such asynchronous operation could lead to the counterweight support beam movement device to operate suboptimally. To overcome this, then, a shaft 895 optionally couples the two motors 891 together so that one might assist the other.

As noted, it typically is beneficial to ensure that the motors 891 and associated gears 894 operate synchronously or near-synchronously. To ensure this occurs, it is necessary during manufacturing to connect the shaft 895 to each motor 891 and, by extension, each gear 894 and the teeth on the rack or bar 831, when the collective gear train is aligned. Given the number of components, including those not illustrated in the motor and associated gear boxes 891, this is often a difficult and time-consuming task.

Figure 80:
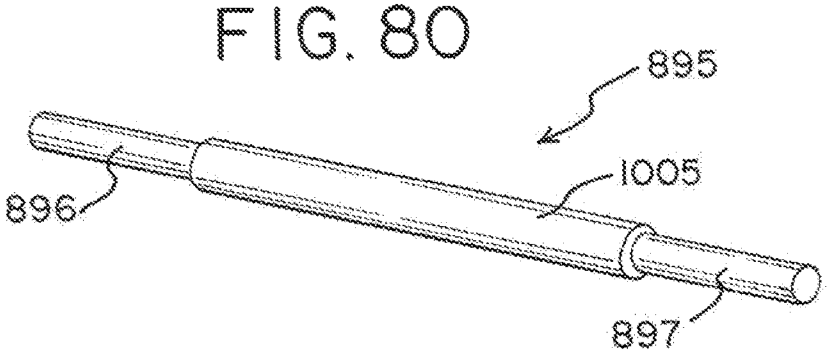
FIG. 80 is a top perspective view of an embodiment of a shaft of the counterweight support beam movement device of FIG. 79.
Figure 81:
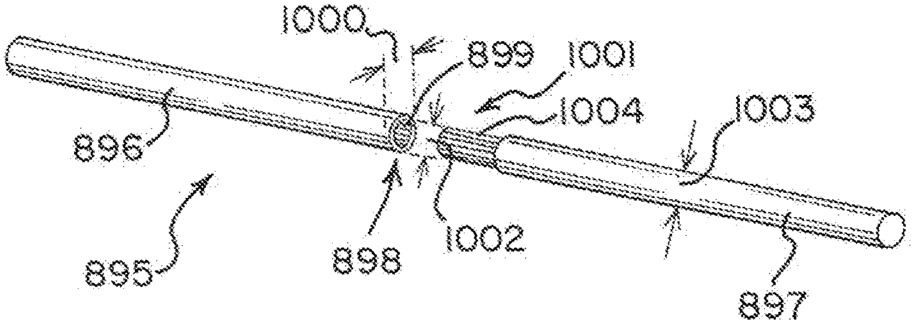
FIG. 81 is an exploded top perspective view of the shaft of FIG. 80.
Figure 82:
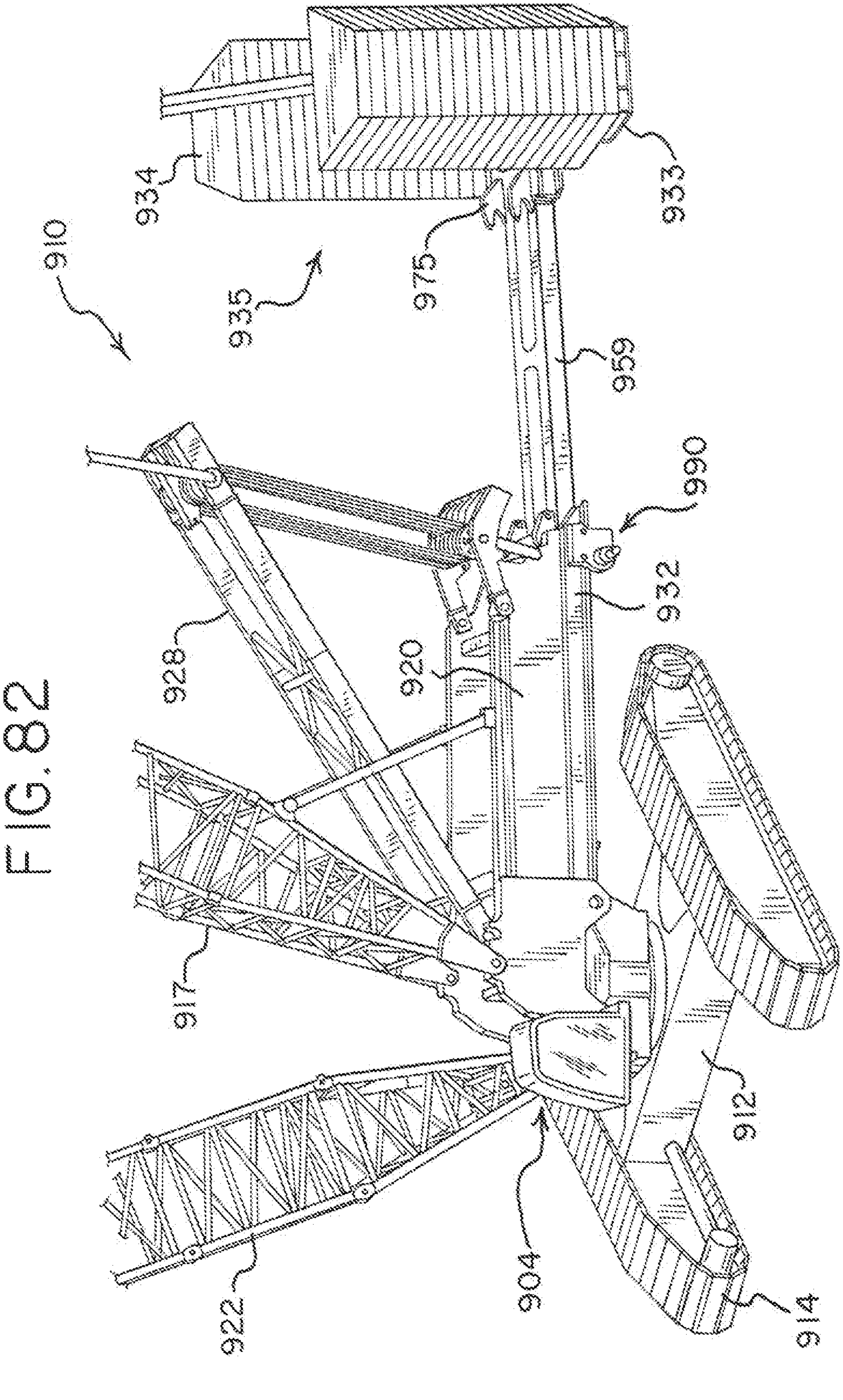
FIG. 82 is a partial top perspective view of a ninth embodiment of a crane.
Figure 83:
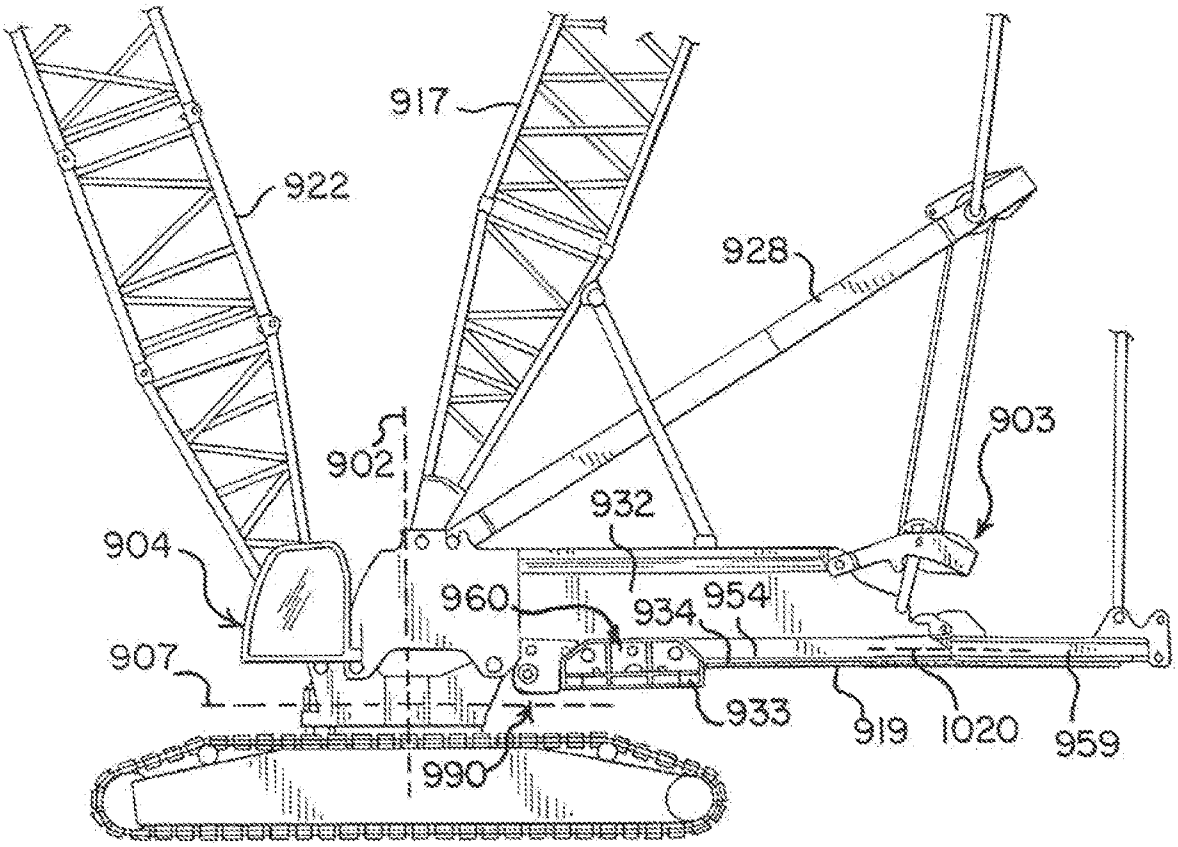
FIG. 83 is a partial side elevation view of the crane in FIG. 82 with the counterweight unit in the forward position and without the counterweight for clarity.
Figure 84:
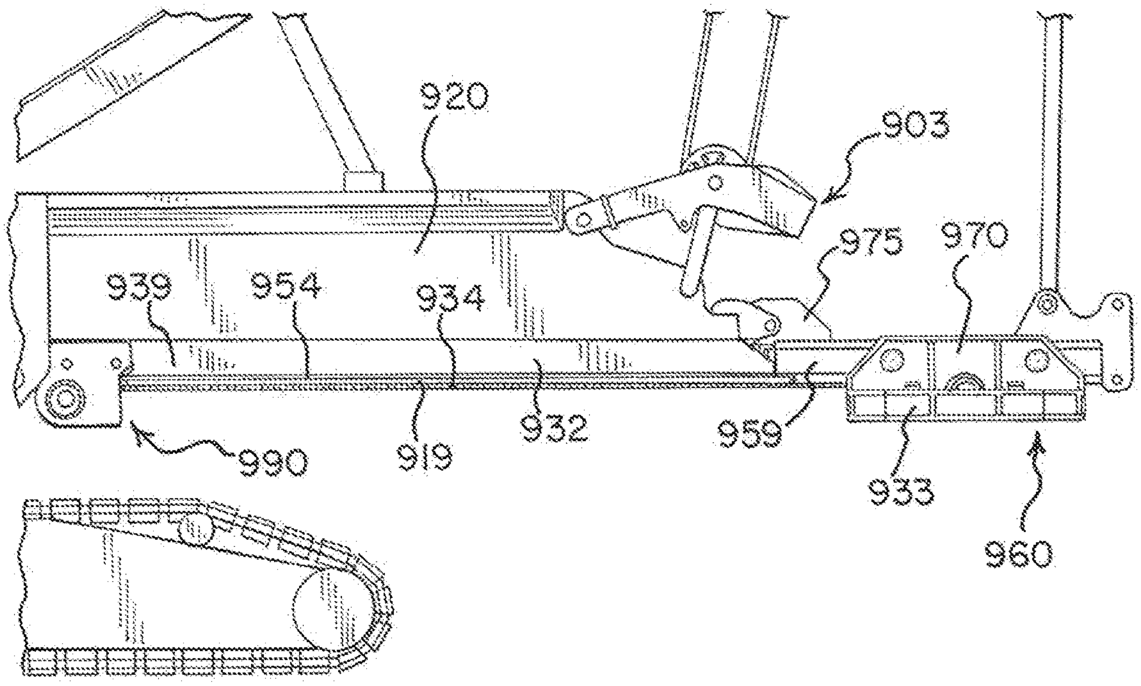
FIG. 84 is a partial side elevation view of the crane in FIG. 82 with the counterweight unit in an intermediate position and without the counterweight for clarity.
Figure 85:
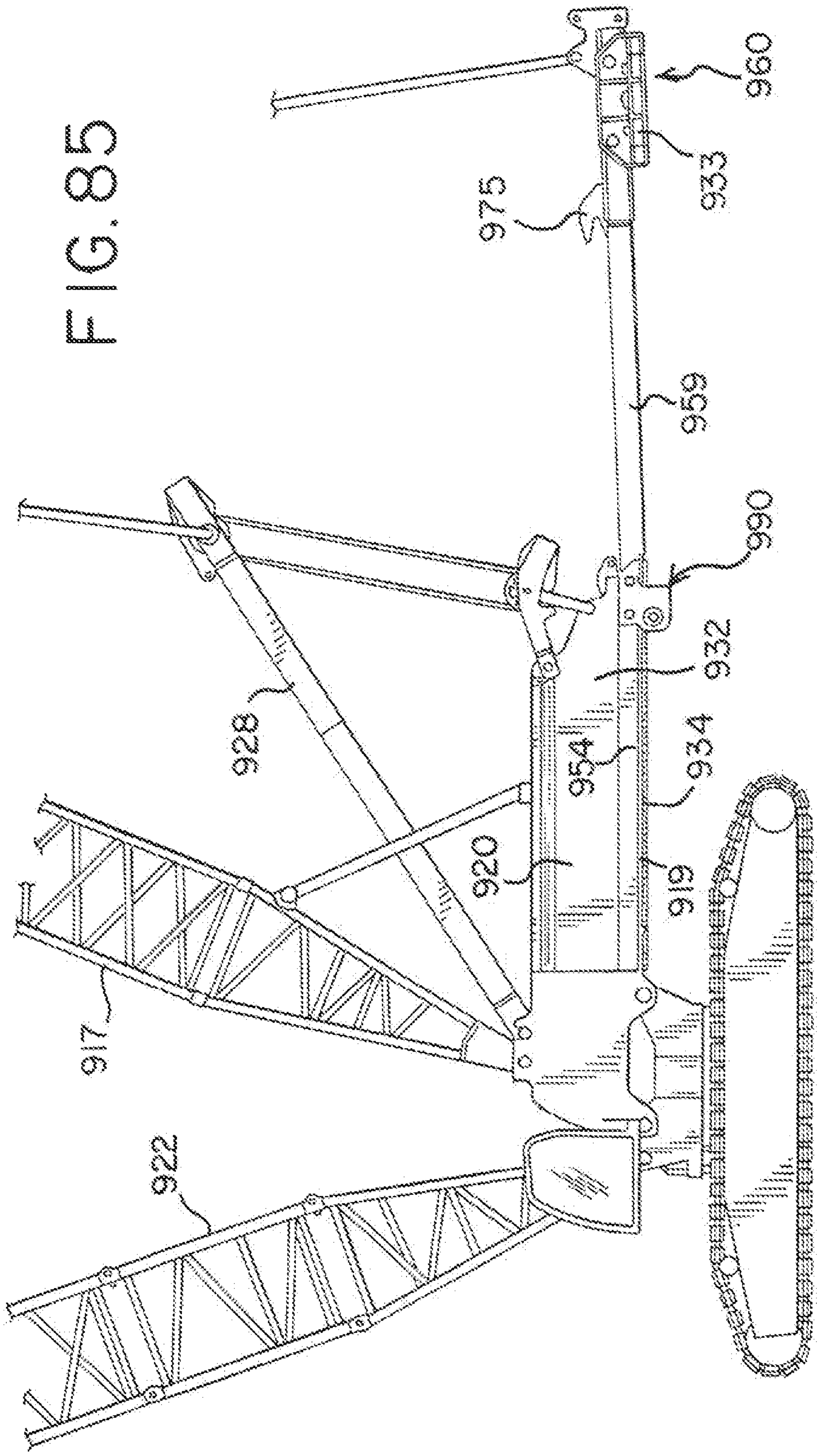
FIG. 85 is a partial side elevation view of the crane in FIG. 82 with the counterweight unit in a rearward position and without the counterweight for clarity.
Figure 86:
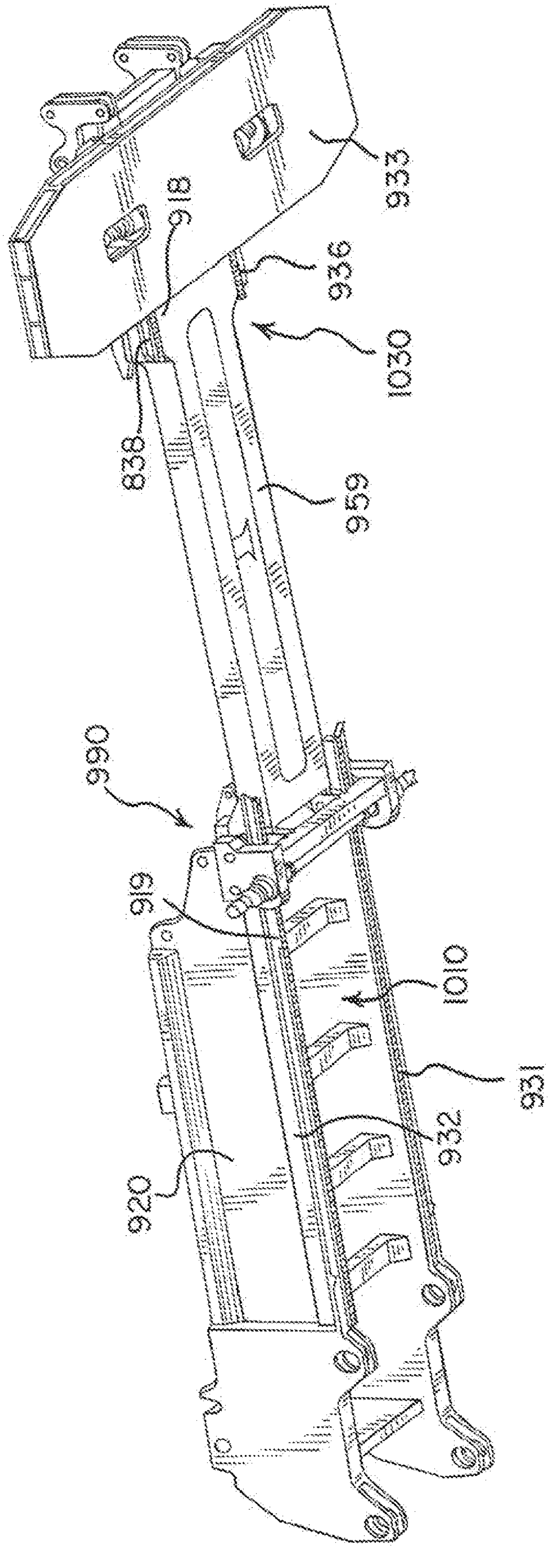
FIG. 86 is a bottom perspective view of the rotating bed, counterweight support frame, counterweight support beam, counterweight support beam movement device, and counterweight tray without counterweight of the crane in FIG. 82.

To solve the alignment issues during assembly, the shaft 895 may not be solid. Rather, as illustrated in FIGS. 80 and 81, the shaft 895 optionally is formed of a first part 896 that is separable from a second part 897.

The first part 896 of the shaft 895 includes a recess 898 and has an inner diameter of 1000. Within the recess 898, the first part 896 includes a first engagement surface 899, such as splines.

The second part 897 of the shaft 895 has a first diameter 1003 and a necked down portion 1000 with a second diameter 1002 that is smaller than the first diameter 1000. The second diameter 1002 is also smaller than the inner diameter 1000 of the first part 896 so that the necked down portion 1001 may be inserted into the recess 898. The necked down portion 1001 includes a second engagement surface 1004, such as complementary splines, teeth or other similar structure designed to engage and transmit torque to the first engagement surface 899, thereby coupling the first part 896 to the second part 897. An optional sleeve 1005 is coupled to shaft 895 and, in some embodiments integral to one or the other of the first part 896 and second part 897. The sleeve 1005 covers the location where the first part 896 is coupled to the second part 897, and protecting it from debris and dirt.

The collective engagement surface 899-1004 provides a gear ratio relative to the collective motors and associated gear boxes 891 and gears 894. It will be appreciated, then, that during assembly it will be easier to align each of the gears 894 and associated motors and gear boxes 891. This is so because one merely has to rotate one of the first part 896 and the second part 897 relative to the other before coupling the first part 896 to the second part 897. The incremental rotation of the first part 896 to the second part 897 will increment or clock the collective first part 896/motor and gear box 891/gear 894 relative to the second part 897/motor and gear box 891/gear 894.

As an example of such a system, the first engagement surface 899 might have 42 teeth or splines. As known, dividing the 360 degrees of a circle because shaft 895 is round by 42 indicates that rotating the first part 896 by just one tooth provides 8.57 degrees of rotation. Now, engagement surface 1004 on the second part 897 might have 43 splines or teeth. Thus, rotating the first part 896 relative to the second part 897 provides an adjustment of 8.57 degrees dividing by 43, or a relative adjustment of 0.2 degrees. Relative to each motor and gear box 891 on either side, then, the relative adjustment is 0.2 degrees divided by two (because there are two sides, each with its own motor and gear box 891), indicating a relative adjustment of 0.1 degrees. This adjustability of 0.1 degrees for each incremental clock or rotation of the first part 896 relative to the second part 897 is less than the relative play and/or backlash in the entire gear train.

Alternatively, rather than mechanically coupling the motor and associated gear box 891 on each side with a shaft 895, the motor and associated gear box 891 might be capable of individual and separate operation. In this embodiment, a controller operates to ensure that each motor and associated gear box 891 operate synchronously notwithstanding the fact that the two are not mechanically coupled. To achieve this, some embodiments of the crane utilize an active control system. In such a system, encoders or other position and load sensors send signals reflective of the mast position, the counterweight position, the counterweight support boom position, the load on the hook, the counterweight load, and other parameters to a controller, such as a general or specific purpose computer programmed to receive such data. For example, digital or analog encoders coupled to the motor and gear box 891 and/or the gear 894 can generate a signal reflective of the position of each and transmit the data to the controller. The controller, in turn, uses that data to determine the relative positions of each side of the counterweight support beam movement device 890 and sends a signal to one and/or the other motor and associated gear box 891 to ensure that it remains positionally synchronized with the associated gear box and motor 891. (Embodiments of such a positional control system are equally applicable to the counterweight movement device 860.)

This process of incrementing or clocking these components at the shaft provides for controlled adjustment of the system to ensure the operative alignment of all the components. By selecting the proper gear/splines/teeth on the first engagement surface 899 and second engagement surface 1004 relative to the collective gear ration of each respective motor and gear box 891/gear 894, it is significantly easier and less time consuming to align two motors and associated gear boxes 891/gears 894 as compared to the embodiment with a solid shaft.

The counterweight unit 835 is supported on the counterweight support beam 859 in a movable relationship with respect to the counterweight support beam 859. The counterweight unit movement device 860 is identical to the counterweight unit movement device 760 and is connected between the counterweight support beam 859 and the counterweight unit 835 so as to be able to move the counterweight unit 835 toward and away from the boom 822. The counterweight unit 835 may be moved to and held at a position in front of the top 870 of the fixed mast 817 and moved to and held at a position rearward of the top 870 of the fixed mast 817.

Figure 71:
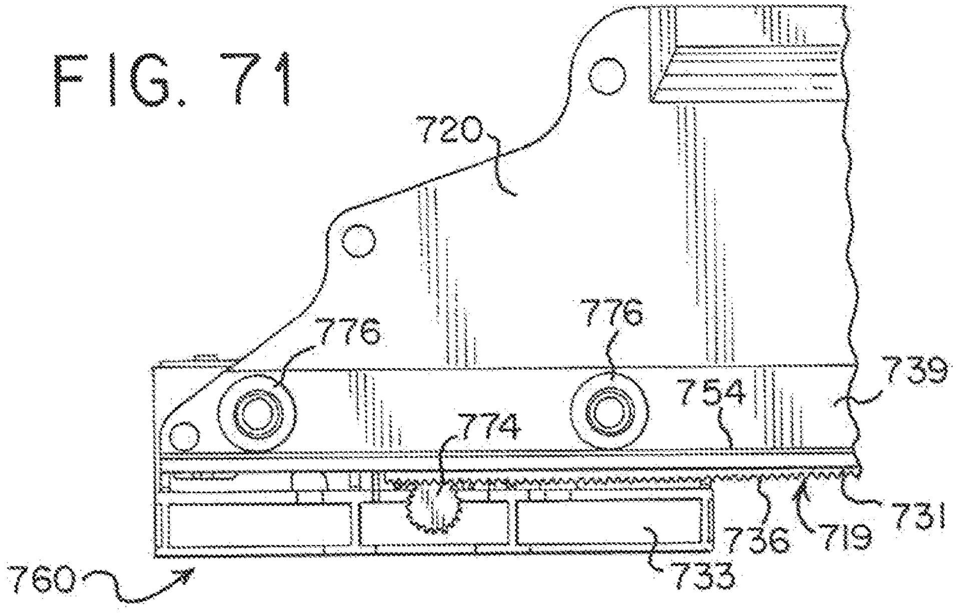
FIG. 71 is a partial side elevation view of the counterweight unit movement device and trolley coupled to the counterweight support frame and without the counterweight in taken through cross-section A-A of FIG. 67.
Figure 72:
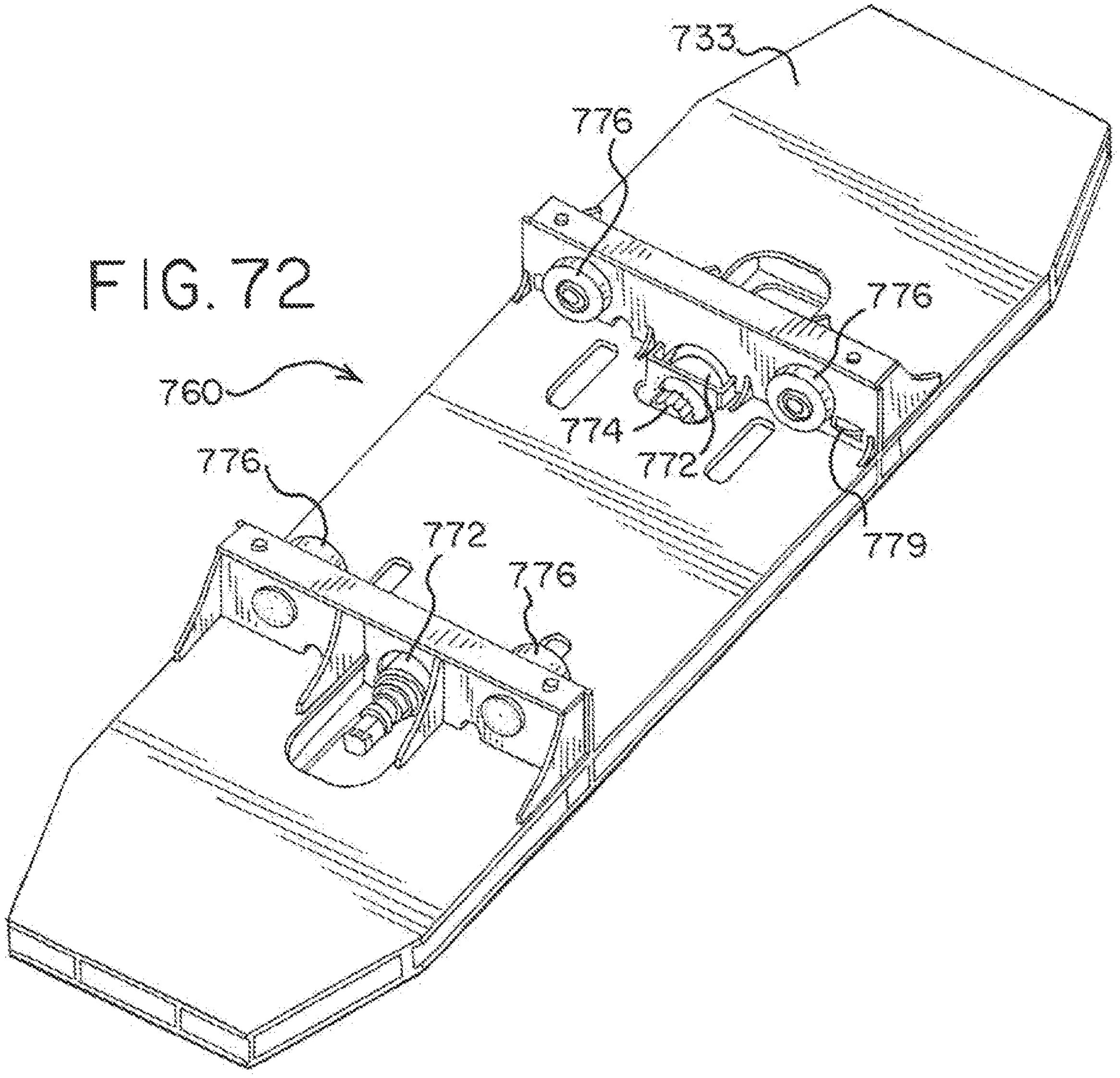
FIG. 72 is a top perspective view of the counterweight tray without the counterweight, the counterweight movement device, and the trolley of the crane in FIG. 63.
Figure 73:
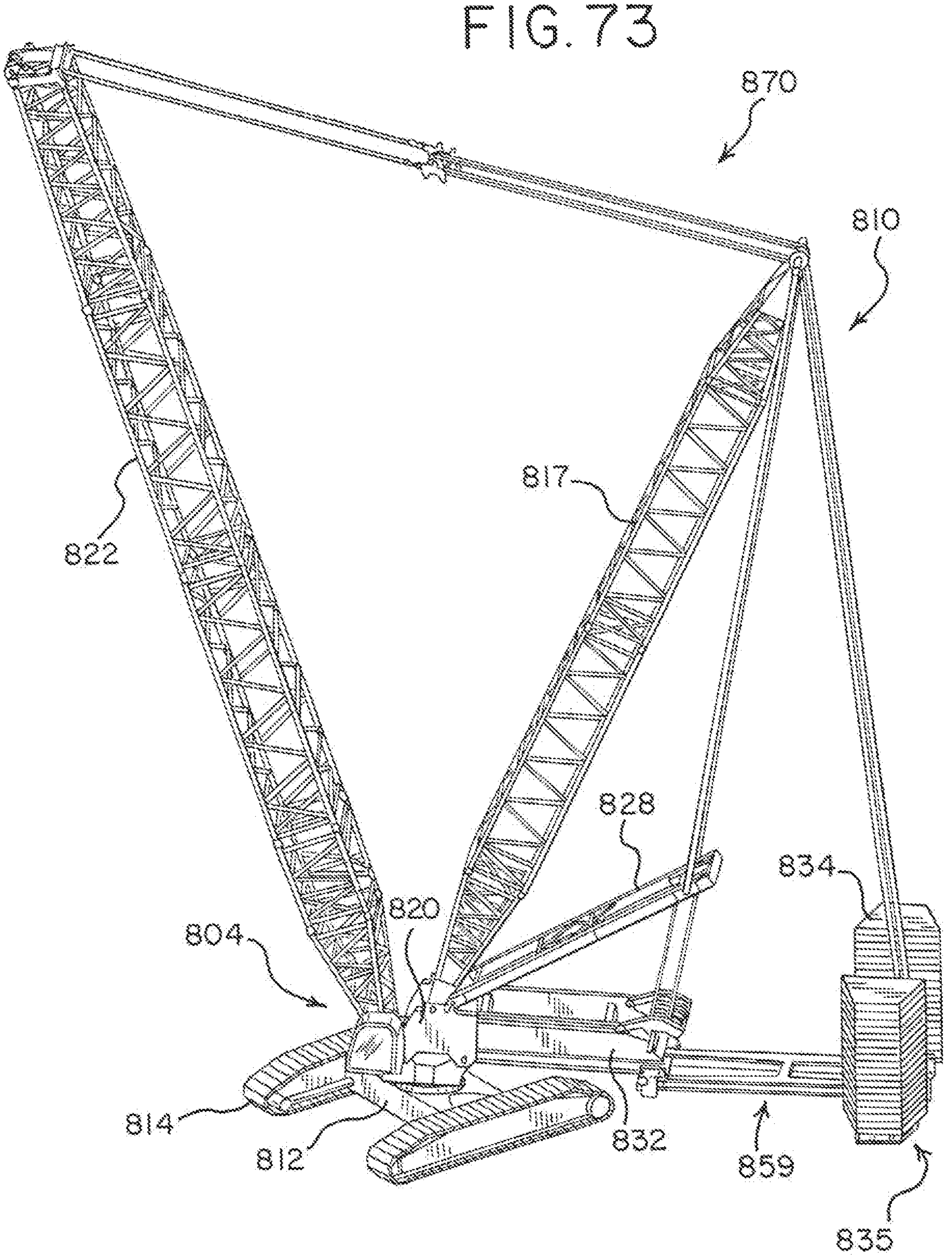
FIG. 73 is a perspective view of an eighth embodiment of a crane.
Figure 74:
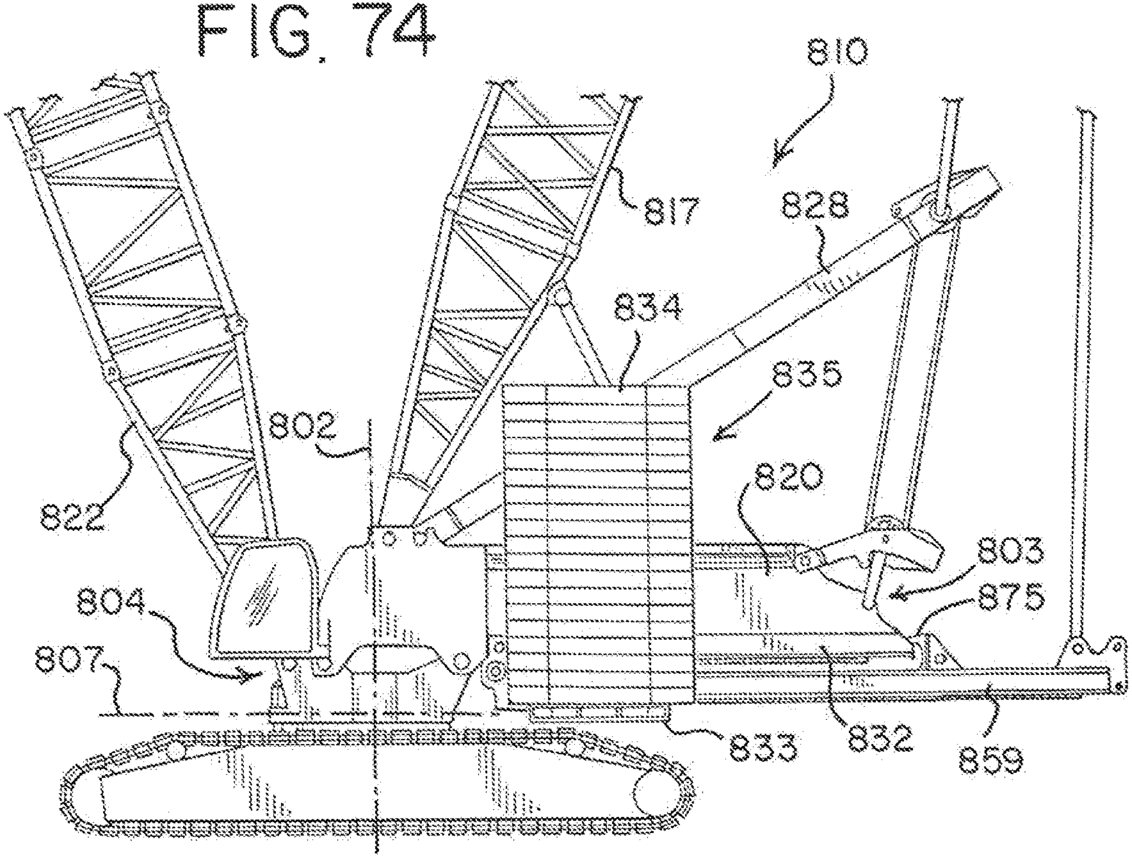
FIG. 74 is a partial side elevation view of the crane in FIG. 73 with the counterweight unit in the forward position.
Figure 75:
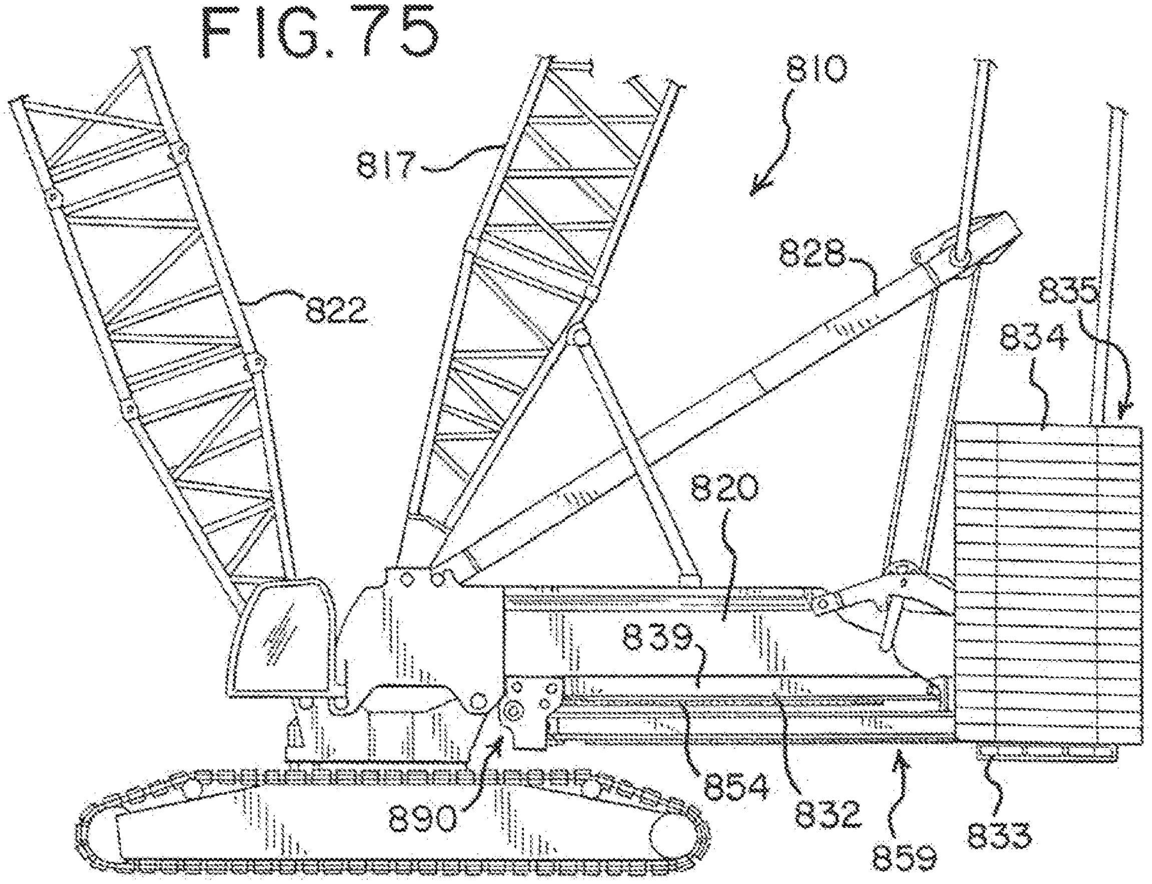
FIG. 75 is a partial side elevation view of the crane in FIG. 73 with the counterweight unit in an intermediate position.
Figure 76:
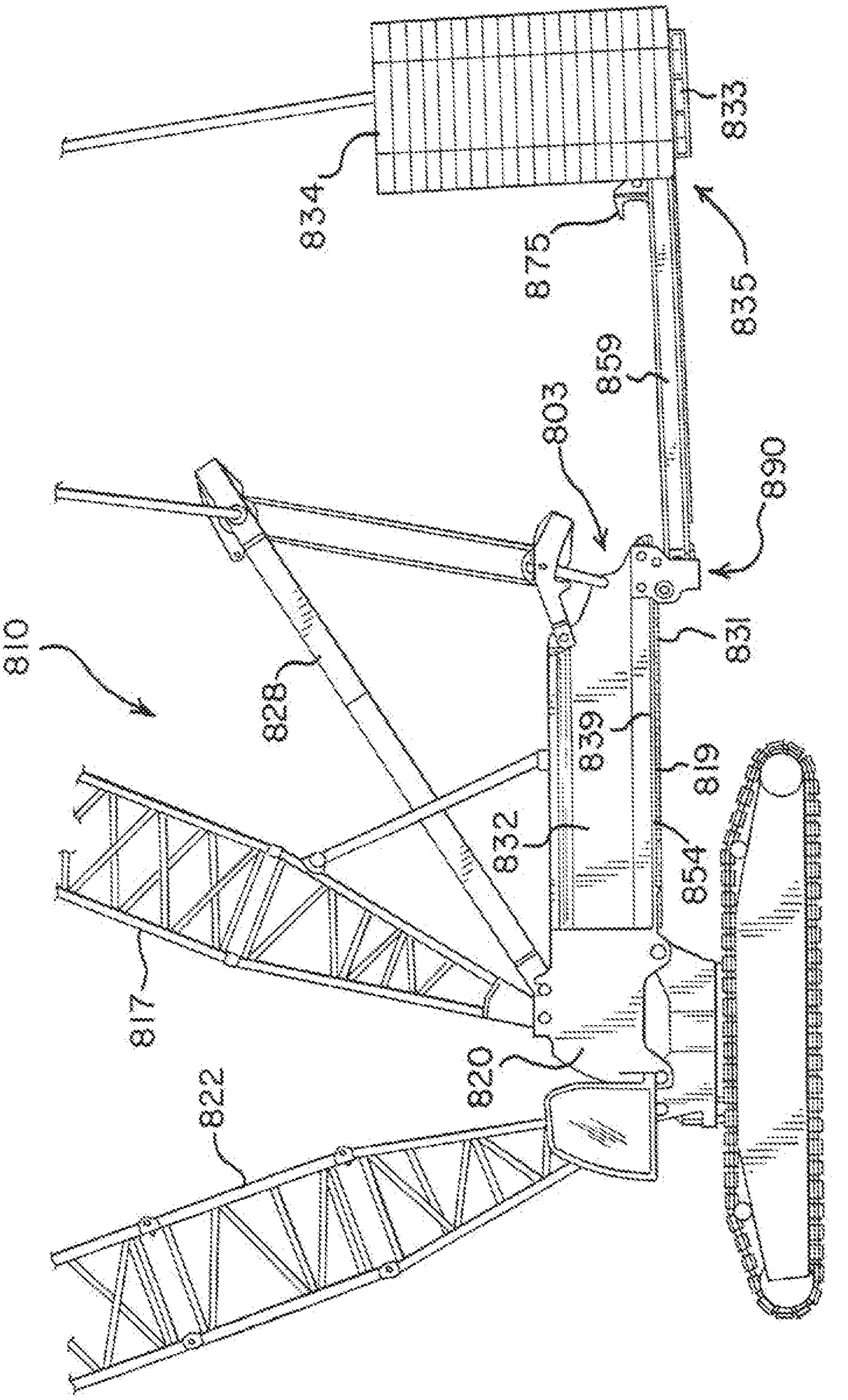
FIG. 76 is a partial side elevation view of the crane in FIG. 73 with the counterweight unit in a rearward position.

The counterweight unit 835 comprises a counterweight tray 833 pinned or otherwise coupled to a movable trolley 870 (FIG. 77). The same structure that moved the counterweight tray 733 in crane 710 is used to move the counterweight tray 833 in crane 810. FIG. 71 best illustrates the connection of the counterweight support beam 859 to the counterweight tray 833. The counterweight tray 833 is suspended beneath the counterweight support beam 859.

The trolley 870 rides on four rollers 876, like rollers 776, that engage the surface 855 along each side member 862 of the counterweight support beam 859. The trolley 870 optionally includes horizontal rollers (not illustrated), similar to side or horizontal rollers 779 discussed above.

The counterweight unit movement device 860 is identical to the counterweight unit movement device 760 as described above. Gears, such as gears 774, engage with the teeth 837 on the two side members 862 of the counterweight support beam 859 to move the trolley 870 with respect to the counterweight support beam 859 as the motor and gearbox turns the gear. In this way the counterweight unit 835 can move with respect to the counterweight support beam 859 and/or the rotating bed 820 by being mounted on trolley 870.

In this embodiment, the counterweight unit 835 is movable to a position in front of the rear-most fixed portion 803 of the rotating bed 820. In addition, since the counterweight beam 859 can move rearwardly, and the counterweight unit 835 can move rearwardly on the counterweight support beam 859, the counterweight unit 835 may be moved to and held at a first position in front of the top 870 of the fixed mast 817, and moved to and held at a second position rearward of the top 870 of the fixed mast 817.

The counterweight support beam 859 also includes at least one or more counterweight support engagement bars 875 positioned on a top 874 of at least one of the side members 862 of the counterweight support beam 859. A surface 876 of the counterweight support engagement bars 875 engages the rotating bed 820, either directly or indirectly through a lug (not illustrated), such as lug 532 illustrated in FIGS. 74 and 75. As discussed above, the support engagement bars 875 thus are able to transfer load from the counterweight support beam 859 directly to the rotating bed 820 when the counterweight support beam is in the fully retracted position.

FIGS. 82-89 disclose a crane 910 similar in many respects to the crane 810 and incorporates the same features and elements except as modified and described below. In addition to the live mast 928, this embodiment includes a fixed position mast 917. In the crane 910, as with the other embodiments disclosed herein, the carbody 912 is not provided with any separate functional counterweight, and the movable counterweight unit 935 is never supported by the ground during crane pick, move and set operations other than indirectly by movable ground engaging members 914 on the carbody 912.

As with crane 810, the rotating bed 920 includes a counterweight support frame 932, either formed integrally with the rotating bed 920 or in the form of a welded plate structure coupled to the rotating bed 920. In this embodiment, the counterweight support frame 932 supports a movable counterweight support beam 959 in a movable relationship with respect to the counterweight support frame 932 and the rotating bed 920.

Unlike the counterweight support beam 859 that was supported below the counterweight support frame 832, in this embodiment the counterweight support frame 932 effectively lies within the same horizontal plane 1020 as the counterweight support beam 959. When the counterweight support beam 959 is positioned nearest to an axis of rotation 902 of the rotating bed 920 the counterweight support beam 959 nests within the counterweight support frame 932. Stated differently, the rotating bed 920 includes a recess 1010 between opposite sides of the counterweight support frame 932. The recess 1010 is configured to receive at least a front portion 971 of the counterweight support beam 959 and, in some embodiments a majority of a length of the counterweight support beam 959 when the counterweight support beam moves towards the axis of rotation 902 and/or when the counterweight support beam 959 is positioned a distance from the axis of rotation 902 that is less than the maximum extension of the counterweight support beam 959 from the axis of rotation 902. As will be appreciated, the counterweight support beam 959 and associated elements may be added to crane 710 as an aftermarket addition to increase the capacity of the crane 710.

In this embodiment, the counterweight support frame 932 includes a surface 954. Flanges 939 provide the surface 954. Replaceable wear surfaces (not labeled) optionally are attached to the surface 954. In addition, one or more individually replaceable sections of steel bar 931 are positioned on a lower surface 919 of the counterweight support frame 932. In some embodiments, the steel bar 931 forms the surface 954 opposite of a side that includes machined or forged teeth (not illustrated), similar to forged teeth 736. The steel bar 931 with the teeth forms a rack.

Figure 87:
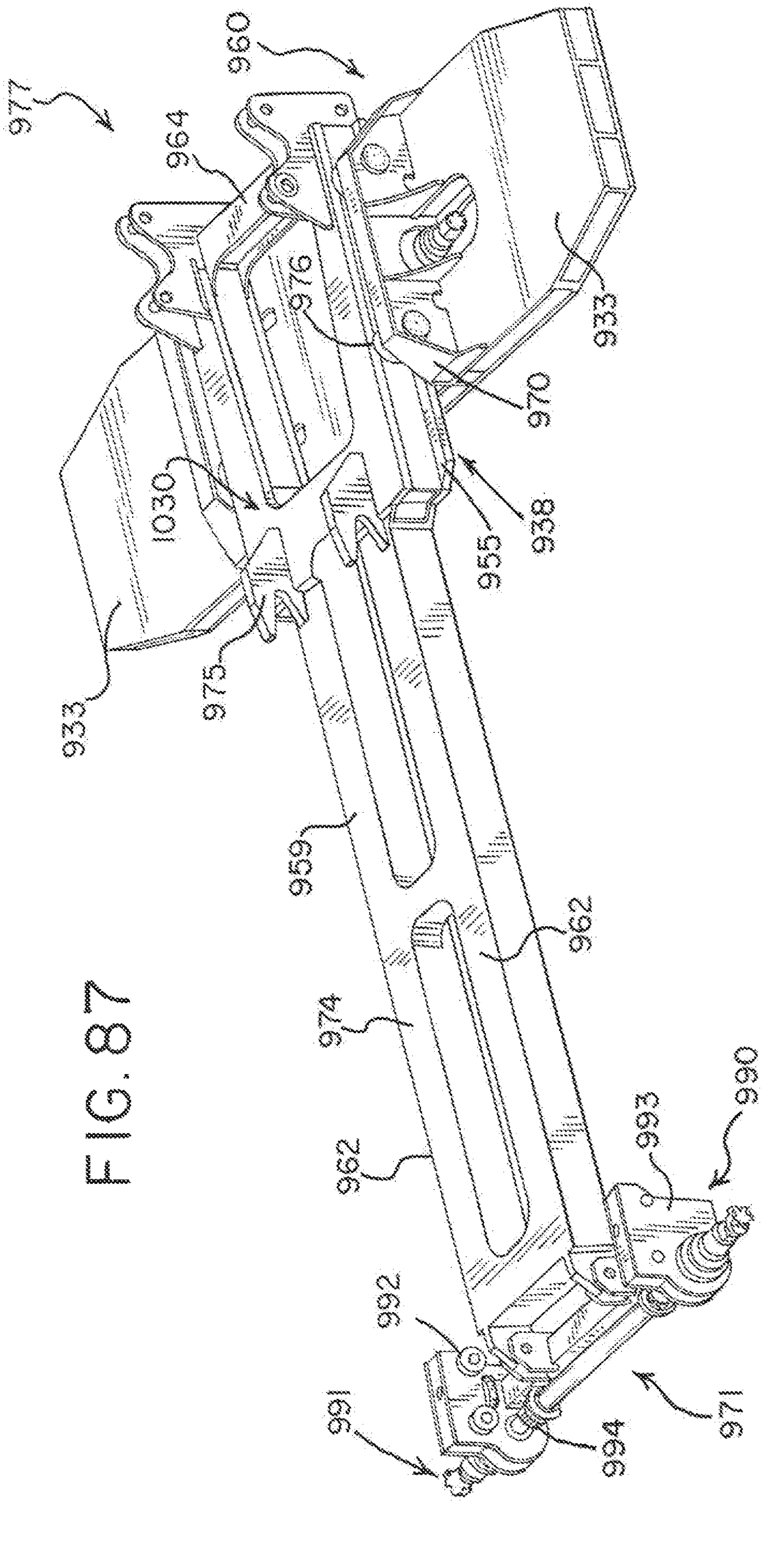
FIG. 87 is a top perspective view of the counterweight support beam, counterweight support beam movement device, and counterweight tray without counterweight, and the counterweight movement device of the crane in FIG. 82.

The crane 910 uses a counterweight support beam movement device 990 identical to the counterweight support beam movement device 890. Thus, in this embodiment, the counterweight movement system includes a counterweight unit movement device 960 and a counterweight support beam movement device 990. The counterweight support beam movement device 990 includes a frame 993 with a plurality of rollers 992 as best illustrated in FIG. 87. The vertical rollers 992 engage the surface 954 along each side of the counterweight support frame 932. The counterweight support beam movement device 990 includes at least one motor and associated gear 991 that a gear 994 connected to the frame 993.

This counterweight support beam movement device 990 is connected between the counterweight support beam 959 and the counterweight support frame 932 and/or the rotating bed 920 such that the counterweight support beam 959 can be moved with respect to the length of the rotating bed 920 away from the axis of rotation 902 at the rotational connection of the rotating bed 920, and extended rearwardly of the rear-most fixed portion 903 of the rotating bed 920. The movement of the counterweight support beam 959 is generally horizontal and in a direction in line with a length of the counterweight support beam 959. The gears 994 engage with the teeth on the bar/rack 931 on the two sides of the counterweight support frame 932 to move frame 993 with respect to the counterweight support frame 932 as the motor and gearbox 991 turns the gear 994.

The counterweight support beam 959 can be solid, formed of rectangular or tubular structures, or other configurations. The embodiment disclosed in FIGS. 86-89 illustrates a counterweight support beam 959 that is U-shaped when viewed from above and made from two spaced apart side members 962 connected together in the rear 977 by a cross member 964. The front ends 971 of the two side members 962 connect to a counterweight support beam movement device 990, which is moveably mounted on a counterweight support frame 932 on the rotating bed 920.

Figure 88:
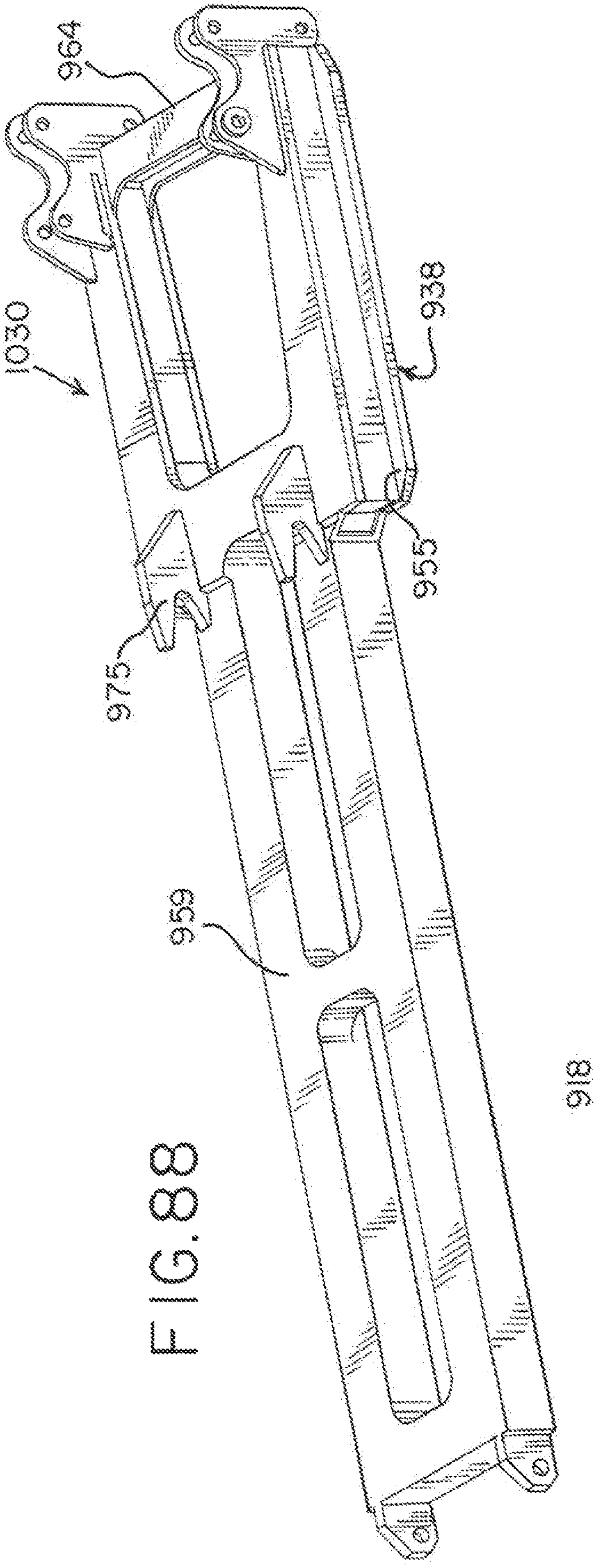
FIG. 88 is a top perspective view of the counterweight support beam of the crane in FIG. 82.
Figure 89:
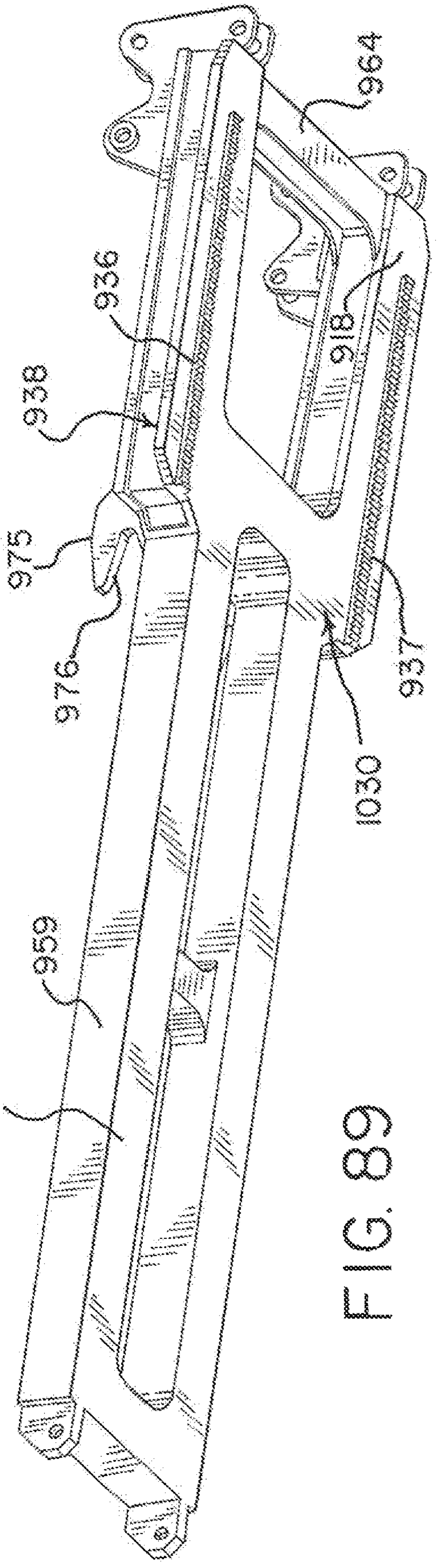
FIG. 89 is a bottom perspective view of the counterweight support beam of the crane in FIG. 82.

In this particular embodiment, the counterweight support beam 959 includes at least one lateral extension 1030 proximate the rear 977 of the counterweight support beam. As illustrated, there exists a lateral extension 1030 on each side of the counterweight support beam 859. On the lateral extension 1030, and much like the sides 862 of the counterweight support frame 832, there is a surface 955, as best seen in FIGS. 87-89. Flanges 938 provide the surface 955. Replaceable wear surfaces (not labeled) optionally are attached to the surface 955. In addition, one or more individually replaceable sections of steel bar 936, like steel bar 836, may be bolted or otherwise positioned on a lower surface 918 of the lateral extension 1030 and/or the counterweight support beam 959 with fasteners of known types, such as socket head cap screws. In some embodiments, the steel bar 936 forms the surface 955 opposite of a side that includes machined or forged teeth 937 similar to forged teeth 836. The steel bar 936 with the teeth 937 forms another rack.

It may be seen, then, that the steel bar/rack 931 on the counterweight support frame 932 and the steel bar/another rack 936 on the lateral extension 1030 of the counterweight support beam 959 align in a linear direction. When the counterweight support beam 959 is in its forward-most position, i.e., the forward part or portion 971 of the counterweight support beam 959 is closest to the axis of rotation 902, the counterweight movement unit 960 and, more particularly, the gears associated with it, can sequentially engage the rack 931 and the another rack 936 to move the trolley 970 and the counterweight unit 935 from the counterweight support frame 932 to the counterweight support beam 959 and vice-versa. Stated in yet another way, the rack 931 on the counterweight support frame 932 and the another rack 936 on the counterweight support beam 959 are functionally contiguous when the counterweight support beam 959 is positioned closest to the axis of rotation 902 so that the counterweight unit movement device 960 can move the counterweight unit 935 between the counterweight support beam 959 and the counterweight support frame 932.

The counterweight unit 935 is identical to the counterweight unit 835 but for the fact that counterweight unit 935 travels from the counterweight support beam 959 to the counterweight support frame 932, which really is a function of the structure of the counterweight support beam 959. The counterweight unit 935 includes a counterweight tray 933 pinned or otherwise coupled to a movable trolley 970 (FIG. 87).

The trolley 970 rides on four rollers 976 (like rollers 776) that engage the surface 955 along each lateral extension 1030 of the counterweight support beam 959 and the surface 954 of the counterweight support frame 932 depending on the relative position of the counterweight unit 935 as discussed above. The trolley 970 optionally includes horizontal rollers (not illustrated).

The counterweight unit movement device 960 is identical to the counterweight unit movement devices 760 and 860 as described above and therefore will not be repeated here.

In this embodiment, the counterweight unit 935 also is movable to a position in front of the rear-most fixed portion 903 of the rotating bed 920. In addition, since the counterweight beam 959 can move rearwardly, and the counterweight unit 935 can move rearwardly on the counterweight support beam 959, the counterweight unit 935 may be moved to and held at a first position in front of the top of the fixed mast 917, and moved to and held at a second position rearward of the top of the fixed mast 917.

The counterweight support beam 959 also includes at least one or more counterweight support engagement bars 975 positioned on a top 974 of at least one of the side members 962 of the counterweight support beam 959. A surface 976 of the counterweight support engagement bars 975 engages the rotating bed 920 as discussed above with respect to counterweight support engagement bars 875.

With the embodiments of cranes 110, 510, 710, 810, and 910, a method of operating the mobile lift crane involves performing a pick, move and set operation with a load wherein the movable counterweight unit is moved toward and away from the front portion of the rotating bed during the pick, move and set operation to help counterbalance the combined boom and load moment, and wherein the counterweight unit stays on the counterweight support beam during the pick, move and set operation. The counterweight support beam and counterweight unit both move to counterbalance the crane as the combined boom and load moment changes. Further, the counterweight unit may be moved with respect to the counterweight support beam during the pick, move and set operation to help counterbalance the combined boom and load moment.

Preferred cranes of the present invention have a movable upperworks counterweight unit that rotates with the rotating bed and a counterweight movement system connected between the rotating bed and the counterweight unit. The counterweight unit may be moved to and held at both a forward position and a rearward position, but is never supported by the ground during crane pick, move and set operations other than indirectly by the movable ground engaging members on the carbody. The ratio of i) the weight of the upperworks counterweight unit to ii) the total weight of the crane equipped with a basic boom length is greater than 52%, preferably greater than 60%. In some embodiments, the counterweight unit is supported on a counterweight support frame that is provided as part of the rotating bed, and the counterweight unit is in a movable relationship with respect to the counterweight support frame.

The invention is particularly applicable to cranes that have a capacity of greater than 200 metric tonne, and more preferably greater than 300 metric tonne.

It will be appreciated that the invention includes a method of increasing the capacity of a crane. A lift crane having a first capacity can be modified to become a crane having a second capacity greater than the first capacity. The crane of the first capacity includes a counterweight unit having multiple counterweights stacked on top of each other. The counterweight unit is movable from a first position to a second position further from the crane boom than the first position. The method involves removing at least some of the counterweights from the crane; adding a counterweight support beam to the crane; and returning at least some of the counterweights back to the crane to provide the crane with the greater capacity. The returned counterweights are supported on the counterweight support beam in a manner that allows the retuned counterweights to be able to move to a third position further from the boom than the second position. As disclosed, in some embodiments, the counterweight support beam is attached to the rotating bed by being attached to a counterweight support beam movement device that is attached directly to the rotating bed, and the counterweight support beam movement device is connected between the counterweight support beam and the rotating bed such that the counterweight support beam can be moved with respect to the length of the rotating bed away from the rotational connection of the rotating bed and the carbody. In some methods of the invention, the returned counterweights move to the third position by moving with the counterweight support beam, or by moving with respect to the counterweight support beam, or by moving with the counterweight support beam and moving with respect to the counterweight support beam. As discussed above, the step of adding the counterweight support beam may involve removing an outer frame structure connected to the rotating bed by an adapter, assembling that outer frame structure with a telescoping inner frame structure to create the counterweight support beam movement device, and attaching the inner structure to the rotating bed.

It should be understood that various changes and modifications to the presently preferred embodiments described herein will be apparent to those skilled in the art. For example, the boom hoist system could comprise one or more hydraulic cylinders mounted between the boom and the rotating bed to change the angle of the boom. Instead of a live mast or lattice mast, a fixed gantry could be used to support boom hoist rigging. In this regard, such a gantry is considered to be a mast for purposes of the following claims. The crane 10 could be modified to include a lattice mast such as is used on crane 110 but with just the movable counterweight on counterweight support frame 32 rather than with a counterweight support beam 160, in which case the boom hoist rigging would include an equalizer between the lattice mast and the boom. If the crane is set up this way on a job site, it can perform smaller lifts as initially set up, and then have the counterweight support beam 160 added to make the crane 110 without having to set up the crane again. Further, parts of the crane need not always be directly connected together as shown in the drawings. For example, the tension member could be connected to the mast by being connected to a backhitch near where the backhitch is connected to the mast. Such changes and modifications can be made without departing from the spirit and scope of the present invention and without diminishing its intended advantages. It is therefore intended that such changes and modifications be covered by the appended claims.

What is claimed is:

1. A lift crane comprising:

a) a carbody;

b) movable ground engaging members mounted on the carbody allowing the lift crane to move over the ground;

c) a rotating bed having a front portion and a rear-most fixed portion, the rotating bed being rotatably connected to the carbody about an axis of rotation that provides a plane of rotation perpendicular to the axis, the rotating bed including a counterweight support frame integrally formed with the rotating bed, the counterweight support frame including a rack coupled directly to a lower peripheral surface under the rotating bed, the rack having teeth formed therein, wherein the counterweight support frame is not pinned to the rotating bed;

d) a boom pivotally mounted on the rotating bed;

e) a counterweight unit that includes a trolley, the counterweight unit being in a movable relationship with respect to the rotating bed, and, f) a counterweight unit movement device configured to move the counterweight unit toward and away from the boom, the counterweight unit movement device including at least one motor driving a first gear connected to the trolley to move the trolley with respect to the rotating bed as the motor turns the first gear.

2. The lift crane of claim 1, wherein the counterweight unit is movable between a position where the counterweight unit is in front of the rear-most fixed portion of the rotating bed a distance such that a tail swing of the lift crane is dictated by the rear-most fixed portion of the rotating bed, and a position where the counterweight unit dictates the tail swing of the lift crane.

3. The lift crane of claim 1, wherein the movable ground engaging members comprise crawlers that provide front and rear tipping fulcrums for the lift crane, and the counterweight unit is movable to a position so that a center of gravity of the counterweight unit is within a distance from the axis of rotation of less than 125% of the distance from the axis of rotation to the rear tipping fulcrum.

4. The lift crane of claim 1, wherein the counterweight unit comprises multiple pieces of counterweight stacked on a counterweight tray, and wherein the counterweight tray is suspended beneath the rotating bed.

5. The lift crane of claim 1, wherein the first gear of the counterweight unit movement device engages the teeth on the rack to move the trolley with respect to the rotating bed as the motor turns the first gear.

6. The lift crane of claim 1, further comprising a mast connected to the rotating bed, wherein the counterweight unit may be moved to and held at a position in front of a top of the mast and moved to and held at a position rearward of the top of the mast.

7. The lift crane of claim 1, wherein the counterweight unit is never supported by the ground during crane pick, move and set operations other than indirectly by the movable ground engaging members on the carbody.

8. The lift crane of claim 1, further comprising:

a) a counterweight support beam movably connected to the counterweight support frame, the counterweight support beam including another rack coupled to a lower surface of the counterweight support beam, the another rack having teeth formed therein; and, b) a counterweight support beam movement device connected between the counterweight support beam and the rack of the counterweight support frame such that the counterweight support beam can be moved forward towards the front portion of the rotating bed and rearward beyond the rear-most fixed portion of the rotating bed, and, c) wherein the first gear of the counterweight unit movement device engages at least the teeth on the another rack of the counterweight support beam to move the trolley with respect to the rotating bed as the motor turns the first gear when the counterweight unit is positioned rearward of the rear-most fixed portion of the rotating bed.

9. The lift crane of claim 8, wherein the counterweight support beam movement device includes at least a motor driving a gear that engages the teeth on the rack of the rotating bed.

10. The lift crane of claim 8, wherein the counterweight unit movement device is connected between the counterweight support beam and the counterweight unit so as to be able to move the counterweight unit toward and away from the boom.

11. The lift crane of claim 8, further comprising a mast connected to the rotating bed and a tension member connected between the mast and the counterweight support beam.

12. The lift crane of claim 8, wherein the counterweight unit is supported on the counterweight support beam in a movable relationship with respect to the counterweight support beam.

13. The lift crane of claim 8, further comprising a support on a rear of the rotating bed and wherein the counterweight support beam further comprises a support engagement positioned such that when the counterweight support beam is in a fully retracted position, the support and the support engagement are able to transfer load from the counterweight support beam to the rotating bed.

14. The lift crane of claim 8, wherein the counterweight support beam is positioned below the rotating bed.

15. The lift crane of claim 8, wherein the rack on the rotating bed and the another rack on the counterweight support beam align in a linear direction.

16. The lift crane of claim 15, wherein the rack on the rotating bed and the another rack on the counterweight support beam are functionally contiguous when the counterweight support beam is positioned closest to the axis of rotation so that the counterweight unit movement device can move the counterweight unit between the counterweight support beam and the counterweight support frame.

17. The lift crane of claim 1, wherein the counterweight support frame includes a surface that supports the trolley, wherein the surface is without a substantially positive or negative slope.

18. The lift crane of claim 17, wherein the surface is parallel to the ground.

19. A lift crane comprising:

a) a carbody;

b) movable ground engaging members mounted on the carbody allowing the lift crane to move over the ground;

c) a rotating bed having a front portion and a rear-most fixed portion, the rotating bed being rotatably connected to the carbody about an axis of rotation that provides a plane of rotation perpendicular to the axis, the rotating bed including a counterweight support frame integrally formed with the rotating bed, the counterweight support frame including a rack coupled directly to a lower peripheral surface under the rotating bed, the rack having teeth formed therein, wherein the counterweight support frame is not pinned to the rotating bed;

d) a boom pivotally mounted on the rotating bed;

e) a counterweight unit that includes a trolley, the counterweight unit being in a movable relationship with respect to the rotating bed, and, f) a counterweight unit movement device coupled to the trolley and configured to move the counterweight unit, the trolley, and the counterweight unit movement device relative to the rotating bed and toward and away from the boom.

20. The lift crane of claim 19, wherein the counterweight unit movement device includes at least one motor driving a gear connected to the trolley to move the trolley with respect to the rotating bed as the motor turns the gear.

* * * * *